US012598483B2

(12) United States Patent
Lee et al.

(10) Patent No.: US 12,598,483 B2
(45) Date of Patent: Apr. 7, 2026

(54) WIRELESS COMMUNICATION METHOD USING ON-DEVICE LEARNING-BASED MACHINE LEARNING NETWORK

(71) Applicant: LG ELECTRONICS INC., Seoul (KR)

(72) Inventors: Jongku Lee, Seoul (KR); Ilhwan Kim, Seoul (KR); Ikjoo Jung, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 603 days.

(21) Appl. No.: 17/926,855

(22) PCT Filed: May 21, 2020

(86) PCT No.: PCT/KR2020/006661
§ 371 (c)(1),
(2) Date: Nov. 21, 2022

(87) PCT Pub. No.: WO2021/235572
PCT Pub. Date: Nov. 25, 2021

(65) Prior Publication Data
US 2023/0209368 A1     Jun. 29, 2023

(51) Int. Cl.
*H04W 24/02*     (2009.01)
*G06N 3/0464*     (2023.01)
(Continued)

(52) U.S. Cl.
CPC .......... *H04W 24/02* (2013.01); *G06N 3/0464* (2023.01); *G06N 3/08* (2013.01);
(Continued)

(58) Field of Classification Search
CPC ..................................................... G06N 20/00
See application file for complete search history.

(56) References Cited

U.S. PATENT DOCUMENTS

2012/0202538 A1     8/2012   Uusitalo et al.
2019/0053189 A1*    2/2019   Ramamurthy ......... H04B 17/27
(Continued)

FOREIGN PATENT DOCUMENTS

KR     10-2008-0019593 A     3/2008
WO     WO 2016/001473 A1     1/2016
(Continued)

*Primary Examiner* — Ayaz R Sheikh
*Assistant Examiner* — Christopher R Davis
(74) *Attorney, Agent, or Firm* — Birch, Stewart, Kolasch & Birch, LLP

(57)     ABSTRACT

Disclosed is a wireless communication method using an on-device learning-based machine learning network. A method according to one embodiment of the present specification comprises the steps of: generating a learning list on the basis of one or more location samples collected while a terminal communicates through a network; when an event associated with any one of one or more first items included in the learning list is detected, obtaining training data for updating, to a second machine learning network, a first machine learning network to be applied to a receiver of the terminal; and updating the first machine learning network by using the training data, and thereby the method provides a wireless communication service adaptive to an actual communication environment. A system including at least one processor of the present specification may be associated with an artificial intelligence module, a drone (unmanned aerial vehicle (UAV)), a robot, an augmented reality (AR) device, a virtual reality (VR) device, devices related to 5G services, etc.

18 Claims, 32 Drawing Sheets

(51) Int. Cl.

| | | |
|---|---|---|
| *G06N 3/08* | (2023.01) | |
| *G06N 20/00* | (2019.01) | |
| *H04B 17/309* | (2015.01) | |
| *H04B 17/318* | (2015.01) | |
| *H04B 7/0413* | (2017.01) | |

(52) U.S. Cl.

CPC ........... *G06N 20/00* (2019.01); *H04B 17/309* (2015.01); *H04B 17/318* (2015.01); *H04B 7/0413* (2013.01)

(56) References Cited

U.S. PATENT DOCUMENTS

| | | | |
|---|---|---|---|
| 2020/0412417 A1* | 12/2020 | Calzolari | ............... G06N 3/084 |
| 2023/0062443 A1* | 3/2023 | Chakraborty | ......... H04W 24/04 |

FOREIGN PATENT DOCUMENTS

| | | |
|---|---|---|
| WO | WO 2017/052709 A2 | 3/2017 |
| WO | WO 2019/120487 A1 | 6/2019 |

* cited by examiner

[FIG. 1]
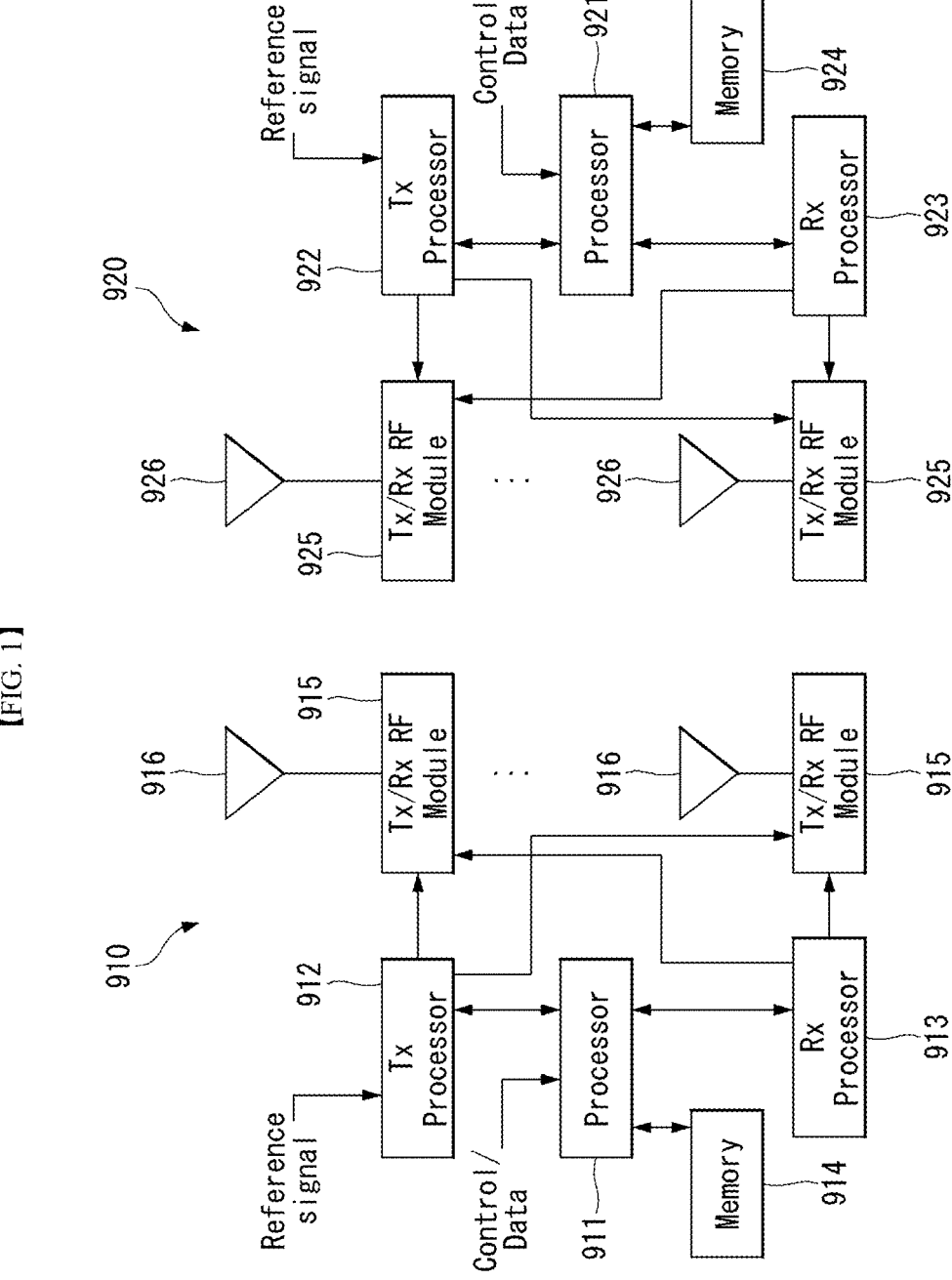

[FIG. 2]
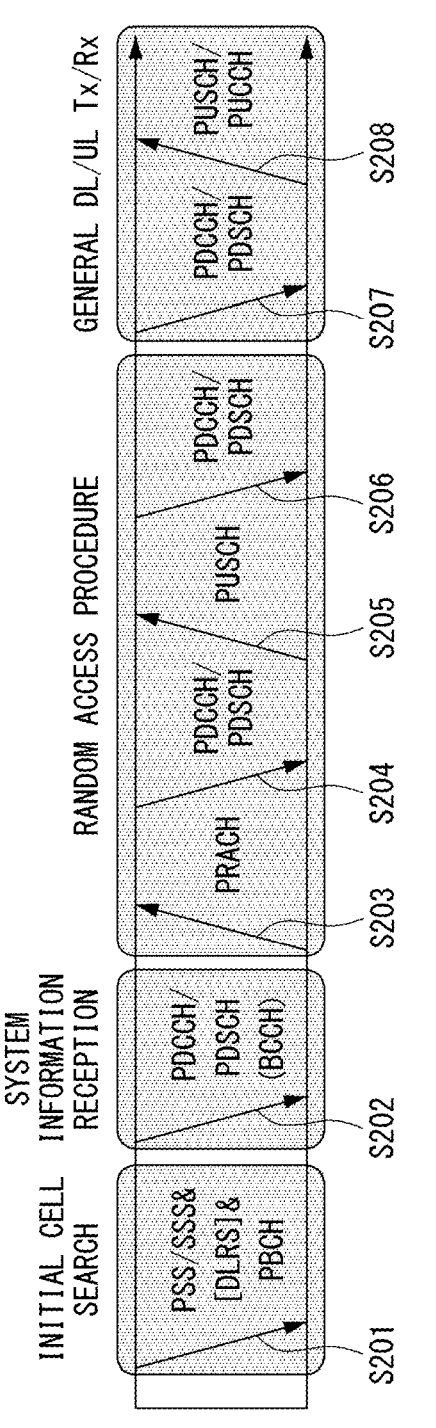

【FIG. 3】
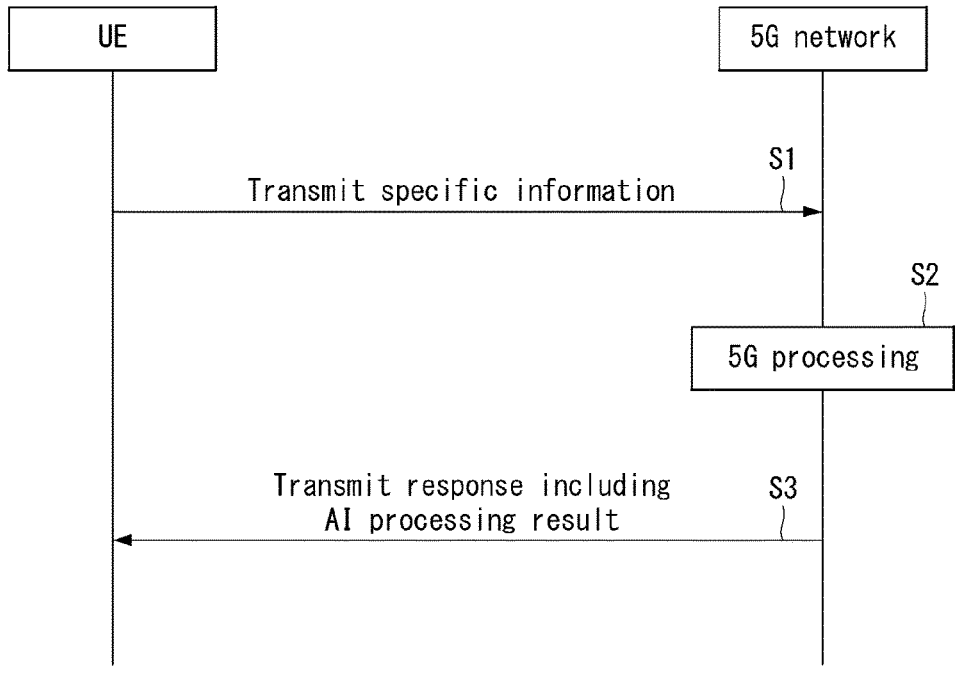
【FIG. 4】
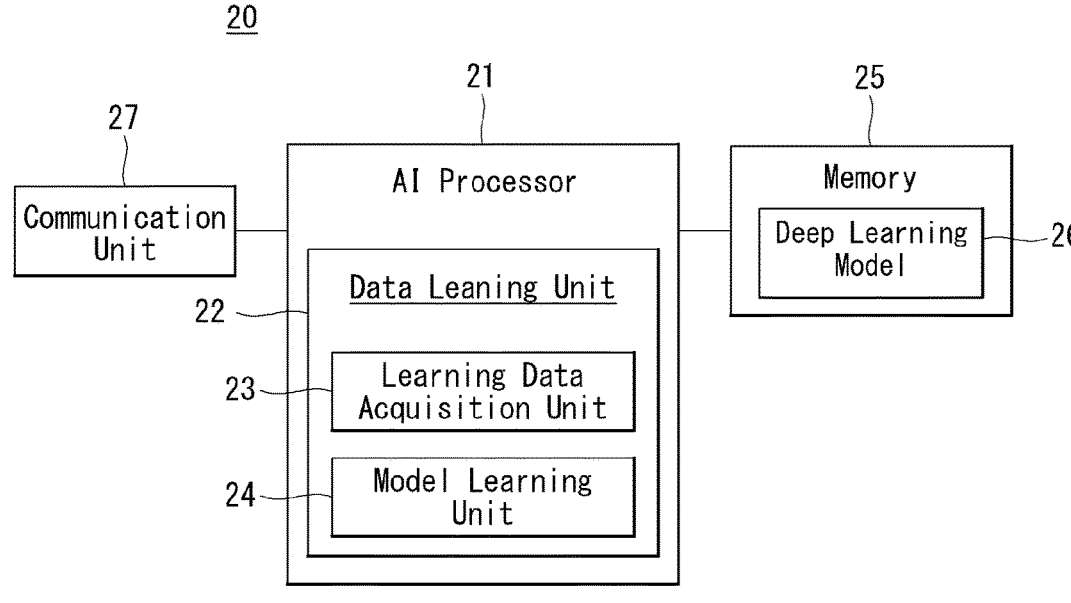

【FIG. 5】
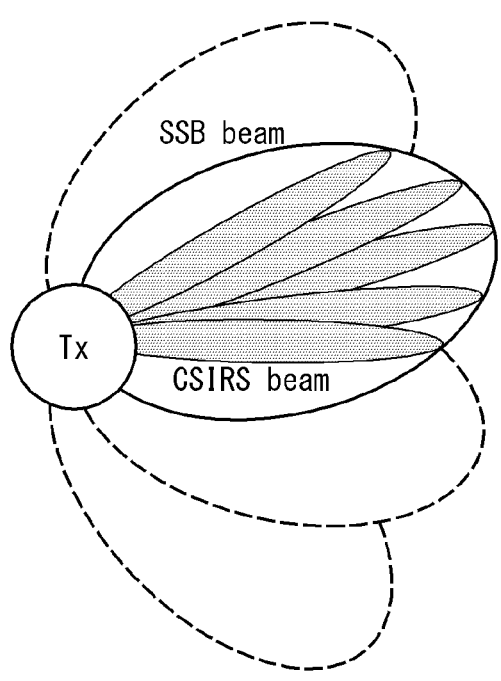
【FIG. 6】
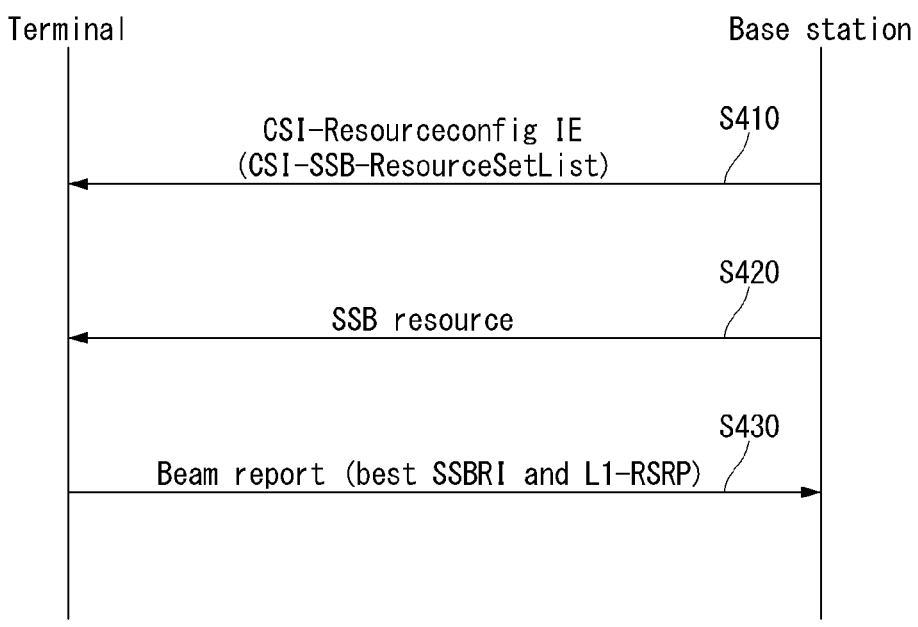

【FIG. 7】
(a)
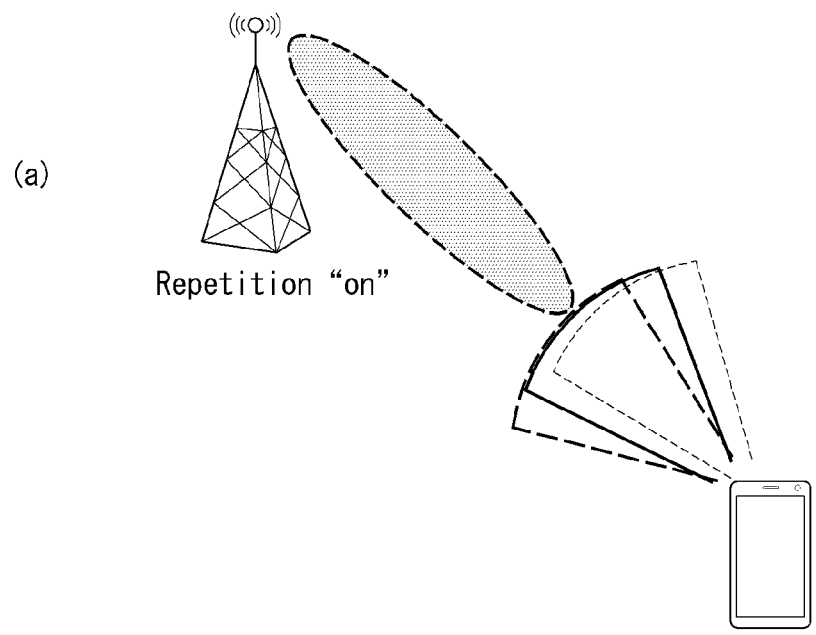
Repetition "on"
(b)
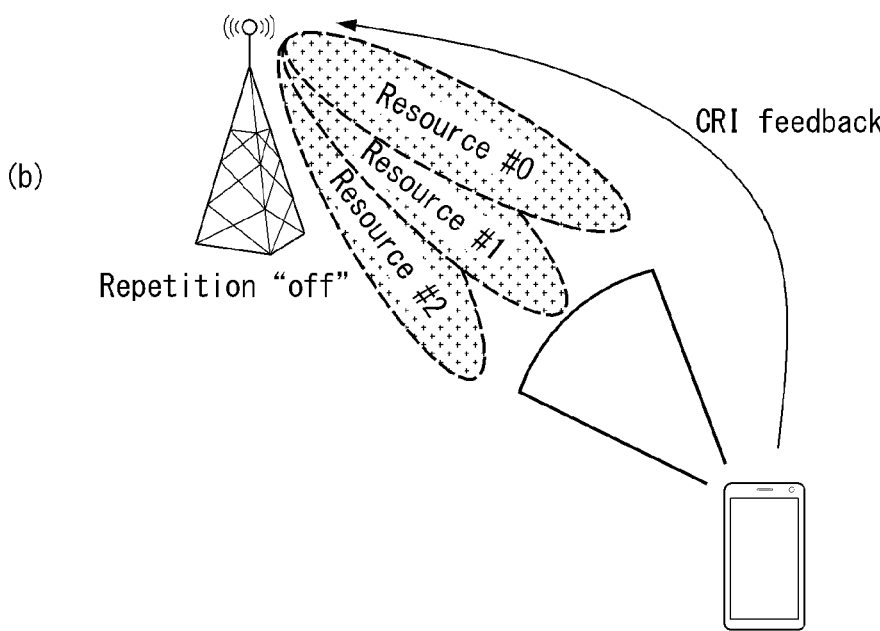
Repetition "off"

【FIG. 8】
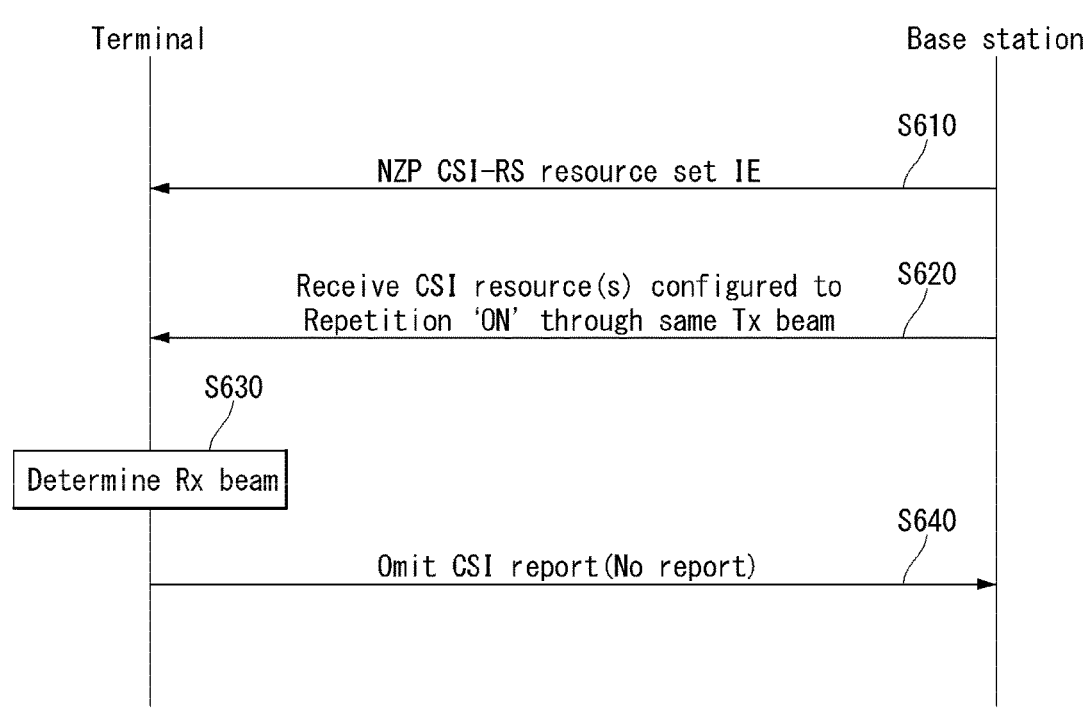

【FIG. 9】
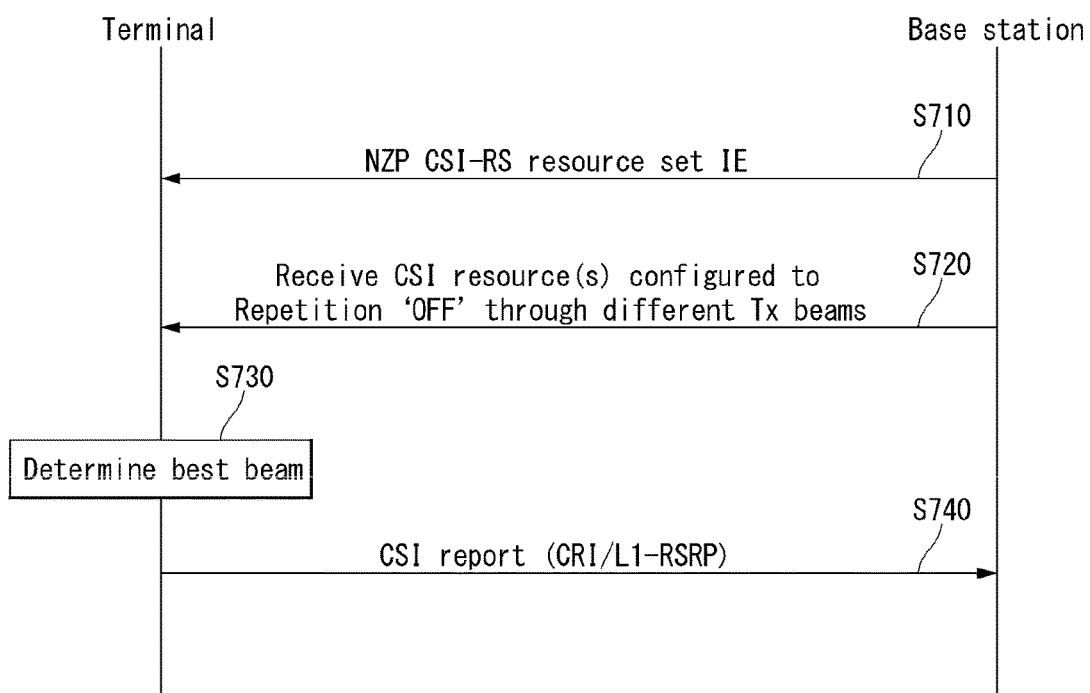
【FIG. 10】
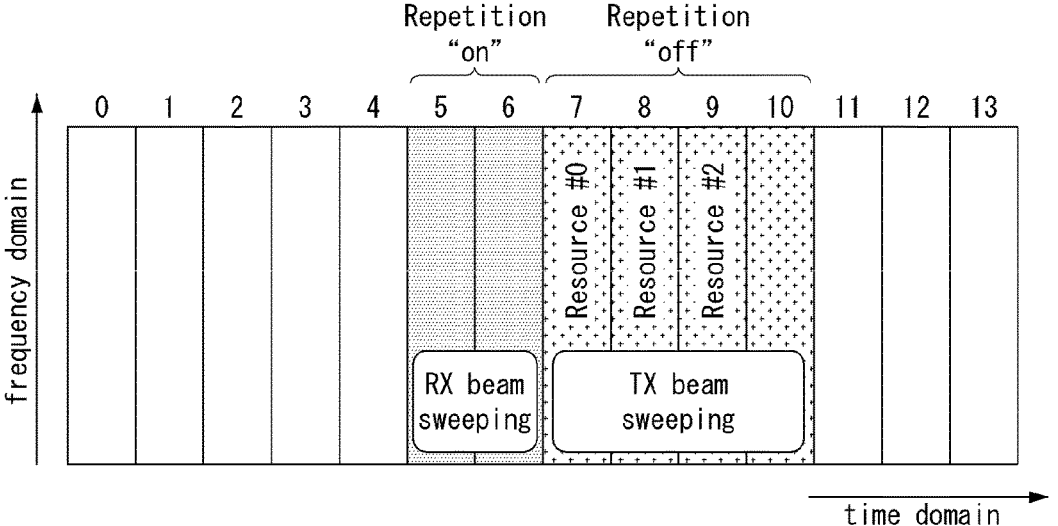

【FIG. 11】
BS Rx beam sweeping
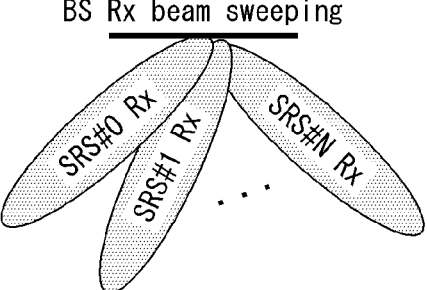
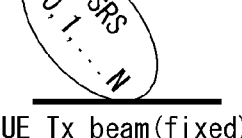
UE Tx beam(fixed)
(a)
BS Rx beam fixing
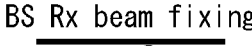
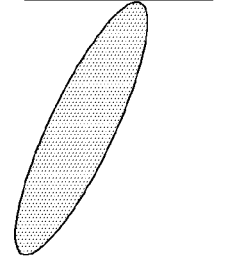
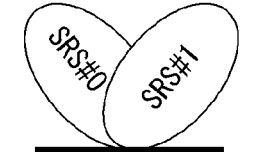
UE Tx beam sweeping
(b)

【FIG. 12】
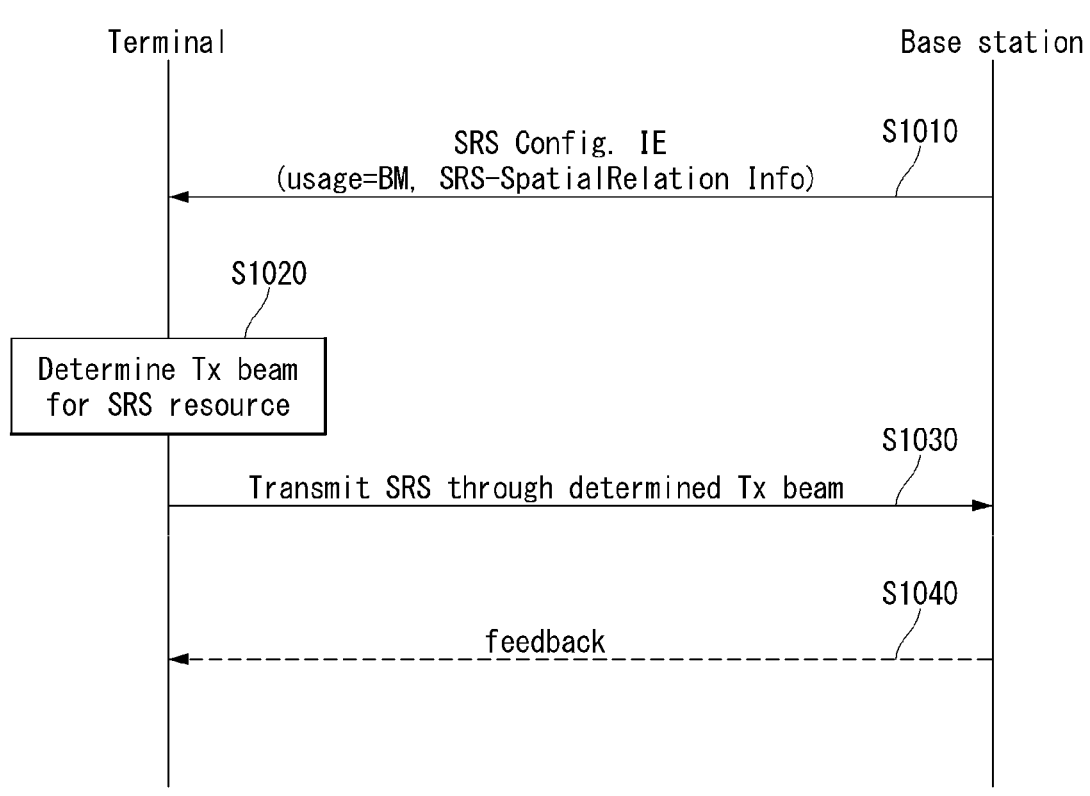

【FIG. 13】
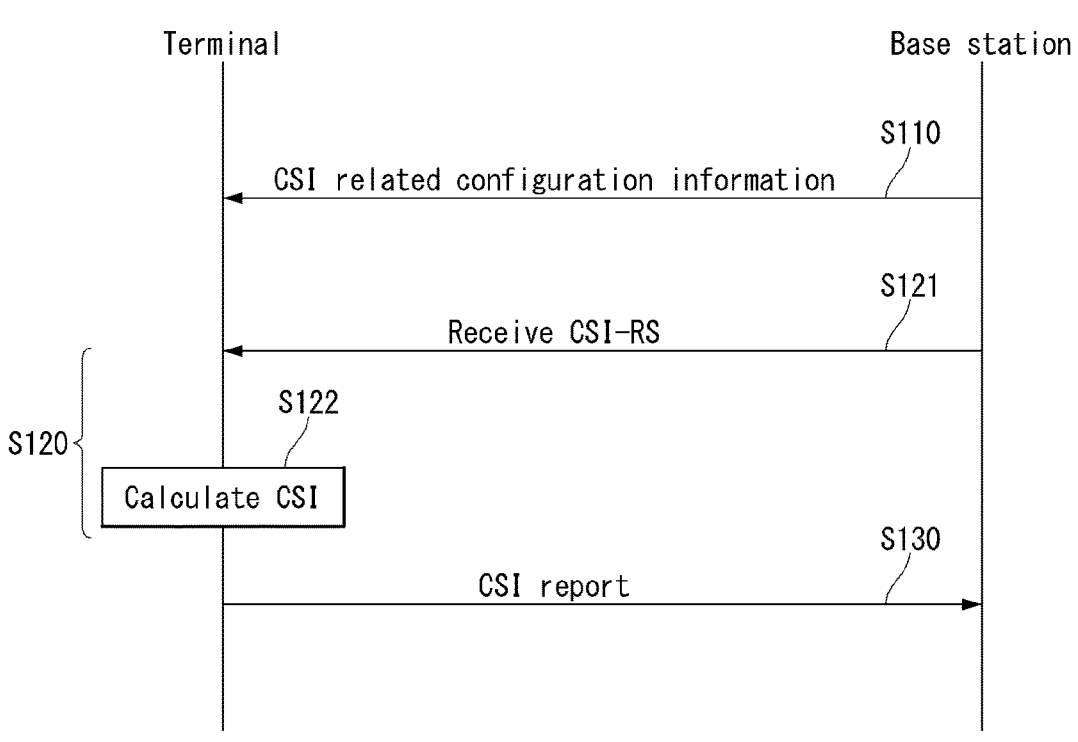

[FIG. 14]

【FIG. 15】
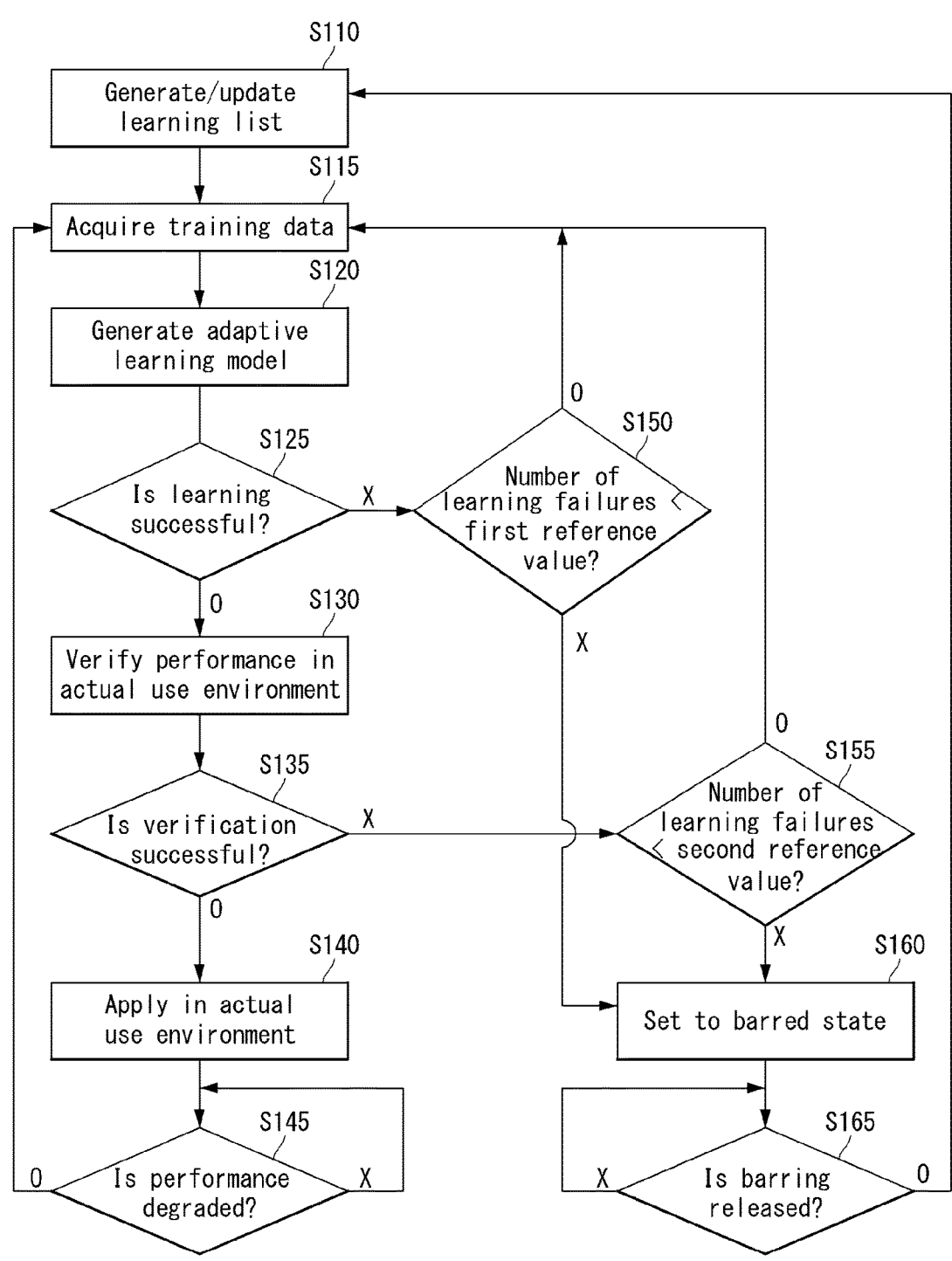

【FIG. 16】
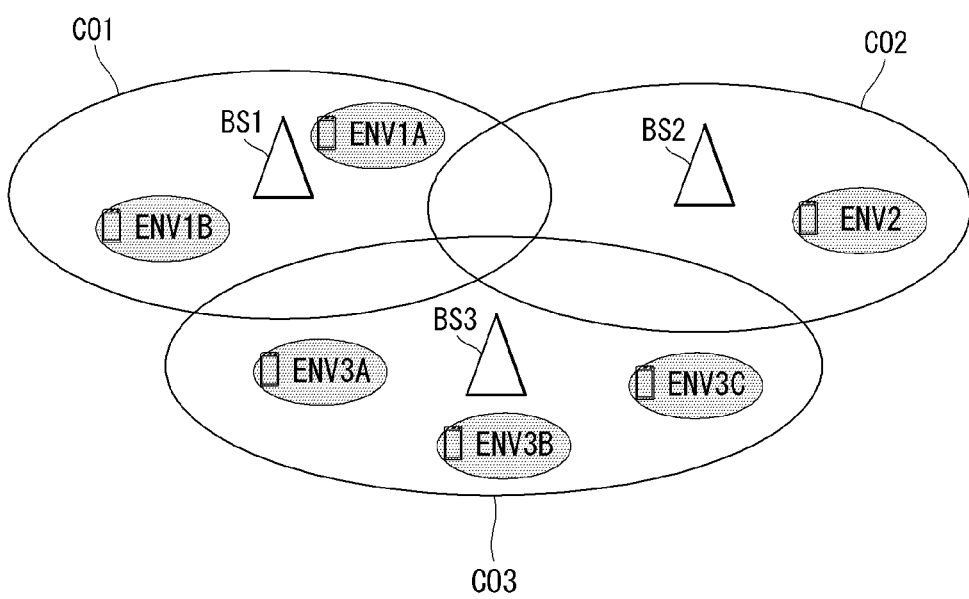

[FIG. 17]

| Base station information | | Connection information | | |
|---|---|---|---|---|
| Cell ID | Freq. B | $T_{pri}$ | $T_{tot}$ | $D_{tot}$ |
| A | fa | a1 | a2 | a3 |
| B | fb | b1 | b2 | b3 |
| C | fc | c1 | c2 | c3 |
| ... | | | | |
| X | fx | x1 | x2 | x3 |
| Y | fy | y1 | y2 | y3 |
| Z | fz | z1 | z2 | z3 |

< Connection list >

| Base station information | | Connection information | | |
|---|---|---|---|---|
| Cell ID | Freq. B | $T_{pri}$ | $T_{tot}$ | $D_{tot}$ |
| A | fa | a1' | a2' | a3' |
| B | fb | b1' | b2' | b3' |
| C | fc | c1' | c2' | c3' |
| ... | | | | |
| X | fx | x1' | x2' | x3' |
| Y | fy | y1' | y2' | y3' |
| Z | fz | z1' | z2' | z3' |

< candidate list >

[FIG. 18]

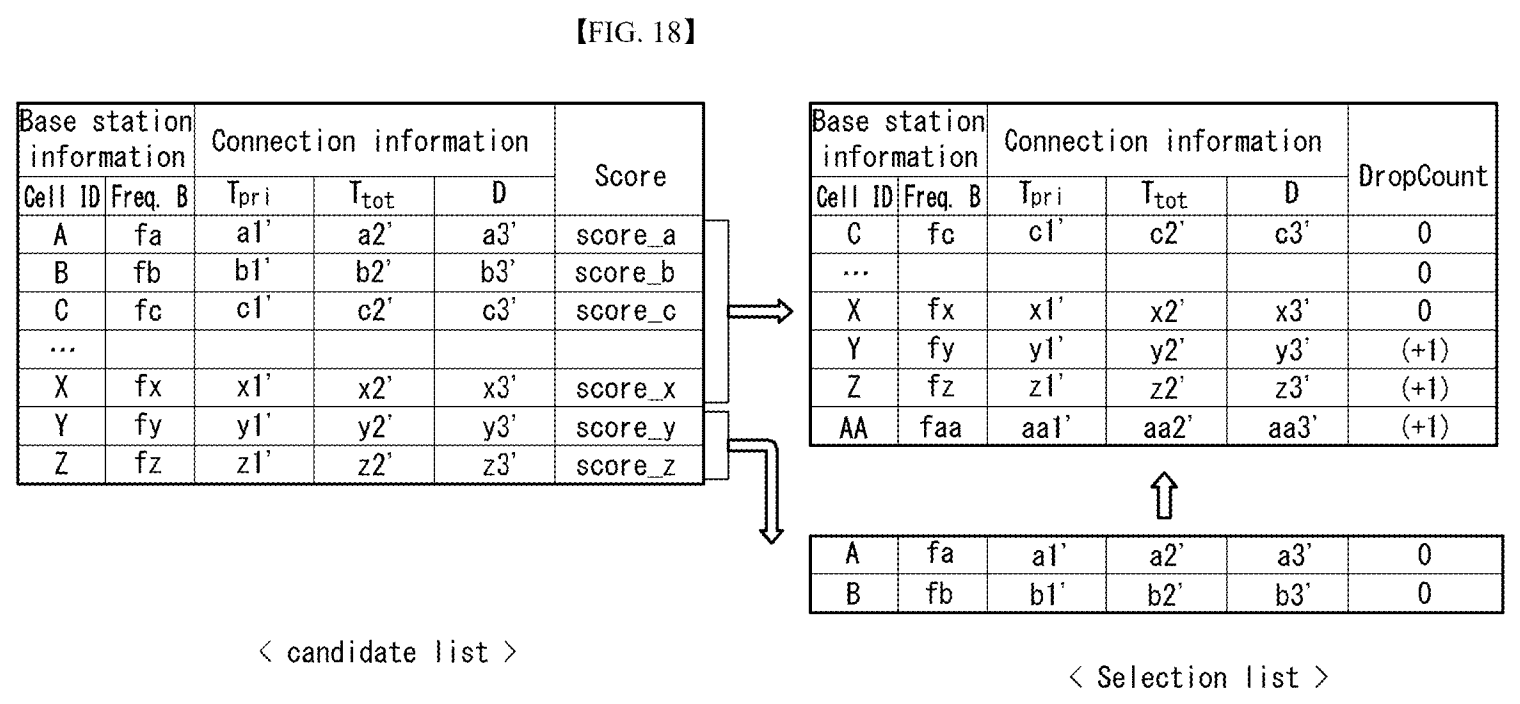

< candidate list >

| Base station information | | Connection information | | | Score |
| --- | --- | --- | --- | --- | --- |
| Cell ID | Freq. B | $T_{pri}$ | $T_{tot}$ | D | |
| A | fa | a1' | a2' | a3' | score_a |
| B | fb | b1' | b2' | b3' | score_b |
| C | fc | c1' | c2' | c3' | score_c |
| ... | | | | | |
| X | fx | x1' | x2' | x3' | score_x |
| Y | fy | y1' | y2' | y3' | score_y |
| Z | fz | z1' | z2' | z3' | score_z |

| Base station information | | Connection information | | | DropCount |
| --- | --- | --- | --- | --- | --- |
| Cell ID | Freq. B | $T_{pri}$ | $T_{tot}$ | D | |
| C | fc | c1' | c2' | c3' | 0 |
| ... | | | | | 0 |
| X | fx | x1' | x2' | x3' | 0 |
| Y | fy | y1' | y2' | y3' | (+1) |
| Z | fz | z1' | z2' | z3' | (+1) |
| AA | faa | aa1' | aa2' | aa3' | (+1) |

| A | fa | a1' | a2' | a3' | 0 |
| --- | --- | --- | --- | --- | --- |
| B | fb | b1' | b2' | b3' | 0 |

< Selection list >

【FIG. 19】

| Base station information | | Connection information | | | DropCount | $N_{in-region}$ |
|---|---|---|---|---|---|---|
| Cell ID | Freq. B | $T_{pri}$ | $T_{tot}$ | D | | |
| A | fa | a1' | a2' | a3' | 0 | ain |
| B | fb | b1' | b2' | b3' | 0 | bin |
| C | fc | c1' | c2' | c3' | 0 | cin |
| ... | ... | ... | ... | ... | ... | |
| X | fx | x1' | x2' | x3' | 0 | xin |
| Y | fy | y1' | y2' | y3' | (+1) | yin |
| Z | fz | z1' | z2' | z3' | (+1) | zin |
| AA | faa | aa1' | aa2' | aa3' | (+1) | aain |

< Selection list >

[FIG. 20]
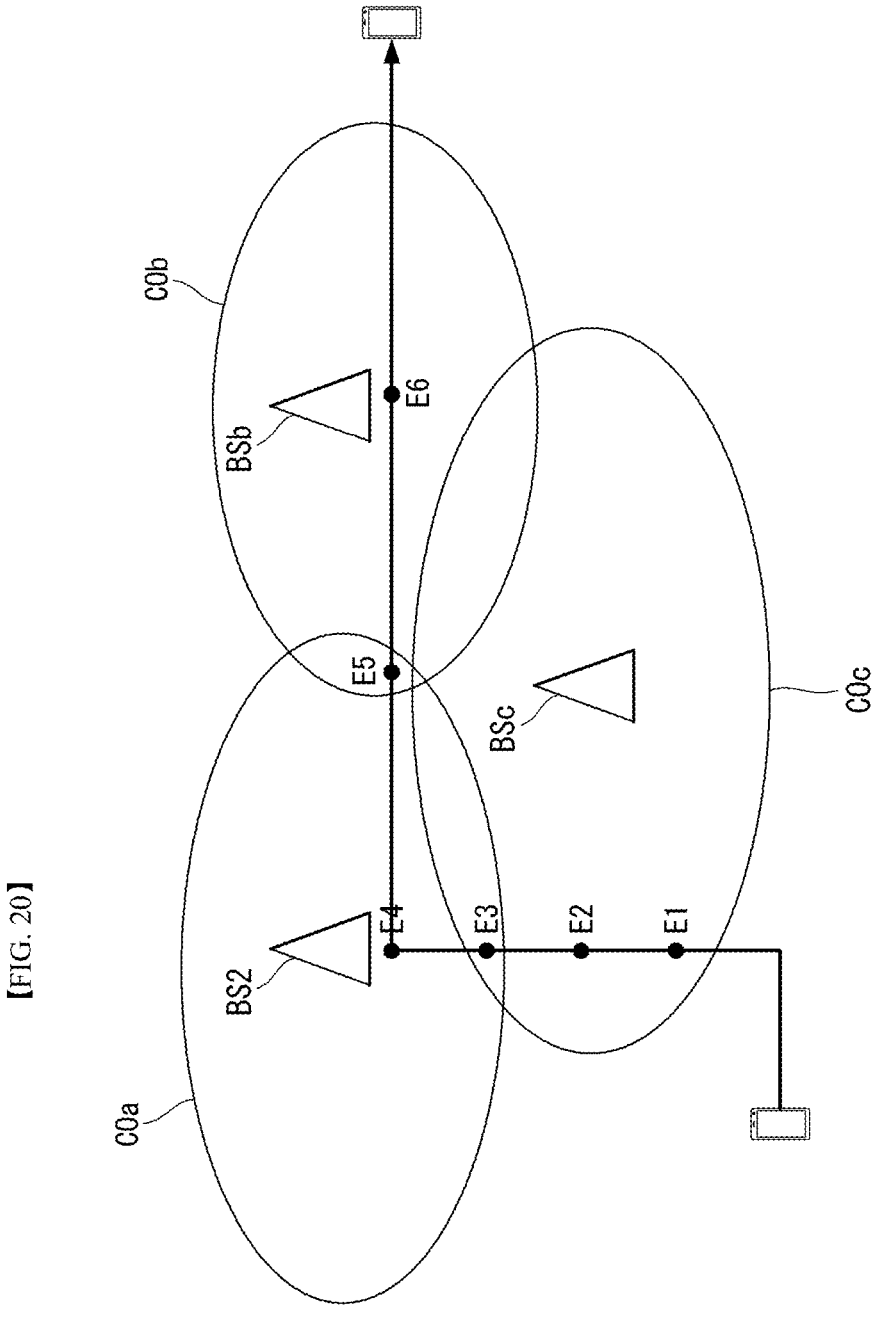

【FIG. 24】
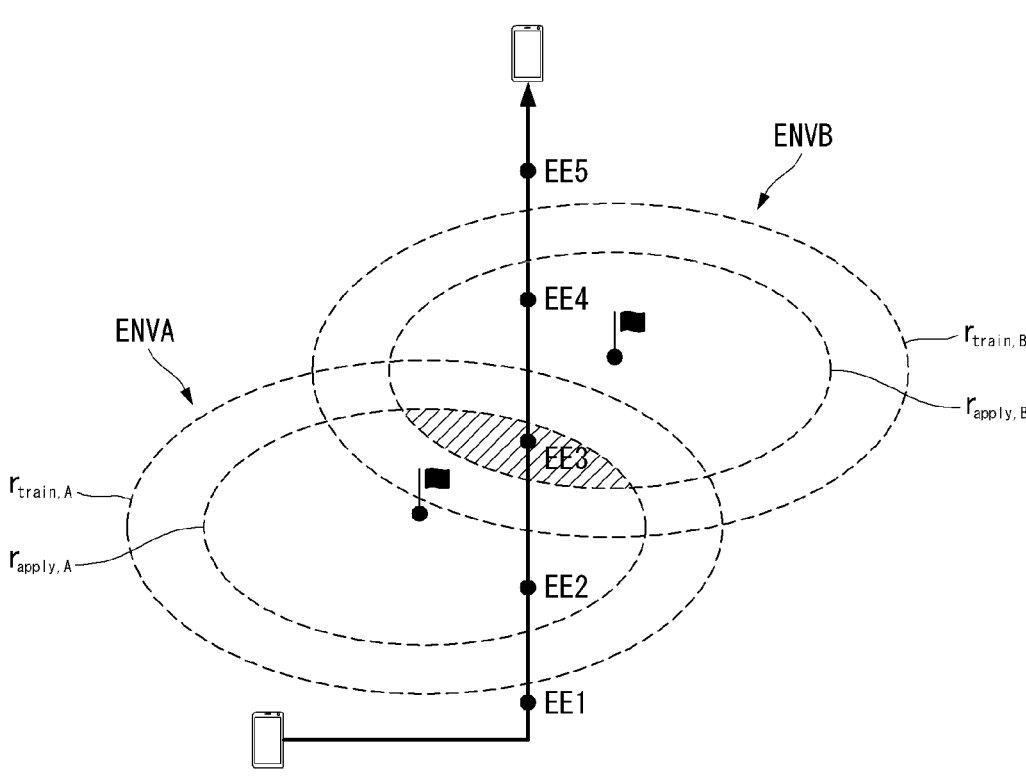

[FIG. 25]

| Place information | | Base station information | | | State |
|---|---|---|---|---|---|
| Center location | Learning radius | Cell ID | Freq. B | | |
| (pala,palo) | ra | A | fa | | Acquiring |
| (paala,paalo) | raa | A | fa | | Training |
| (pbla,pblo) | rb | B | fb | | Acquiring |
| ... | ... | ... | ... | | ... |
| (pxla,pxlo) | rx | X | fx | | Verifying |
| (pyla,pylo) | ry | Y | fy | | Applying |
| (pzla,pzlo) | rz | Z | fz | | Barred |

120
- Location information

130a
- BS List
- Connection state report

130b
- ML learning data

【FIG. 26】
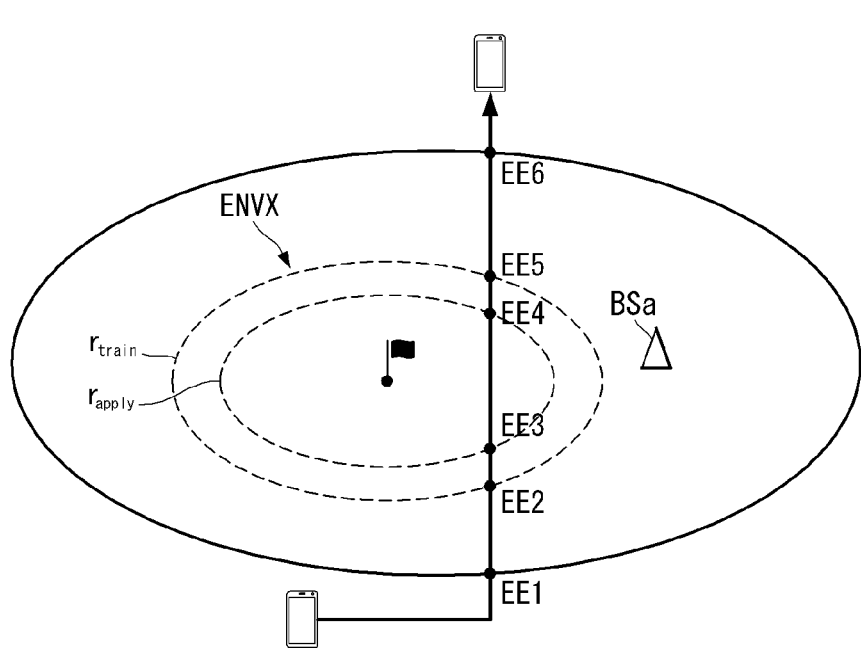

[FIG. 27]

| Place information | | Base station information | | | State |
|---|---|---|---|---|---|
| Center location | Learning radius | Cell ID | Freq. B | | |
| (pala,palo) | ra | A | fa | | Acquiring |
| (paala,paalo) | raa | A | fa | | Training |
| (pbla,pblo) | rb | B | fb | | Acquiring |
| ... | ... | ... | ... | | ... |
| (pxla,pxlo) | rx | X | fx | | Verifying |
| (pyla,pylo) | ry | Y | fy | | Applying |
| (pzla,pzlo) | rz | Z | fz | | Barred |

120 ⟷ 130

- Learning progress state
- Updated model
- Learning result

[FIG. 28]
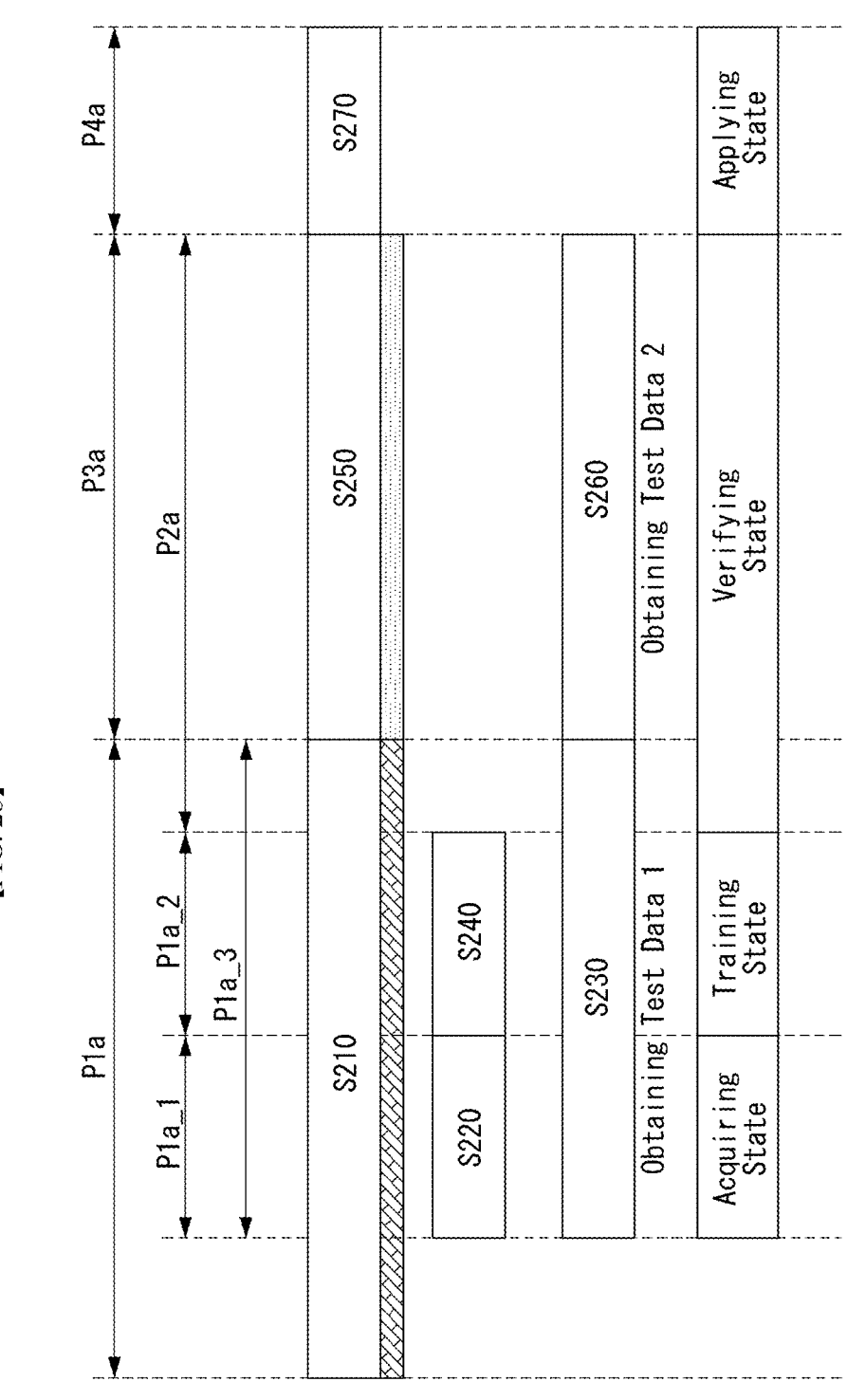

Figure 30:
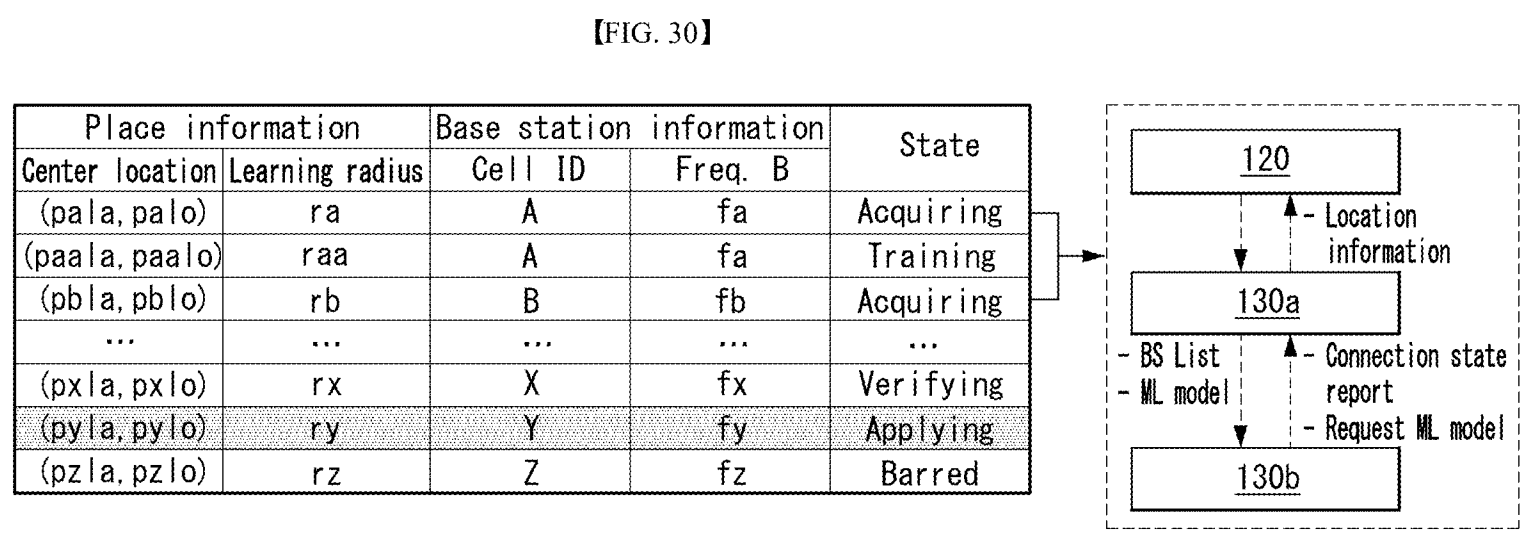

| Place information | | Base station information | | State |
|---|---|---|---|---|
| Center location | Learning radius | Cell ID | Freq. B | |
| (pala,palo) | ra | A | fa | Acquiring |
| (paala,paalo) | raa | A | fa | Training |
| (pbla,pblo) | rb | B | fb | Acquiring |
| ... | ... | ... | ... | ... |
| (pxla,pxlo) | rx | X | fx | Verifying |
| (pyla,pylo) | ry | Y | fy | Applying |
| (pzla,pzlo) | rz | Z | fz | Barred |

120
— Location information

130a
— BS List
— ML model
— Connection state report
— Request ML model

Figure 31:
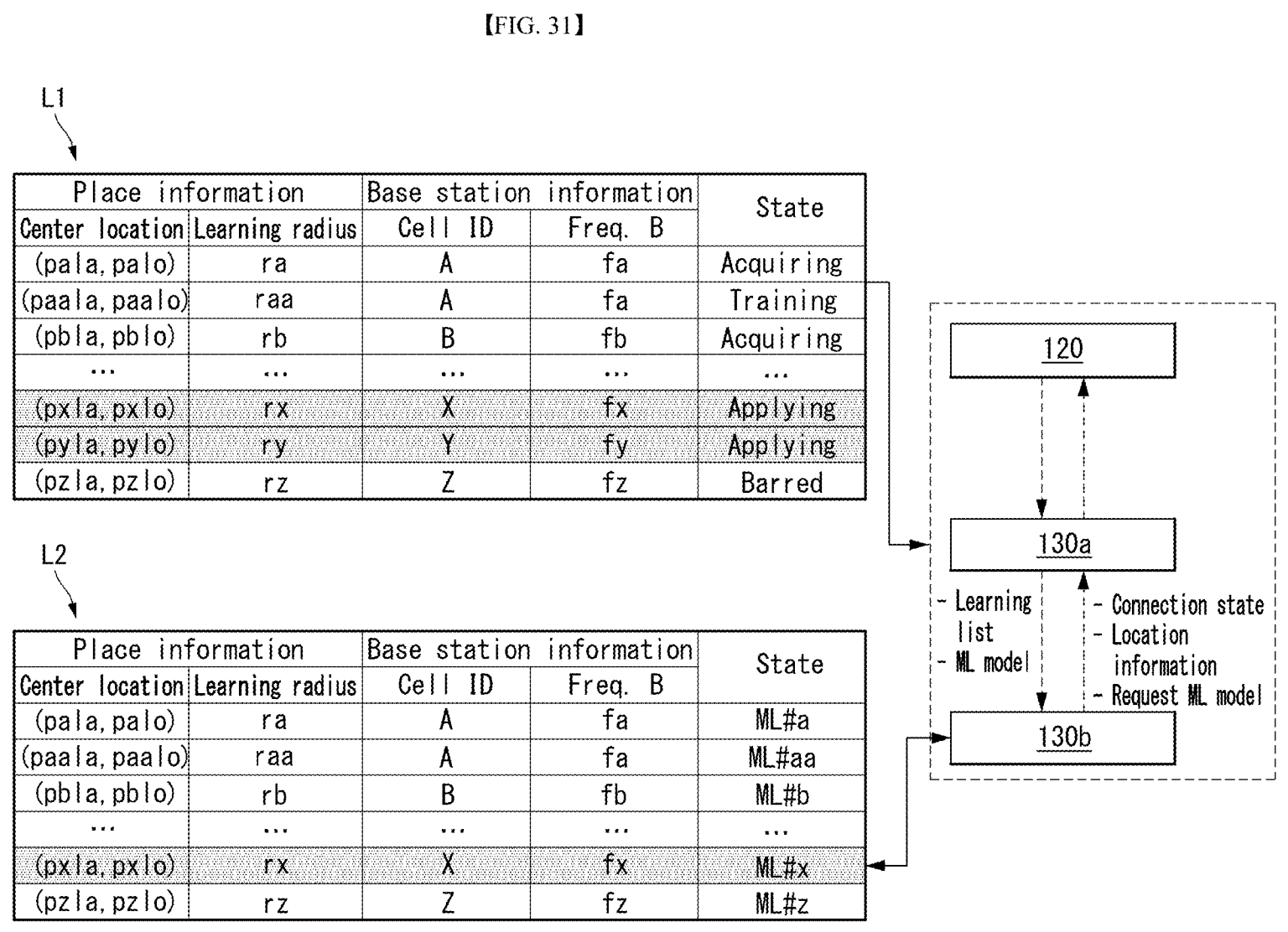

| Place information | | Base station information | | State |
|---|---|---|---|---|
| Center location | Learning radius | Cell ID | Freq. B | |
| (pala,palo) | ra | A | fa | Acquiring |
| (paala,paalo) | raa | A | fa | Training |
| (pbla,pblo) | rb | B | fb | Acquiring |
| ... | ... | ... | ... | ... |
| (pxla,pxlo) | rx | X | fx | Applying |
| (pyla,pylo) | ry | Y | fy | Applying |
| (pzla,pzlo) | rz | Z | fz | Barred |

L2

| Place information | | Base station information | | State |
|---|---|---|---|---|
| Center location | Learning radius | Cell ID | Freq. B | |
| (pala,palo) | ra | A | fa | ML#a |
| (paala,paalo) | raa | A | fa | ML#aa |
| (pbla,pblo) | rb | B | fb | ML#b |
| ... | ... | ... | ... | ... |
| (pxla,pxlo) | rx | X | fx | ML#x |
| (pzla,pzlo) | rz | Z | fz | ML#z |

120

130a

130b

- Connection state
- Location information
- Request ML model

- Learning list
- ML model

Figure 32:
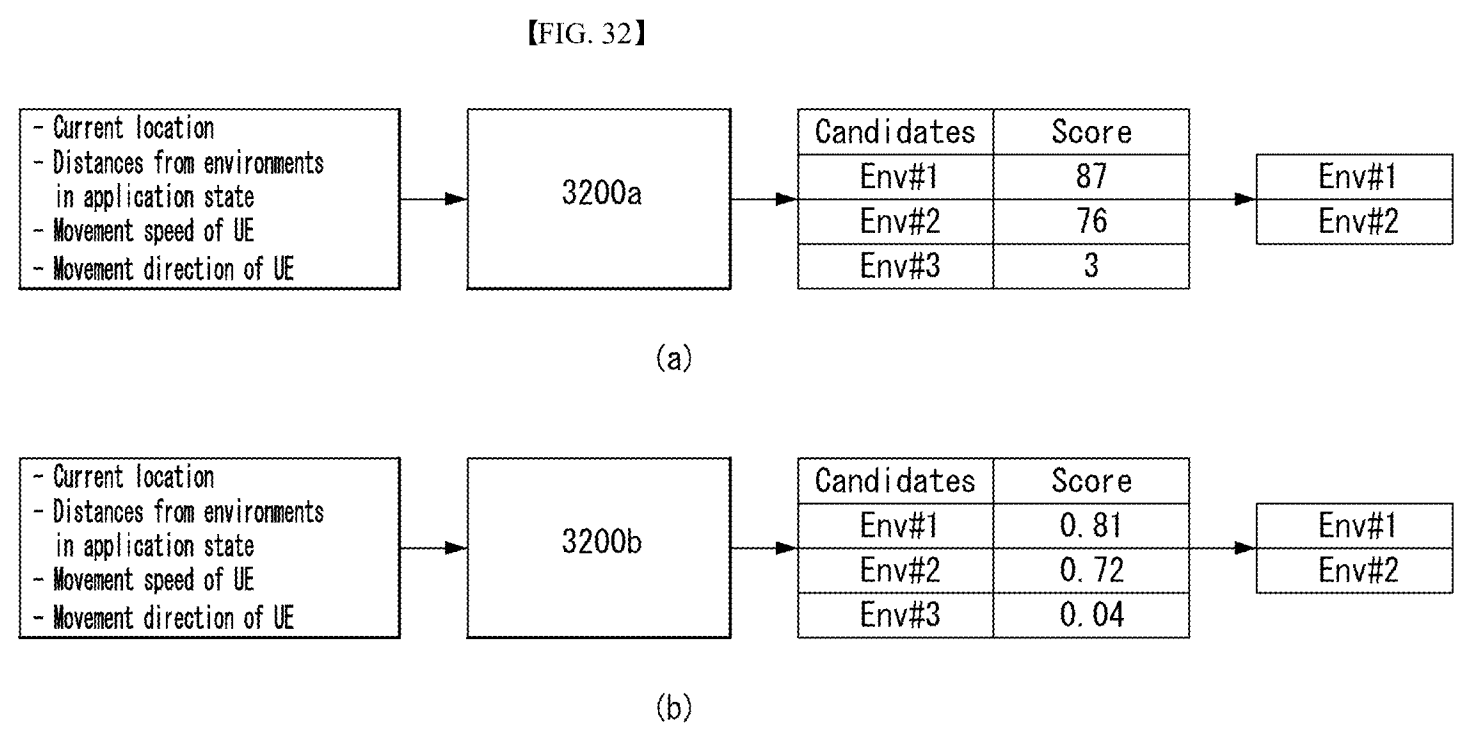

- Current location
- Distances from environments in application state
- Movement speed of UE
- Movement direction of UE

| Candidates | Score |
|------------|-------|
| Env#1 | 87 |
| Env#2 | 76 |
| Env#3 | 3 |

| Env#1 |
|-------|
| Env#2 |

(a)

3200b

- Current location
- Distances from environments in application state
- Movement speed of UE
- Movement direction of UE

| Candidates | Score |
|------------|-------|
| Env#1 | 0.81 |
| Env#2 | 0.72 |
| Env#3 | 0.04 |

| Env#1 |
|-------|
| Env#2 |

| Place information | | Base station information | | State |
|---|---|---|---|---|
| Center location | Learning radius | Cell ID | Freq. B | |
| (pala, palo) | ra | A | fa | Acquiring |
| (paala, paalo) | raa | A | fa | Training |
| (pbla, pblo) | rb | B | fb | Acquiring |
| ... | ... | ... | ... | ... |
| (pxla, pxlo) | rx | X | fx | Verifying |
| (pyla, pylo) | ry | Y | fy | Applying |
| (pzla, pzlo) | rz | Z | fz | Barred |

120

130a　← Request item deletion

| Place information | | Base station information | | State |
|---|---|---|---|---|
| Center location | Learning radius | Cell ID | Freq. B | |
| (pala, palo) | ra | A | fa | Acquiring |
| (paala, paalo) | raa | A | fa | Training |
| (pbla, pblo) | rb | B | fb | Acquiring |
| ... | ... | ... | ... | ... |
| (pxla, pxlo) | rx | X | fx | Verifying |
| (pyla, pylo) | ry | Y | fy | Applying |

⇩

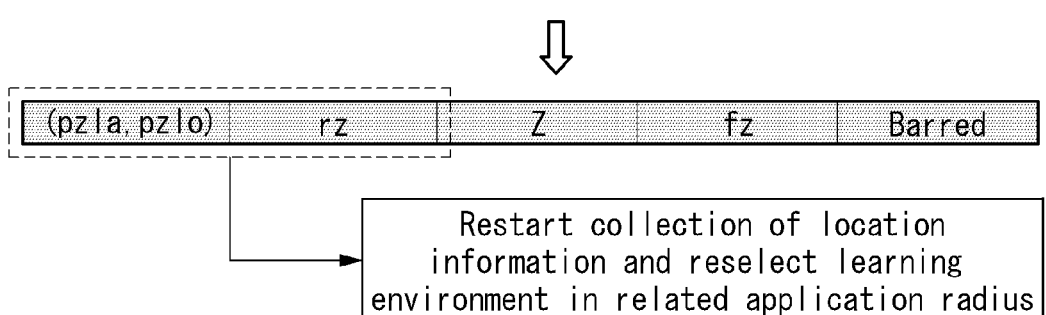

| (pzla, pzlo) | rz | Z | fz | Barred |
|---|---|---|---|---|

Restart collection of location
information and reselect learning
environment in related application radius 【FIG. 35】
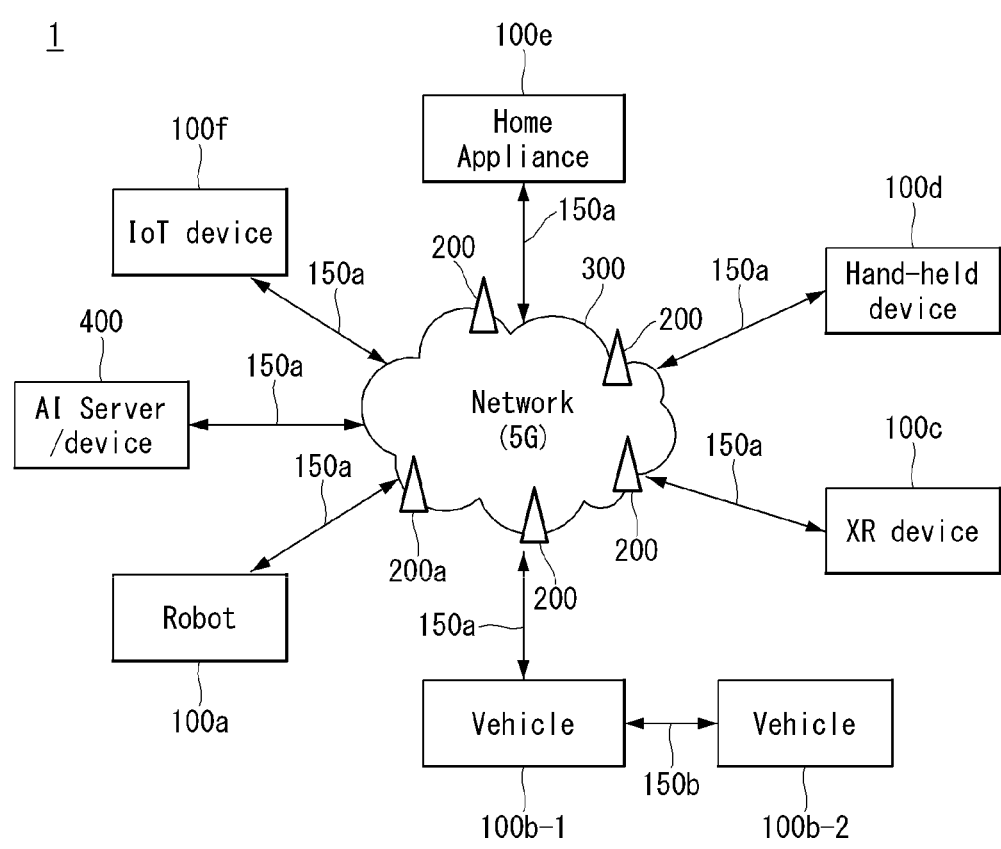

【FIG. 36】
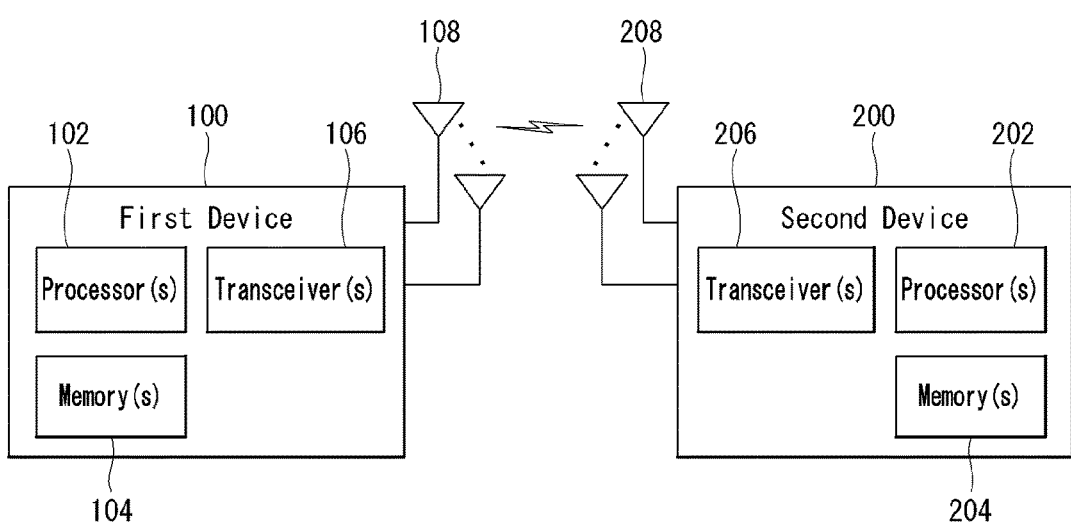

WIRELESS COMMUNICATION METHOD USING ON-DEVICE LEARNING-BASED MACHINE LEARNING NETWORK

CROSS-REFERENCE TO RELATED APPLICATIONS

This Application is the National Stage filing under 35 U.S.C. 371 of International Application No. PCT/KR2020/006661, filed on May 21, 2020, the contents of which are all hereby incorporated by reference herein in their entirety.

DISCLOSURE TITLE

Wireless communication method using on-device learning-based machine learning network

TECHNICAL FIELD

The present disclosure relates to a wireless communication method using an on-device learning-based machine learning network.

BACKGROUND ART

Currently, most communication systems are designed and optimized by approximating a physical channel to a statistical model and deriving a mathematical transmission/reception model based thereon.

This approach has shown relatively successful results so far, but it is difficult that due to the mismatch between the actual physical channel and the statistical model, and various assumptions and simplifications introduced to reduce complexity, the implemented communication system shows optimal performance in various real channel environments. Although it is possible to improve the channel model and the statistical and mathematical model of the communication system to better reflect the characteristics of the actual physical channel and to show optimal performance in the actual channel environment, but it is not easy to apply this approach to the actual system in high complexity and a trade-off relationship.

An increasingly complex communication system makes a mathematical model of a communication system capable of providing optimal performance in a real environment more difficult.

A new approach is needed to realize a flexible communication system that can be optimized for QoS (Quality of Service) required by various services in the channel environment each user faces.

DISCLOSURE

Technical Problem

The present disclosure provides meeting the needs and solving the problems.

Furthermore, the present disclosure provides implementing a wireless communication method using an on-device learning-based machine learning network that can optimize parameters in a development environment in an actual use environment in a machine learning (ML) based wireless communication system.

Furthermore, the present disclosure provides implementing a wireless communication method using an on-device learning-based machine learning network that can select a communication environment to be learned in order to collect learning data for optimizing parameters of a machine learning network.

Furthermore, the present disclosure provides implementing a wireless communication method using an on-device learning-based machine learning network that can monitor a performance change of the machine learning network by considering a variability in performance of the machine learning network.

Furthermore, the present disclosure provides implementing a wireless communication method using an on-device learning-based machine learning network that can provide a personalized communication service for each client device by utilizing on-device learning in addition to off-device learning outside the client device.

Technical Solution

A method performed by at least one processor of a terminal to train at least one machine learning network for communication through a multi-input-multi-output (MIMO) communication channel by using multiple transmitting antennas and multiple receiving antennas according to an embodiment of the present disclosure includes: generating a learning list based on one or more location samples collected while the terminal communicates through a network; acquiring training data for updating a first machine learning network to be applied to the receiver of the terminal to a second machine learning network when an event associated with any one of one or more first items included in the learning list is detected and updating the first machine learning network by using the training data.

Further, the generating of the learning list may include generating a connection list including one or more second items constituted by at least one of connection information and base station information acquired for each of one or more base stations, updating a candidate list based on the connection information of the connection list, selecting one or more items by applying a weight set in any one of one or more third items included in the candidate list and updating the selected item to a selection list, and generating one or more first items to be added to the learning list based on a location sample of the terminal related to at least one fourth item included in the selection list.

Further, the learning list may include place information and base station information distinguished by the first item.

Further, the place information may include spatial information regarding an application area to which a second machine learning network is completed, or a collection area for obtaining the training data.

Further, the event may indicate that it is detected the terminal enters or is positioned in the collection region.

Further, when it is detected that the terminal is positioned in the application region, the collection of the location sample may be stopped.

Further, the generating of the learning list may include acquiring the location sample of the terminal when the terminal enters the collection region, determining one or more communication environments by applying a clustering algorithm to the location samples when the number of acquired location samples is equal to or more than a predetermined number, and setting the one or more determined communication environments as each item of the learning list.

Further, the method may further include: confirming a machine learning network to be applied in the application region when entering the application region; and controlling a receiver based on the confirmed machine learning network.

Further, the method may further include: selecting any one of first items corresponding to two or more application regions when the terminal is positioned in two or more application regions; confirming the machine learning network to be applied in the selected first item; and controlling the receiver based on the confirmed machine learning network.

The selecting any one of the first items may include comparing radii of two or more application regions, and selecting any one of two or more first items based on the comparison.

The machine learning network may include at least one of a Deep Neural Network (DNN), a Convolutional Neural Network (CNN), or a Recurrent Neural Network (RNN) including parametric multiplications, additions, and non-linearities.

The training data may represent a reception related parameter.

Further, the reception related parameter may include at least one of a signal to noise ratio (SNR), a received signal strength indication (RSSI), a reference signal received power (RSRP), or a reference signal reception quality.

Further, the method may further include: comparing a first performance indicator measured by a first network before update and a second performance indicator measured by a second network after the update while updating the machine learning network; and selecting any one of the first and second networks based on the comparison.

Further, the method may further include: comparing a first performance indicator measured by applying the first network before the update and a second performance indicator measured by applying the second network after the update when the machine learning network is updated; and selecting any one of the first and second networks based on the comparison.

The method may further include when the reliability of the comparison is less than a set reference value, measuring and comparing the first and second performance indicators again.

The learning list may include state information for each first item, the state information may include at least one of an acquisition state, a training state, a verification state, an application state, or a barred state, and in the case of the machine learning network, at least one of collection of the training data, and learning, verification, application, or barring of the machine learning network may be determined based on the state information.

The method may further include: when generalization of the update of the machine learning network is unsuccessful, increasing the number of failures corresponding to the machine learning network; and when the number of failures exceeds a set maximum number of times, (i) initializing the updated machine learning network to the machine learning network before the update and (ii) switching the state of the first item to the barred state.

A terminal to which a machine learning based receiver is applied in a wireless communication system according to another embodiment of the present disclosure includes: a transceiver; at least one processor; and at least one memory connected to at least one processor and storing instructions, in which when the instructions are executed by at least one processor, the instructions allow at least one processor to support operations for communication through an MIMO communication channel by using multiple receiving antennas, and the operations include an operation of generating a learning list based on one or more location samples collected while the terminal communicates through a network, acquiring training data for learning the machine learning network applied to the receiver of the terminal when an event related to any one of one or more first items included in the learning list is detected, and updating the machine learning network by using the training data.

Advantageous Effects

Effects of a wireless communication method using an on-device learning-based machine learning network according to an embodiment of the present disclosure will be described as follows.

According to the present disclosure, parameters in a development environment can be optimized in an actual use environment in a machine learning (ML) based wireless communication system.

Furthermore, according to the present disclosure, a performance change of the machine learning network can be monitored by considering a variability in performance of the machine learning network.

Furthermore, according to the present disclosure, a personalized communication service can be provided for each client device by utilizing on-device learning in addition to off-device learning outside the client device.

Effects which can be obtained in the present disclosure are not limited to the aforementioned advantages and other unmentioned effects will be clearly understood by those skilled in the art from the following description.

DESCRIPTION OF DRAWINGS

Accompanying drawings included as a part of the detailed description for helping understand the present disclosure provide embodiments of the present disclosure and are provided to describe technical features of the present disclosure with the detailed description.

FIG. 1 is a block diagram of a wireless communication system to which methods proposed in the disclosure are applicable.

FIG. 2 shows an example of a signal transmission/reception method in a wireless communication system.

FIG. 3 shows an example of basic operations of an user equipment and a 5G network in a 5G communication system.

FIG. 4 is a block diagram of an AI device according to an embodiment of the present disclosure.

FIG. 5 is a diagram illustrating an example of a DL BM procedure using SSB and CSI FIG. 6 is a flowchart illustrating an example of a DL BM procedure using an SSB.

FIG. 7 is a diagram illustrating an example of a DL BM procedure using a CSI-RS.

FIG. 8 is a flowchart illustrating an example of a received beam determination process of a UE.

FIG. 9 is a flowchart illustrating an example of a method of determining, by a base station, a transmission beam.

FIG. 10 is a diagram illustrating an example of resource allocation in time and frequency domains related to the operation of FIG. 7.

FIG. 11 illustrates an example of an uplink beam management procedure using a Sounding Reference Signal (SRS).

FIG. 12 is a flowchart showing an example of an uplink beam management procedure using the SRS.

FIG. 13 is a flowchart showing an example of a CSI-related procedure.

FIG. 14 exemplarily illustrates a communication system according to an embodiment of the present disclosure.

FIG. 15 is a flowchart of a method according to an embodiment of the present disclosure.

FIG. 16 is a diagram for exemplarily describing a communication environment according to an embodiment of the present disclosure.

FIGS. 17 to 24 are diagrams for exemplarily describing a learning list generating method according to an embodiment of the present disclosure.

FIGS. 25 and 26 are diagrams for exemplarily describing a training data collecting method according to an embodiment of the present disclosure.

FIG. 27 is a diagram for exemplarily describing a machine learning network update method according to an embodiment of the present disclosure.

FIGS. 28 and 29 are diagrams for exemplarily describing a verification method of a machine learning network according to an embodiment of the present disclosure.

FIGS. 30 to 32 are diagrams for exemplarily describing an application method of the machine learning network according to an embodiment of the present disclosure.

FIGS. 33 and 34 are diagrams for exemplarily describing a management method of an item in a locked state according to an embodiment of the present disclosure.

FIG. 35 illustrates a communication system applied to the present disclosure.

FIG. 36 illustrates a wireless device applicable to the present disclosure.

Figure 21:
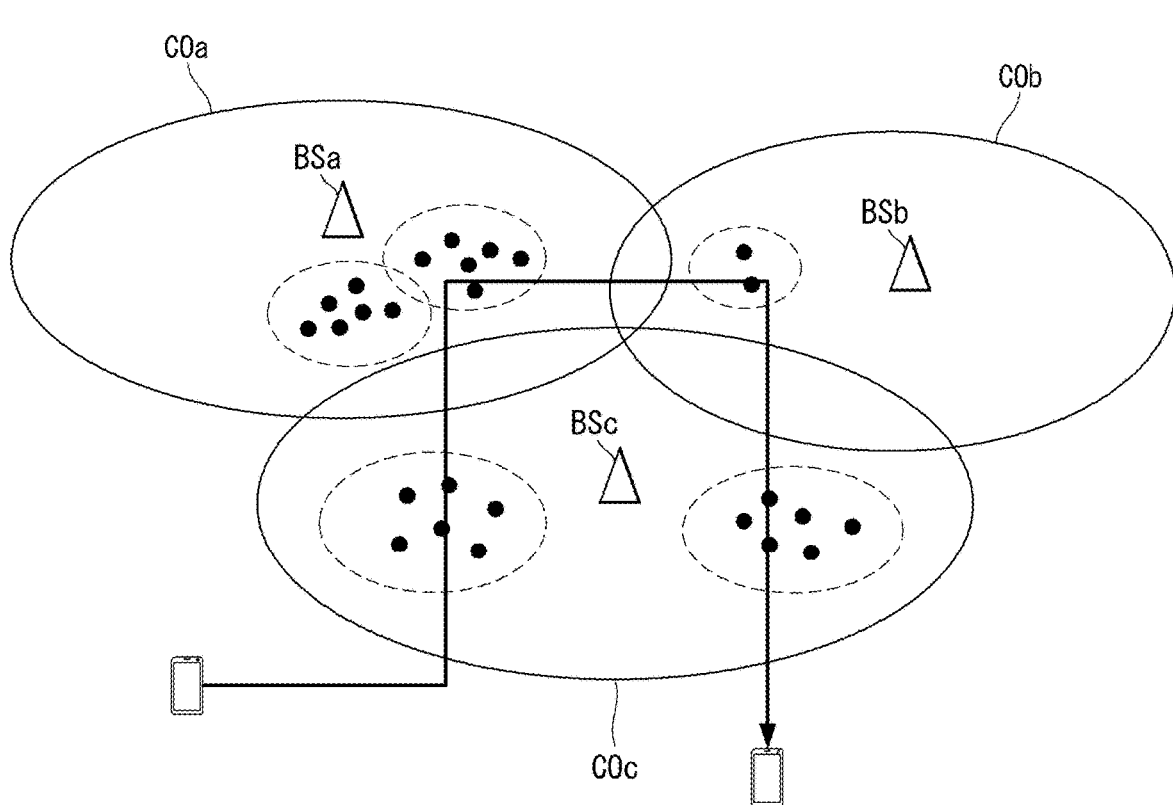

The accompany drawings, which are included to provide a further understanding of the present disclosure and are incorporated on and constitute a part of this specification illustrate embodiments of the present disclosure and together with the description serve to explain the principles of the present disclosure.

MODE FOR DISCLOSURE

Hereinafter, embodiments of the disclosure will be described in detail with reference to the attached drawings. The same or similar components are given the same reference numbers and redundant description thereof is omitted. The suffixes "module" and "unit" of elements herein are used for convenience of description and thus can be used interchangeably and do not have any distinguishable meanings or functions. Further, in the following description, if a detailed description of known techniques associated with the present disclosure would unnecessarily obscure the gist of the present disclosure, detailed description thereof will be omitted. In addition, the attached drawings are provided for easy understanding of embodiments of the disclosure and do not limit technical spirits of the disclosure, and the embodiments should be construed as including all modifications, equivalents, and alternatives falling within the spirit and scope of the embodiments.

While terms, such as "first", "second", etc., may be used to describe various components, such components must not be limited by the above terms. The above terms are used only to distinguish one component from another.

When an element is "coupled" or "connected" to another element, it should be understood that a third element may be present between the two elements although the element may be directly coupled or connected to the other element. When an element is "directly coupled" or "directly connected" to another element, it should be understood that no element is present between the two elements.

The singular forms are intended to include the plural forms as well, unless the context clearly indicates otherwise.

In addition, in the specification, it will be further understood that the terms "comprise" and "include" specify the presence of stated features, integers, steps, operations, elements, components, and/or combinations thereof, but do not preclude the presence or addition of one or more other features, integers, steps, operations, elements, components, and/or combinations.

Hereinafter, 5G communication (5th generation mobile communication) required by an apparatus requiring AI processed information and/or an AI processor will be described through paragraphs A through G.

A. Example of Block Diagram of UE and 5G Network

FIG. 1 is a block diagram of a wireless communication system to which methods proposed in the disclosure are applicable.

Referring to FIG. 1, a device (AI device) including an AI module is defined as a first communication device (910 of FIG. 1), and a processor 911 can perform detailed AI operation.

A 5G network including another device (AI server) communicating with the AI device is defined as a second communication device (920 of FIG. 1), and a processor 921 can perform detailed AI operations.

The 5G network may be represented as the first communication device and the AI device may be represented as the second communication device.

For example, the first communication device or the second communication device may be a base station, a network node, a transmission terminal, a reception terminal, a wireless device, a wireless communication device, an autonomous device, or the like.

For example, the first communication device or the second communication device may be a base station, a network node, a transmission terminal, a reception terminal, a wireless device, a wireless communication device, a vehicle, a vehicle having an autonomous function, a connected car, a drone (Unmanned Aerial Vehicle, UAV), and AI (Artificial Intelligence) module, a robot, an AR (Augmented Reality) device, a VR (Virtual Reality) device, an MR (Mixed Reality) device, a hologram device, a public safety device, an MTC device, an IoT device, a medical device, a Fin Tech device (or financial device), a security device, a climate/environment device, a device associated with 5G services, or other devices associated with the fourth industrial revolution field. For example, a terminal or user equipment (UE) may include a cellular phone, a smart phone, a laptop computer, a digital broadcast terminal, personal digital assistants (PDAs), a portable multimedia player (PMP), a navigation device, a slate PC, a tablet PC, an ultrabook, a wearable device (e.g., a smartwatch, a smart glass and a head mounted display (HMD)), etc. For example, the HMD may be a display device worn on the head of a user. For example, the HMD may be used to realize VR, AR or MR. For example, the drone may be a flying object that flies by wireless control signals without a person therein. For example, the VR device may include a device that implements objects or backgrounds of a virtual world. For example, the AR device may include a device that connects and implements objects or background of a virtual world to objects, backgrounds, or the like of a real world. For example, the MR device may include a device that unites and implements objects or background of a virtual world to objects, backgrounds, or the like of a real world. For example, the hologram device may include a device that implements 360-degree 3D images by recording and playing 3D information using the interference phenomenon of light that is generated by two lasers meeting each other which is called holography. For example, the public safety device may include an image repeater or an imaging device that can be worn on the body of a user. For example, the MTC device and the IoT device may be devices that do not require direct interference or operation by a person. For example, the MTC device and the IoT device may include a smart meter, a bending machine, a thermometer, a smart bulb, a door lock, various sensors, or the like. For example, the medical device may be a device that is used to diagnose, treat, attenuate, remove, or prevent diseases. For example, the medical device may be a device that is used to diagnose, treat, attenuate, or correct injuries or disorders. For example, the medial device may be a device that is used to examine, replace, or change structures or functions. For example, the medical device may be a device that is used to control pregnancy. For example, the medical device may include a device for medical treatment, a device for operations, a device for (external) diagnose, a hearing aid, an operation device, or the like. For example, the security device may be a device that is installed to prevent a danger that is likely to occur and to keep safety. For example, the security device may be a camera, a CCTV, a recorder, a black box, or the like. For example, the Fin Tech device may be a device that can provide financial services such as mobile payment.

Referring to FIG. 1, the first communication device 910 and the second communication device 920 include processors 911 and 921, memories 914 and 924, one or more Tx/Rx radio frequency (RF) modules 915 and 925, Tx processors 912 and 922, Rx processors 913 and 923, and antennas 916 and 926. The Tx/Rx module is also referred to as a transceiver. Each Tx/Rx module 915 transmits a signal through each antenna 926. The processor implements the aforementioned functions, processes and/or methods. The processor 921 may be related to the memory 924 that stores program code and data. The memory may be referred to as a computer-readable medium. More specifically, the Tx processor 912 implements various signal processing functions with respect to L1 (i.e., physical layer) in DL (communication from the first communication device to the second communication device). The Rx processor implements various signal processing functions of L1 (i.e., physical layer).

UL (communication from the second communication device to the first communication device) is processed in the first communication device 910 in a way similar to that described in association with a receiver function in the second communication device 920. Each Tx/Rx module 925 receives a signal through each antenna 926. Each Tx/Rx module provides RF carriers and information to the Rx processor 923. The processor 921 may be related to the memory 924 that stores program code and data. The memory may be referred to as a computer-readable medium.

B. Signal Transmission/Reception Method in Wireless Communication System

FIG. 2 is a diagram showing an example of a signal transmission/reception method in a wireless communication system.

Referring to FIG. 2, when a UE is powered on or enters a new cell, the UE performs an initial cell search operation such as synchronization with a BS (S201). For this operation, the UE can receive a primary synchronization channel (P-SCH) and a secondary synchronization channel (S-SCH) from the BS to synchronize with the BS and acquire information such as a cell ID. In LTE and NR systems, the P-SCH and S-SCH are respectively called a primary synchronization signal (PSS) and a secondary synchronization signal (SSS). After initial cell search, the UE can acquire broadcast information in the cell by receiving a physical broadcast channel (PBCH) from the BS. Further, the UE can receive a downlink reference signal (DL RS) in the initial cell search step to check a downlink channel state. After initial cell search, the UE can acquire more detailed system information by receiving a physical downlink shared channel (PDSCH) according to a physical downlink control channel (PDCCH) and information included in the PDCCH (S202).

Meanwhile, when the UE initially accesses the BS or has no radio resource for signal transmission, the UE can perform a random access procedure (RACH) for the BS (steps S203 to S206). To this end, the UE can transmit a specific sequence as a preamble through a physical random access channel (PRACH) (S203 and S205) and receive a random access response (RAR) message for the preamble through a PDCCH and a corresponding PDSCH (S204 and S206). In the case of a contention-based RACH, a contention resolution procedure may be additionally performed.

After the UE performs the above-described process, the UE can perform PDCCH/PDSCH reception (S207) and physical uplink shared channel (PUSCH)/physical uplink control channel (PUCCH) transmission (S208) as normal uplink/downlink signal transmission processes. Particularly, the UE receives downlink control information (DCI) through the PDCCH. The UE monitors a set of PDCCH candidates in monitoring occasions set for one or more control element sets (CORESET) on a serving cell according to corresponding search space configurations. A set of PDCCH candidates to be monitored by the UE is defined in terms of search space sets, and a search space set may be a common search space set or a UE-specific search space set. CORESET includes a set of (physical) resource blocks having a duration of one to three OFDM symbols. A network can configure the UE such that the UE has a plurality of CORESETs. The UE monitors PDCCH candidates in one or more search space sets. Here, monitoring means attempting decoding of PDCCH candidate(s) in a search space. When the UE has successfully decoded one of PDCCH candidates in a search space, the UE determines that a PDCCH has been detected from the PDCCH candidate and performs PDSCH reception or PUSCH transmission on the basis of DCI in the detected PDCCH. The PDCCH can be used to schedule DL transmissions over a PDSCH and UL transmissions over a PUSCH. Here, the DCI in the PDCCH includes downlink assignment (i.e., downlink grant (DL grant)) related to a physical downlink shared channel and including at least a modulation and coding format and resource allocation information, or an uplink grant (UL grant) related to a physical uplink shared channel and including a modulation and coding format and resource allocation information.

An initial access (IA) procedure in a 5G communication system will be additionally described with reference to FIG. 2.

The UE can perform cell search, system information acquisition, beam alignment for initial access, and DL measurement on the basis of an SSB. The SSB is interchangeably used with a synchronization signal/physical broadcast channel (SS/PBCH) block.

The SSB includes a PSS, an SSS and a PBCH. The SSB is configured in four consecutive OFDM symbols, and a PSS, a PBCH, an SSS/PBCH or a PBCH is transmitted for each OFDM symbol. Each of the PSS and the SSS includes one OFDM symbol and 127 subcarriers, and the PBCH includes 3 OFDM symbols and 576 subcarriers.

Cell search refers to a process in which a UE acquires time/frequency synchronization of a cell and detects a cell identifier (ID) (e.g., physical layer cell ID (PCI)) of the cell. The PSS is used to detect a cell ID in a cell ID group and the SSS is used to detect a cell ID group. The PBCH is used to detect an SSB (time) index and a half-frame.

There are 336 cell ID groups and there are 3 cell IDs per cell ID group. A total of 1008 cell IDs are present. Information on a cell ID group to which a cell ID of a cell belongs is provided/acquired through an SSS of the cell, and information on the cell ID among 336 cell ID groups is provided/acquired through a PSS.

The SSB is periodically transmitted in accordance with SSB periodicity. A default SSB periodicity assumed by a UE during initial cell search is defined as 20 ms. After cell access, the SSB periodicity can be set to one of {5 ms, 10 ms, 20 ms, 40 ms, 80 ms, 160 ms} by a network (e.g., a BS).

Next, acquisition of system information (SI) will be described.

SI is divided into a master information block (MIB) and a plurality of system information blocks (SIBs). SI other than the MIB may be referred to as remaining minimum system information. The MIB includes information/parameter for monitoring a PDCCH that schedules a PDSCH carrying SIB1 (System InformationBlock1) and is transmitted by a BS through a PBCH of an SSB. SIB1 includes information related to availability and scheduling (e.g., transmission periodicity and SI-window size) of the remaining SIBs (hereinafter, SIBx, x is an integer equal to or greater than 2). SiBx is included in an SI message and transmitted over a PDSCH. Each SI message is transmitted within a periodically generated time window (i.e., SI-window).

A random access (RA) procedure in a 5G communication system will be additionally described with reference to FIG. 2.

A random access procedure is used for various purposes. For example, the random access procedure can be used for network initial access, handover, and UE-triggered UL data transmission. A UE can acquire UL synchronization and UL transmission resources through the random access procedure. The random access procedure is classified into a contention-based random access procedure and a contention-free random access procedure. A detailed procedure for the contention-based random access procedure is as follows.

A UE can transmit a random access preamble through a PRACH as Msg1 of a random access procedure in UL. Random access preamble sequences having different two lengths are supported. A long sequence length 839 is applied to subcarrier spacings of 1.25 kHz and 5 kHz and a short sequence length 139 is applied to subcarrier spacings of 15 kHz, 30 kHz, 60 kHz and 120 kHz.

When a BS receives the random access preamble from the UE, the BS transmits a random access response (RAR) message (Msg2) to the UE. A PDCCH that schedules a PDSCH carrying a RAR is CRC masked by a random access (RA) radio network temporary identifier (RNTI) (RA-RNTI) and transmitted. Upon detection of the PDCCH masked by the RA-RNTI, the UE can receive a RAR from the PDSCH scheduled by DCI carried by the PDCCH. The UE checks whether the RAR includes random access response information with respect to the preamble transmitted by the UE, that is, Msg1. Presence or absence of random access information with respect to Msg1 transmitted by the UE can be determined according to presence or absence of a random access preamble ID with respect to the preamble transmitted by the UE. If there is no response to Msg1, the UE can retransmit the RACH preamble less than a predetermined number of times while performing power ramping. The UE calculates PRACH transmission power for preamble retransmission on the basis of most recent pathloss and a power ramping counter.

The UE can perform UL transmission through Msg3 of the random access procedure over a physical uplink shared channel on the basis of the random access response information. Msg3 can include an RRC connection request and a UE ID. The network can transmit Msg4 as a response to Msg3, and Msg4 can be handled as a contention resolution message on DL. The UE can enter an RRC connected state by receiving Msg4.

C. Beam Management (BM) Procedure of 5G Communication System

A BM procedure can be divided into (1) a DL MB procedure using an SSB or a CSI-RS and (2) a UL BM procedure using a sounding reference signal (SRS). In addition, each BM procedure can include Tx beam swiping for determining a Tx beam and Rx beam swiping for determining an Rx beam.

The DL BM procedure using an SSB will be described.

Configuration of a beam report using an SSB is performed when channel state information (CSI)/beam is configured in RRC_CONNECTED.

A UE receives a CSI-ResourceConfig IE including CSI-SSB-ResourceSetList for SSB resources used for BM from a BS. The RRC parameter "csi-SSB-ResourceSetList" represents a list of SSB resources used for beam management and report in one resource set. Here, an SSB resource set can be set as {SSBx1, SSBx2, SSBx3, SSBx4, . . . }. An SSB index can be defined in the range of 0 to 63.

The UE receives the signals on SSB resources from the BS on the basis of the CSI-SSB-ResourceSetList.

When CSI-RS reportConfig with respect to a report on SSBRI and reference signal received power (RSRP) is set, the UE reports the best SSBRI and RSRP corresponding thereto to the BS. For example, when reportQuantity of the CSI-RS reportConfig IE is set to 'ssb-Index-RSRP', the UE reports the best SSBRI and RSRP corresponding thereto to the BS.

When a CSI-RS resource is configured in the same OFDM symbols as an SSB and 'QCL-TypeD' is applicable, the UE can assume that the CSI-RS and the SSB are quasi co-located (QCL) from the viewpoint of 'QCL-TypeD'. Here, QCL-TypeD may mean that antenna ports are quasi co-located from the viewpoint of a spatial Rx parameter. When the UE receives signals of a plurality of DL antenna ports in a QCL-TypeD relationship, the same Rx beam can be applied.

Next, a DL BM procedure using a CSI-RS will be described.

An Rx beam determination (or refinement) procedure of a UE and a Tx beam swiping procedure of a BS using a CSI-RS will be sequentially described. A repetition parameter is set to 'ON' in the Rx beam determination procedure of a UE and set to 'OFF' in the Tx beam swiping procedure of a BS.

First, the Rx beam determination procedure of a UE will be described.

The UE receives an NZP CSI-RS resource set IE including an RRC parameter with respect to 'repetition' from a BS through RRC signaling. Here, the RRC parameter 'repetition' is set to 'ON'.

The UE repeatedly receives signals on resources in a CSI-RS resource set in which the RRC parameter 'repetition' is set to 'ON' in different OFDM symbols through the same Tx beam (or DL spatial domain transmission filters) of the BS.

The UE determines an RX beam thereof.

The UE skips a CSI report. That is, the UE can skip a CSI report when the RRC parameter 'repetition' is set to 'ON'.

Next, the Tx beam determination procedure of a BS will be described.

A UE receives an NZP CSI-RS resource set IE including an RRC parameter with respect to 'repetition' from the BS through RRC signaling. Here, the RRC parameter 'repetition' is related to the Tx beam swiping procedure of the BS when set to 'OFF'.

The UE receives signals on resources in a CSI-RS resource set in which the RRC parameter 'repetition' is set to 'OFF' in different DL spatial domain transmission filters of the BS.

The UE selects (or determines) a best beam.

The UE reports an ID (e.g., CRI) of the selected beam and related quality information (e.g., RSRP) to the BS. That is, when a CSI-RS is transmitted for BM, the UE reports a CRI and RSRP with respect thereto to the BS.

Next, the UL BM procedure using an SRS will be described.

A UE receives RRC signaling (e.g., SRS-Config IE) including a (RRC parameter) purpose parameter set to 'beam management" from a BS. The SRS-Config IE is used to set SRS transmission. The SRS-Config IE includes a list of SRS-Resources and a list of SRS-ResourceSets. Each SRS resource set refers to a set of SRS-resources.

The UE determines Tx beamforming for SRS resources to be transmitted on the basis of SRS-SpatialRelation Info included in the SRS-Config IE. Here, SRS-SpatialRelation Info is set for each SRS resource and indicates whether the same beamforming as that used for an SSB, a CSI-RS or an SRS will be applied for each SRS resource.

When SRS-SpatialRelationInfo is set for SRS resources, the same beamforming as that used for the SSB, CSI-RS or SRS is applied. However, when SRS-SpatialRelationInfo is not set for SRS resources, the UE arbitrarily determines Tx beamforming and transmits an SRS through the determined Tx beamforming.

Next, a beam failure recovery (BFR) procedure will be described.

In a beamformed system, radio link failure (RLF) may frequently occur due to rotation, movement or beamforming blockage of a UE. Accordingly, NR supports BFR in order to prevent frequent occurrence of RLF. BFR is similar to a radio link failure recovery procedure and can be supported when a UE knows new candidate beams. For beam failure detection, a BS configures beam failure detection reference signals for a UE, and the UE declares beam failure when the number of beam failure indications from the physical layer of the UE reaches a threshold set through RRC signaling within a period set through RRC signaling of the BS. After beam failure detection, the UE triggers beam failure recovery by initiating a random access procedure in a PCell and performs beam failure recovery by selecting a suitable beam. (When the BS provides dedicated random access resources for certain beams, these are prioritized by the UE). Completion of the aforementioned random access procedure is regarded as completion of beam failure recovery.

D. URLLC (Ultra-Reliable and Low Latency Communication)

URLLC transmission defined in NR can refer to (1) a relatively low traffic size, (2) a relatively low arrival rate, (3) extremely low latency requirements (e.g., 0.5 and 1 ms), (4) relatively short transmission duration (e.g., 2 OFDM symbols), (5) urgent services/messages, etc. In the case of UL, transmission of traffic of a specific type (e.g., URLLC) needs to be multiplexed with another transmission (e.g., eMBB) scheduled in advance in order to satisfy more stringent latency requirements. In this regard, a method of providing information indicating preemption of specific resources to a UE scheduled in advance and allowing a URLLC UE to use the resources for UL transmission is provided.

NR supports dynamic resource sharing between eMBB and URLLC. eMBB and URLLC services can be scheduled on non-overlapping time/frequency resources, and URLLC transmission can occur in resources scheduled for ongoing eMBB traffic. An eMBB UE may not ascertain whether PDSCH transmission of the corresponding UE has been partially punctured and the UE may not decode a PDSCH due to corrupted coded bits. In view of this, NR provides a preemption indication. The preemption indication may also be referred to as an interrupted transmission indication.

With regard to the preemption indication, a UE receives DownlinkPreemption IE through RRC signaling from a BS. When the UE is provided with DownlinkPreemption IE, the UE is configured with INT-RNTI provided by a parameter int-RNTI in DownlinkPreemption IE for monitoring of a PDCCH that conveys DCI format 2_1. The UE is additionally configured with a corresponding set of positions for fields in DCI format 2_1 according to a set of serving cells and positionInDCI by INT-ConfigurationPerServing Cell including a set of serving cell indexes provided by serving-CellID, configured having an information payload size for DCI format 2_1 according to dci-Payloadsize, and configured with indication granularity of time-frequency resources according to timeFrequencySect.

The UE receives DCI format 2_1 from the BS on the basis of the DownlinkPreemption IE.

When the UE detects DCI format 2_1 for a serving cell in a configured set of serving cells, the UE can assume that there is no transmission to the UE in PRBs and symbols indicated by the DCI format 2_1 in a set of PRBs and a set of symbols in a last monitoring period before a monitoring period to which the DCI format 2_1 belongs. For example, the UE assumes that a signal in a time-frequency resource indicated according to preemption is not DL transmission scheduled therefor and decodes data on the basis of signals received in the remaining resource region.

E. mMTC (Massive MTC)

mMTC (massive Machine Type Communication) is one of 5G scenarios for supporting a hyper-connection service providing simultaneous communication with a large number of UEs. In this environment, a UE intermittently performs communication with a very low speed and mobility. Accordingly, a main goal of mMTC is operating a UE for a long time at a low cost. With respect to mMTC, 3GPP deals with MTC and NB (NarrowBand)-IoT.

mMTC has features such as repetitive transmission of a PDCCH, a PUCCH, a PDSCH (physical downlink shared channel), a PUSCH, etc., frequency hopping, retuning, and a guard period.

That is, a PUSCH (or a PUCCH (particularly, a long PUCCH) or a PRACH) including specific information and a PDSCH (or a PDCCH) including a response to the specific information are repeatedly transmitted. Repetitive transmission is performed through frequency hopping, and for repetitive transmission, (RF) retuning from a first frequency resource to a second frequency resource is performed in a guard period and the specific information and the response to the specific information can be transmitted/received through a narrowband (e.g., 6 resource blocks (RBs) or 1 RB).

F. Basic Operation of AI Processing Using 5G Communication

FIG. 3 shows an example of basic operations of AI processing in a 5G communication system.

The UE transmits specific information to the 5G network (S1). The 5G network may perform 5G processing related to the specific information (S2). Here, the 5G processing may include AI processing. And the 5G network may transmit response including AI processing result to UE (S3).

G. Applied Operations Between UE and 5G Network in 5G Communication System

Hereinafter, the operation of an autonomous vehicle using 5G communication will be described in more detail with reference to wireless communication technology (BM procedure, URLLC, mMTC, etc.) described in FIGS. 1 and 2.

First, a basic procedure of an applied operation to which a method proposed by the present disclosure which will be described later and eMBB of 5G communication are applied will be described.

As in steps S1 and S3 of FIG. 3, the autonomous vehicle performs an initial access procedure and a random access procedure with the 5G network prior to step S1 of FIG. 3 in order to transmit/receive signals, information and the like to/from the 5G network.

More specifically, the autonomous vehicle performs an initial access procedure with the 5G network on the basis of an SSB in order to acquire DL synchronization and system information. A beam management (BM) procedure and a beam failure recovery procedure may be added in the initial access procedure, and quasi-co-location (QCL) relation may be added in a process in which the autonomous vehicle receives a signal from the 5G network.

In addition, the autonomous vehicle performs a random access procedure with the 5G network for UL synchronization acquisition and/or UL transmission. The 5G network can transmit, to the autonomous vehicle, a UL grant for scheduling transmission of specific information. Accordingly, the autonomous vehicle transmits the specific information to the 5G network on the basis of the UL grant. In addition, the 5G network transmits, to the autonomous vehicle, a DL grant for scheduling transmission of 5G processing results with respect to the specific information. Accordingly, the 5G network can transmit, to the autonomous vehicle, information (or a signal) related to remote control on the basis of the DL grant.

Next, a basic procedure of an applied operation to which a method proposed by the present disclosure which will be described later and URLLC of 5G communication are applied will be described.

As described above, an autonomous vehicle can receive DownlinkPreemption IE from the 5G network after the autonomous vehicle performs an initial access procedure and/or a random access procedure with the 5G network. Then, the autonomous vehicle receives DCI format 2_1 including a preemption indication from the 5G network on the basis of DownlinkPreemption IE. The autonomous vehicle does not perform (or expect or assume) reception of eMBB data in resources (PRBs and/or OFDM symbols) indicated by the preemption indication. Thereafter, when the autonomous vehicle needs to transmit specific information, the autonomous vehicle can receive a UL grant from the 5G network.

Next, a basic procedure of an applied operation to which a method proposed by the present disclosure which will be described later and mMTC of 5G communication are applied will be described.

Description will focus on parts in the steps of FIG. 3 which are changed according to application of mMTC.

In step S1 of FIG. 3, the autonomous vehicle receives a UL grant from the 5G network in order to transmit specific information to the 5G network. Here, the UL grant may include information on the number of repetitions of transmission of the specific information and the specific information may be repeatedly transmitted on the basis of the information on the number of repetitions. That is, the autonomous vehicle transmits the specific information to the 5G network on the basis of the UL grant. Repetitive transmission of the specific information may be performed through frequency hopping, the first transmission of the specific information may be performed in a first frequency resource, and the second transmission of the specific information may be performed in a second frequency resource. The specific information can be transmitted through a narrowband of 6 resource blocks (RBs) or 1 RB.

The above-described 5G communication technology can be combined with methods proposed in the present disclosure which will be described later and applied or can complement the methods proposed in the present disclosure to make technical features of the methods concrete and clear.

H. Beam Management (BM)

A beam management (BM) procedure described above is described.

The BM procedure corresponds to layer 1 (L1)/L2 (layer 2) procedures for obtaining and maintaining a set of base station (e.g., gNB or TRP) and/or a terminal (e.g., UE) beams which may be used for downlink (DL) and uplink (UL) transmission/reception, and may include the following procedure and terms.

Beam measurement: an operation of measuring characteristics of a beamforming signal received by a base station or a UE.

Beam determination: an operation of selecting, by a base station or a UE, its own transmission (Tx) beam/received (Rx) beam.

Beam sweeping: an operation of covering a space region by using a Tx and/or Rx beam for a given time interval in a predetermined manner.

Beam report: an operation of reporting, by a UE, information of a beamformed signal based on beam measurement.

Furthermore, the BM procedure may be divided into (1) a DL BM procedure using a synchronization signal (SS)/physical broadcast channel (PBCH) Block or CSI-RS and (2) an UL BM procedure using a sounding reference signal (SRS).

Furthermore, each of the BM procedures may include Tx beam sweeping for determining a Tx beam and Rx beam sweeping for determining an Rx beam.

H.1. DL BM

The DL BM procedure may include (1) the transmission of beamformed DL reference signals (RSs) (e.g., CSI-RS or SS block (SSB)) of a base station and (2) beam reporting of a UE.

In this case, the beam reporting may include a preferred DL RS identifier (ID)(s) and L1-reference signal received power (RSRP) corresponding thereto.

The DL RS ID may be an SSB resource indicator (SSBRI) or a CSI-RS resource indicator (CRI).

As illustrated in FIG. 5, an SSB beam and a CSI-RS beam may be used for beam measurement. In this case, a measurement metric is L1-RSRP for each resource/block. An SSB may be used for coarse beam measurement, and a CSI-RS may be used for fine beam measurement. Furthermore, the SSB may be used for both Tx beam sweeping and Rx beam sweeping.

A UE may perform the Rx beam sweeping using an SSB while changing an Rx beam with respect to the same SSBRI across multiple SSB bursts. In this case, one SS burst includes one or more SSBs, and one SS burst set includes one or more SSB bursts.

H.1.1. DL BM USING SSB

FIG. 6 is a flowchart illustrating an example of a DL BM procedure using an SSB.

A configuration for a beam report using an SSB is performed upon CSI/beam configuration in an RRC connected state (or RRC connected mode).

A UE receives, from a base station, a CSI-ResourceConfig IE including CSI-SSB-ResourceSetList including SSB resources used for BM (S510).

Table 1 illustrates an example of the CSI-ResourceConfig IE, As in a CSI-ResourceConfig IE of Table 1, a BM configuration using an SSB is not separately defined, and an SSB is configured like a CSI-RS resource.

In this case, the QCL TypeD may mean that antenna ports have been QCLed from a spatial Rx parameter viewpoint. When the UE receives a plurality of DL antenna ports having a QCL Type D relation, the same Rx beam may be applied. Furthermore, the UE does not expect that a CSI-RS will be configured in an RE that overlaps an RE of an SSB.

H.1.2. DL BM procedure using CSI-RS

CSI-RS uses are described. (i) If a repetition parameter is configured in a specific CSI-RS resource set and TRS_info is not configured, a CSI-RS is used for beam management. (ii) If a repetition parameter is not configured and TRS_info is configured, a CSI-RS is used for a tracking reference signal (TRS). (iii) If a repetition parameter is not configured and TRS_info is not configured, a CSI-RS is used for CSI acquisition.

the repetition parameter may be configured only with respect to CSI-RS resource sets associated with CSI-ReportConfig having the reporting of L1 RSRP or "No Report (or None)."

If a UE is configured with CSI-ReportConfig having reportQuantity configured as "cri-RSRP" or "none" and CSI-ResourceConfig (higher layer parameter resourcesForChannelMeasurement) for channel measurement does not include a higher layer parameter "trs-Info" and includes NZP-CSI-RS-ResourceSet configured (repetition=ON) as a higher layer parameter "repetition", the UE may be configured with only the same number of ports (1-port or 2-port)

TABLE 1

```
-- ASN1START
-- TAG-CSI-RESOURCECONFIG-START
CSI-ResourceConfig ::=                          SEQUENCE {
    csi-ResourceConfigId                        CSI-ResourceConfigId,
    csi-RS-ResourceSetList                      CHOICE {
        nzp-CSI-RS-SSB                              SEQUENCE {
            nrp-CSI-RS-ResourceSetList                  SEQUENCE (SIZE (1..maxNrofNRP-CSI-RS-
ResourceSetsPerConfig)) OF NZP-CSI-RS-ResourceSetId     OPTIONAL,
            csi-SSB-ResourceSetList                     SEQUENCE (SIZE (1..maxNrofCSI-SSB-
ResourceSetsPerConfig)) OF CSI-SSB-ResourceSetId        OPTIONAL
        },
        csi-IM-ResourceSetList                      SEQUENCE (SIZE (1..maxNrofCSI-IM-
ResourceSetsPerConfig)) OF CSI-IM-ResourceSetId
    },
    bwp-id                                      BWP-Id,
    resourceType                                ENUMERATED { aperiodic, semiPersistent, periodic },
    ...
}
-- TAG-CSI-RESOURCECONFIGTOADDMOD-STOP
-- ASN1STOP
```

In Table 1, the csi-SSB-ResourceSetList parameter indicates a list of SSB resources used for beam management and reporting in one resource set. In this case, the SSB resource set may be configured with {SSBx1a, SSBx2, SSBx3, SSBx4, . . . }. An SSB index may be defined from 0 to 63. Furthermore, the UE receives an SSB resource from the base station based on the CSI-SSB-ResourceSetList (S420).

Furthermore, if CSI-RS reportConfig related to a report for an SSBRI and L1-RSRP has been configured, the UE (beam) reports, to the base station, the best SSBRI and L1-RSRP corresponding thereto (S430).

That is, if reportQuantity of the CSI-RS reportConfig IE is configured as "ssb-Index-RSRP", the UE reports the best SSBRI and the L1-RSRP corresponding thereto to the base station.

Furthermore, if a CSI-RS resource is configured in an OFDM symbol(s) identical with an SS/PBCH block (SSB) and "QCL-TypeD" is applicable, the UE may assume that a CSI-RS and an SSB are quasi co-located from a "QCL-TypeD" viewpoint.

having a higher layer parameter "nrofPorts" with respect to all CSI-RS resources within the NZP-CSI-RS-ResourceSet.

A case where a repetition is configured as "ON" is related to an Rx beam sweeping procedure of a UE. If a UE is configured with NZP-CSI-RS-ResourceSet having a (higher layer parameter) repetition configured as "ON", the UE may assume that at least one CSI-RS resource within the NZP-CSI-RS-ResourceSet is transmitted as the same downlink spatial domain transmission filter. That is, at least one CSI-RS resource within the NZP-CSI-RS-ResourceSet is transmitted through the same Tx beam. In this case, the at least one CSI-RS resource within the NZP-CSI-RS-ResourceSet may be transmitted in different OFDM symbols or may be transmitted in different frequency domains (i.e., through FDM). The UE does not expect that different periodicities will be received in periodicityAndOffset in all CSI-RS resources within NZP-CSI-RS-Resourceset.

A case where the repetition is configured as "OFF" is related to a Tx beam sweeping procedure of a base station.

if the repetition is configured as "OFF", the UE does not assume that at least one CSI-RS resource within NZP-CSI-RS-ResourceSet is transmitted as the same downlink spatial domain transmission filter. That is, the at least one CSI-RS resource within NZP-CSI-RS-ResourceSet is transmitted through different Tx beams.

FIG. 7 is a diagram illustrating an example of a DL BM procedure using a CSI-RS. (a) of FIG. 7 illustrates an Rx beam determination (or refinement) procedure of a UE. (b) of FIG. 7 indicates a Tx beam determination procedure of a base station. a) of FIG. 6 corresponds to a case where the repetition parameter is configured as "ON", and (b) of FIG. 7 corresponds to a case where the repetition parameter is configured as "OFF."

An Rx beam determination process of a UE is described with reference to (a) of FIG. 7 and FIG. 8.

FIG. 8 is a flowchart illustrating an example of a received beam determination process of a UE.

The UE receives, from a base station, an NZP CSI-RS resource set IE including a higher layer parameter repetition through RRC signaling (S610). In this case, the repetition parameter is configured as "ON."

the UE repeatedly receives a resource(s) within a CSI-RS resource set configured as a repetition "ON" in different OFDM symbols through the same Tx beam (or DL spatial domain transmission filter) of the base station (S620).

Accordingly, the UE determines its own Rx beam (S630).

In this case, the UE omits a CSI report or transmits, to the base station, a CSI report including a CRI/L1-RSRP (S640). In this case, reportQuantity of the CSI report config may be configured as "No report (or None)" or "CRI+L1-RSRP."

That is, if a repetition "ON" is configured, the UE may omit a CSI report.

A Tx beam determination process of a base station is described with reference to (b) of FIG. 7 and FIG. 9.

FIG. 9 is a flowchart illustrating an example of a method of determining, by a base station, a transmission beam.

A UE receives, from a base station, an NZP CSI-RS resource set IE including a higher layer parameter repetition through RRC signaling (S710). In this case, the repetition parameter is configured as "OFF", and is related to a Tx beam sweeping procedure of the base station.

Furthermore, the UE receives resources within the CSI-RS resource set configured as the repetition "OFF" through different Tx beams (DL spatial domain transmission filters) of the base station (S720).

Furthermore, the UE selects (or determines) the best beam (S730).

UE reports an ID for the selected beam and related quality information (e.g., L1-RSRP) to the base station (S740). In this case, reportQuantity of the CSI report config may be configured as "CRI+L1-RSRP."

That is, the UE reports a CRI and corresponding L1-RSRP to the base station if a CSI-RS is transmitted for BM.

FIG. 10 is a diagram illustrating an example of resource allocation in time and frequency domains related to the operation of FIG. 7.

That is, it may be seen that if the repetition "ON" has been configured in a CSI-RS resource set, a plurality of CSI-RS resources is repeatedly used by applying the same Tx beam, and if a repetition "OFF" has been configured in the CSI-RS resource set, different CSI-RS resources are transmitted through different Tx beams.

H.1.3. DL BM-Related Beam Indication

A UE may be RRC-configured with a list of a maximum of M candidate transmission configuration indication (TCI) states for an object of at least quasi co-location (QCL) indication. In this case, M may be 64.

Each of the TCI states may be configured as one RS set. Each ID of a DL RS for at least a spatial QCL purpose (QCL Type D) within the RS set may refer to one of DL RS types, such as an SSB, a P-CSI RS, an SP-CSI RS, and an A-CSI RS.

The initialization/update of an ID of a DL RS(s) within the RS set used for the at least spatial QCL purpose may be performed through at least explicit signaling.

Table 2 illustrates an example of a TCI-State IE.

The TCI-State IE associates one or two DL reference signals (RS) with a corresponding quasi co-location (QCL) type.

TABLE 2

```
-- ASN1START
-- TAG-TCI-STATE-START
TCI-State ::=          SEQUENCE {
   tci-StateId         TCI-StateId,
   qcl-Type1           QCL-Info,
   qcl-Type2           QCL-Info
   ...
}
QCL-Info ::=           SEQUENCE {
   cell                    ServCellIndex
   bwp-Id                  BWP-Id
   referenceSignal         CHOICE {
      csi-rs                  NZP-CSI-RS-ResourceId,
      ssb                     SSB-Index
   },
   qcl-Type                ENUMERATED {typeA, typeB, typeC, typeD},
   ...
}
-- TAG-TCI-STATE-STOP
-- ASN1STOP
```

In Table 2, the bwp-Id parameter indicates a DL BWP where an RS is located. The cell parameter indicates a carrier where an RS is located. The reference signal parameter indicates a reference antenna port(s) that becomes the source of a quasi co-location for a corresponding target antenna port(s) or a reference signal including the reference antenna port(s). A target antenna port(s) may be a CSI-RS, a PDCCH DMRS, or a PDSCH DMRS. For example, in order to indicate QCL reference RS information for an NZP CSI-RS, a corresponding TCI state ID may be indicated in NZP CSI-RS resource configuration information. Furthermore, for example, in order to indicate QCL reference information for a PDCCH DMRS antenna port(s), a TCI state ID may be indicated in a CORESET configuration. Furthermore, for example, in order to indicate QCL reference information for a PDSCH DMRS antenna port(s), a TCI state ID may be indicated through DCI.

H.1.4. QCL (Quasi-Co Location)

An antenna port is defined so that a channel on which a symbol on an antenna port is carried is inferred from a channel on which another symbol on the same antenna port is carried. If the properties of a channel on which a symbol on one antenna port is carried can be derived from a channel on which a symbol on another antenna port is carried, the two antenna ports may be said to have a quasi co-located or quasi co-location (QC/QCL) relation.

In this case, the properties of the channel includes one or more of delay spread, Doppler spread, a frequency shift, average received power, received timing, and a spatial RX parameter. In this case, the spatial Rx parameter means a spatial (reception) channel property parameter, such as an angle of arrival.

In order to decode a PDSCH according to a detected PDCCH having intended DCI with respect to a corresponding UE and a given serving cell, a UE may be configured with a list of up to M TCI-State configurations within higher layer parameter PDSCH-Config. The M depends on a UE capability.

Each of the TCI-States includes a parameter for configuring a quasi co-location relation between one or two DL reference signals and the DM-RS port of a PDSCH.

The quasi co-location relation is configured as a higher layer parameter qcl-Type1 for a first DL RS and a higher layer parameter qcl-Type2 (if configured) for a second DL RS. In the case of the two DL RSs, QCL types are not the same regardless of whether reference is the same DL RS or different DL RSs.

A quasi co-location type corresponding to each DL RS is given by a higher layer parameter qcl-Type of QCL-Info, and may take one of the following values:

"QCL-TypeA": {Doppler shift, Doppler spread, average delay, delay spread}

"QCL-TypeB": {Doppler shift, Doppler spread}

"QCL-TypeC": {Doppler shift, average delay}

"QCL-TypeD": {Spatial Rx parameter}

For example, if a target antenna port is a specific NZP CSI-RS, it may be indicated/configured that corresponding NZP CSI-RS antenna ports have been QCLed with a specific TRS from a QCL-Type A viewpoint and with a specific SSB from a QCL-Type D viewpoint. A UE configured with such an indication/configuration may receive a corresponding NZP CSI-RS by using Doppler, delay value measured in a QCL-TypeA TRS, and may apply, to the reception of the corresponding NZP CSI-RS, an Rx beam used for the reception of a QCL-TypeD SSB.

The UE receives an activation command used to map up to eight TCI states to the codepoint of a DCI field "Transmission Configuration Indication."

H.2. UL BM

In the case of UL BM, beam reciprocity (or beam correspondence) between the Tx beam and the Rx beam may be established or not established according to UE implementation. If the reciprocity between the Tx beam and the Tx beam is established in both the eNB and the UE, a UL beam pair may be matched through a DL beam pair. However, when the reciprocity between the Tx beam and the Rx beam is not established even in any one of the eNB and the UE, a UL beam pair determination process is required apart form DL beam pair determination.

Further, even when the eNB and the UE maintain beam correspondence, the eNB may use a UL BM procedure in order to determine a DL Tx beam without requesting report of a preferred beam by the UE.

The UL BM may be performed through beamformed UL SRS transmission and whether to apply UL BM of the SRS resource set is configured by a (higher layer parameter) usage. When the usage is configured as 'BeamManagement (BM)', only one SRS resource may be transmitted to each of a plurality of SRS resource sets at a given time instant.

The UE may be configured with one or more Sounding Reference Symbol (SRS) resource sets configured by (higher layer parameter) SRS-ResourceSet (through higher layer signaling, RRC signaling, etc.). For each SRS resource set, the UE may be configured with K≥1) SRS resources (higher later parameter SRS-resources). Here, K is a natural number and a maximum value of K is indicated by SRS_capability.

Similarly to the DL BM, a UL BM procedure may also be divided into Tx beam sweeping of the UE and Rx beam sweeping of the eNB.

FIG. 11 illustrates an example of a ULBM procedure using an SRS. FIG. 11(a) illustrates an Rx beam determination procedure of the base station, and FIG. 11(b) illustrates a Tx beam sweeping procedure of the UE.

FIG. 13 is a flowchart showing an example of a ULBM procedure using the SRS.

The UE receives, from the base station, RRC signaling (e.g., SRS-ConFIG IE) including a (higher layer parameter) usage parameter configured as 'beam management' (S1010).

Table 3 shows an example of SRS-ConFIG IE (Information Element) and SRS-ConFIG IE is used for an SRS transmission configuration. The SRS-ConFIG IE includes a list of SRS-Resources and a list of SRS-ResourceSets. Each SRS resource set means a set of SRS-resources.

The network may trigger transmission of the SRS resource set by using configured aperiodicSRS-Resource-Trigger (L1 DCI).

TABLE 3

```
-- ASN1START
-- TAG-MAC-CELL-GROUP-CONFIG-START
SRS-Config ::=                                          SEQUENCE {
    srs-ResourceSetToReleaseList                        SEQUENCE (SIZE(1..maxNrofSRS-ResourceSets)) OF SRS-
ResourceSetId                      OPTIONAL,            -- Need N
    srs-ResourceSetToAddModList                         SEQUENCE (SIZE(1..maxNrofSRS-ResourceSets)) OF SRS-ResourceSet
OPTIONAL,              --Need N
    srs-ResourceToReleaseList                               SEQUENCE (SIZE(1..maxNrofSRS-Resources)) OF SRS-ResourceId
OPTIONAL,              --Need N
    srs-ResourceToAddModList                                SEQUENCE (SIZE(1..maxNrofSRS-Resources)) OF SRS-Resource
OPTIONAL,              --Need N
    tpc-Accumulation                                        ENUMERATED {disabled}
OPTIONAL,              --Need N ...
}
SRS-ResourceSet ::=                                     SEQUENCE {
    srs-ResourceSetId                                       SRS-ResourceSetId,
    srs-ResourceIdList                                      SEQUENCE (SIZE(1..maxNrofSRS-ResourcesPerSet)) OF SRS-
ResourceId                      OPTIONAL,            -- Cond Setup
    resourceType                                            CHOICE {
        aperiodic                                               SEQUENCE {
```

TABLE 3-continued

| | | |
|---|---|---|
| | aperiodicSRS-ResourceTrigger | INTEGER (1..maxNrofSRS-TriggerStates–1), |
| | csi-RS | NZP-CSI-RS-ResourceId |
| | OPTIONAL, | --Cond NonCodebook |
| | slotoffset | INTEGER (1..32) |
| | OPTIONAL, | --Need S |
| | ... | |
| }, | | |
| semi-persistent: | | SEQUENCE { |
| | associatedCSI-RS | NZP-CSI-RS-ResourceId |
| | OPTIONAL, | --Cond NonCodebook |
| | ... | |
| }, | | |
| periodic | | SEQUENCE { |
| | associatedCSI-RS | NZP-CSI-RS-ResourceId |
| | OPTIONAL, | --Cond NonCodebook |
| | ... | |
| } | | |
| }, | | |
| usage | | ENUMERATED {beamManagement, codebook, |
| nonCodebook, antennaSwitching}, | | |
| alpha | | Alpha |
| | OPTIONAL, | --Need S |
| p0 | | INTEGER (–202..24) |
| | OPTIONAL, | --Cond Setup |
| pathlossReferenceRS | | CHOICE { |
| ssb-Index | | SSB-Index, |
| csi-RS-Index | | NZP-CSI-RS-ResourceId |
| SRS-SpatialRelationInfo ::= | SEQUENCE { | |
| servingCellId | | ServCellIndex |
| OPTIONAL, | -- Need S | |
| referenceSignal | | CHOICE { |
| ssb-Index | | SSB-Index, |
| csi-RS-Index | | NZP-CSI-RS-ResourceId, |
| srs | | SEQUENCE { |
| | resourceId | SRS-ResourceId, |
| | uplinkBWP | BWP-Id |
| } | | |
| } | | |
| } | | |
| SRS-ResourceId ::= | | INTEGER (0..maxNrofSRS-Resources-1) |

In Table 3, usage represents a higher layer parameter indicating whether the SRS resource set is used for the beam management or whether the SRS resource set is used for codebook based or non-codebook based transmission. The usage parameter corresponds to L1 parameter 'SRS-SetUse'. 'spatialRelationInfo' is a parameter representing a configuration of a spatial relation between a reference RS and a target SRS. Here, the reference RS may become SSB, CSI-RS, or SRS corresponding to L1 parameter 'SRS-SpatialRelationInfo'. The usage is configured for each SRS resource set.—The UE determines a Tx beam for an SRS resource to be transmitted based on SRS-SpatialRelation Info included in the SRS-Config IE (S1020). Here, SRS-SpatialRelation Info is configured for each SRS resource and represents whether to apply the same beam as the beam used in the SSB, the CSI-RS, or the SRS is to be applied for each SRS resource. In addition, SRS-SpatialRelationInfo may be configured or not configured in each SRS resource.

If SRS-SpatialRelationInfo is configured in the SRS resource, the UE transmits by applying the beam which is the same as the beam used in the SSB, the CSI-RS, or the SRS. However, if SRS-SpatialRelationInfo is not configured in the SRS resource, the UE arbitrarily determines the Tx beam and transmits the SRS through the determined Tx beam (S1030).

More specifically, for P-SRS in which 'SRS-ResourceConfigType' is configured as 'periodic':

i) When SRS-SpatialRelationInfo is configured as 'SSB/PBCH', the UE transmits the corresponding SRS resource by applying a spatial domain transmission filter which is the same as a spatial domain Rx filter used for receiving the SSB/PBCH (or generated from the corresponding filter); or ii) When SRS-SpatialRelationInfo is configured as 'CSI-RS', the UE transmits the SRS resource by applying the same spatial domain transmission filter used for receiving periodic CSI-RS or SP CSI-RS; or iii) When SRS-SpatialRelationInfo is configured as 'SRS', the UE transmits the SRS resource by applying the same spatial domain transmission filter used for transmitting the periodic CSI-RS.

Even when 'SRS-ResourceConfigType' is configured as 'SP-SRS' or 'AP-SRS', beam determination and transmission operations may be applied similarly to the above.

Additionally, the UE may receive or not receive a feedback for the SRS from the base station as in the following three cases (S1040).

i) When Spatial_Relation_Info is configured for all SRS resources in the SRS resource set, the UE transmits the SRS with the beam indicated by the base station. For example, when all Spatial_Relation_Info indicates the same SSB, CRI, or SRI, the UE repeatedly transmits the SRS with the same beam. This case as a usage of selecting the Rx beam by the base station corresponds to FIG. 11(a).

ii) Spatial_Relation_Info may not be configured for all SRS resources in the SRS resource set. In this case, the UE may transmit the SRS while arbitrarily changing the SRS beam. That is, this case as a usage of selecting the Tx beam by the UE corresponds to FIG. 11(b).

iii) Spatial_Relation_Info may be configured for some SRS resources in the SRS resource set. In this case, the SRS may be transmitted with the indicated for the configured SRS resource and the UE may arbitrarily apply the Tx beam and transmit it for SRS resource in which Spatial_Relation_Info is not configured.

I. CSI Related Operation

In a New Radio (NR) system, a channel state information-reference signal (CSI-RS) is used for time and/or frequency tracking, CSI computation, layer 1 (L1)-reference signal received power (RSRP) computation, and mobility. Here, the CSI computation is related to CSI acquisition and the L1-RSRP computation is related to beam management (BM).

Channel state information (CSI) collectively refers to information that may indicate the quality of a radio channel (or referred to as a link) formed between the UE and the antenna port.

FIG. 13 is a flowchart showing an example of a CSI-related procedure.

Referring to FIG. 13, in order to perform one of usages of the CSI-RS, a terminal (e.g. user equipment (UE)) receives, from a base station (e.g. general Node B, gNB), configuration information related to the CSI through radio resource control (RRC) signaling (S110).

includes at least one CSI-IM resource. Each CSI-IM resource is identified by a CSI-IM resource ID.

The CSI resource configuration related information may be expressed as CSI-ResourceConFIG IE. The CSI resource configuration related information defines a group including at least one of a non zero power (NZP) CSI-RS resource set, a CSI-IM resource set, or a CSI-SSB resource set. That is, the CSI resource configuration related information may include a CSI-RS resource set list, and the CSI-RS resource set list may include at least one of a NZP CSI-RS resource set list, a CSI-IM resource set list, or a CSI-SSB resource set list. The CSI-RS resource set is identified by a CSI-RS resource set ID and one resource set includes at least one CSI-RS resource. Each CSI-RS resource is identified by a CSI-RS resource ID.

Referring to Table 4, parameters (e.g. a BM related 'repetition' parameter and a tracking related 'trs-Info' parameter) representing the usage of the CSI-RS may be configured for each NZP CSI-RS resource set.

Table 4 shows an example of the NZP CSI-RS resource set IE.

TABLE 4

```
-- ASN1START
-- TAG-NZP-CSI-RS-RESOURCESET-START
NZP-CSI-RS-ResourceSet ::=    SEQUENCE {
    nzp-CSI-ResourceSetId       NZP-CSI-RS-ResourceSetId,
    nzp-CSI-RS-Resources        SEQUENCE (SIZE (1..maxNrofNZP-CSI-RS-ResourcesPerSet)) OF NZP-
CSI-RS-ResourceId,
    repetition                  ENUMERATED { on, off }
    aperiodicTriggeringOffset   INTEGER(0..4)
    trs-Info                    ENUMERATED {true}
        OPTIONAL,        --Need R
    ...
}
-- TAG-NZP-CSI-RS-RESOURCESET-STOP
-- ASN1STOP
```

40

The configuration information related to the CSI may include at least one of CSI-interference management (IM) resource related information, CSI measurement configuration related information, CSI resource configuration related information, CSI-RS resource related information, or CSI report configuration related information.

The CSI-IM resource related information may include CSI-IM resource information, CSI-IM resource set information, and the like. The CSI-IM resource set is identified by a CSI-IM resource set identifier (ID) and one resource set In addition, the repetition parameter corresponding to the higher layer parameter corresponds to 'CSI-RS-Re-sourceRep' of L1 parameter. The CSI report configuration related information includes a reportConfigType parameter representing a time domain behavior and a reportQuantity parameter representing a CSI related quantity for reporting. The time domain behavior may be periodic, aperiodic, or semi-persistent.

The CSI report configuration related information may be expressed as CSI-ReportConfig IE and Table 9 below shows an example of CSI-ReportConfig IE.

TABLE 5

```
-- ASN1START
-- TAG-CSI-RESOURCECONFIG-START
CSI-ReportConfig ::=                     SEQUENCE {
    reportConfigId                       CSI-ReportConfigId,
    carrier                                  ServCellIndex              OPTIONAL, --
Need S
    resourcesForChannelMeasurement       CSI-ResourceConfigId,
    csi-IM-ResourcesForInterference      CSI-ResourceConfigId    OPTIONAL,    -- Need R
    nzp-CSI-RS-ResourcesForInterference  CSI-ResourceConfigId    OPTIONAL,    -- Need R
    reportConfigType                     CHOICE {
        periodic                             SEQUENCE {
            reportSlotConfig                     CSI-ReportPeriodicityAndOffset,
            pucch-CSI-ResourceList               SEQUENCE (SIZE (1..maxNrofBWPs)) OF PUCCH-
CSI-Resource
        },
```

TABLE 5-continued

```
    semiPersistentOnPUCCH        SEQUENCE {
      reportSlotConfig              CSI-ReportPeriodicityAndOffset,
      pucch-CSI-ResourceList        SEQUENCE (SIZE (1..maxNrofBWPs)) OF PUCCH-
CSI-Resource
    },
    semiPersistentOnPUSCH        SEQUENCE {
      reportSlotConfig              ENUMERATED {sl5, sl10, sl20, sl40, sl80, sl160,
sl320},
      reportSlotOffsetList          SEQUENCE (SIZE (1..maxNrofUL-Allocations)) OF
INTEGER(0..32),
      p0alpha                       P0-PUSCH-AlphaSetId
    },
    aperiodic                    SEQUENCE {
      reportSlotOffsetList          SEQUENCE (SIZE (1..maxNrofUL-Allocations)) OF
INTEGER(0..32)
    }
  },
  reportQuantity                 CHOICE {
    none                           NULL,
    cri-RI-PMI-CQI                 NULL,
    cri-RI-i1                      NULL,
    cri-RI-i1-CQI                  SEQUENCE {
      pdsch-BundleSizeForCSI         ENUMERATED {n2, n4}        OPTIONAL
    },
    cri-RI-CQI                     NULL,
    cri-RSRP                       NULL,
    ssb-Index-RSRP                 NULL,
    cri-RI-LI-PMI-CQI              NULL
  },
```

The UE measures CSI based on configuration information related to the CSI (S1420). The CSI measurement may include (1) a CSI-RS reception process of the UE (S121) and (2) a process of computing the CSI through the received CSI-RS (S122), and a detailed description thereof will be given later.

For the CSI-RS, resource element (RE) mapping of the CSI-RS resource is configured in time and frequency domains by higher layer parameter CSI-RS-ResourceMapping.

Table 6 shows an example of CSI-RS-ResourceMapping IE.

The UE reports the measured CSI to the base station (S1430).

Here, when the quantity of CSI-ReportConfig in Table 10 is configured to 'none (or No report)', the UE may skip the report.

However, even when the quantity is configured to 'none (or No report)', the UE may report to the base station.

The case where the quantity is configured to 'none' is a case of triggering aperiodic TRS or a case where repetition is configured.

Here, only in a case where the repetition is configured to 'ON', the report of the UE may be skipped.

TABLE 6

```
-- ASN1START
-- TAG-CSI-RS-RESOURCEMAPPING-START
CSI-RS-ResourceMapping ::=       SEQUENCE {
  frequencyDomainAllocation        CHOICE {
    row1                             BIT STRING (SIZE (4)),
    row2                             BIT STRING (SIZE (12)),
    row4                             BIT STRING (SIZE (3)),
    other                            BIT STRING (SIZE (6))
  },
  nrofPorts                        ENUMERATED {p1,p2,p4,p8,p12,p16,p24,p32},
  firstOFDMSymbolInTimeDomain      INTEGER (0..13),
  firstOFDMSymbolInTimeDomain2     INTEGER (2..12)
OPTIONAL,        --Need R
  cdm-Type                         ENUMERATED {noCDM, fd-CDM2, cdm4-FD2-TD2, cdm8-FD2-TD4},
  density                          CHOICE {
    dot5                             ENUMERATED {evenPRBs, oddPRBs},
    one                              NULL,
    three                            NULL,
    spare                            NULL
  },
  freqBand                         CSI-FrequencyOccupation,
  ...
}
```

In Table 10, a density (D) represents a density of the CSI-RS resource measured in RE/port/physical resource block (PRB) and nrofPorts represents the number of antenna ports.

1.1. CSI Measurement

The NR system supports more flexible and dynamic CSI measurement and reporting. Here, the CSI measurement may include a procedure of acquiring the CSI by receiving the CSI-RS and computing the received CSI-RS.

As time domain behaviors of the CSI measurement and reporting, aperiodic/semi-persistent/periodic channel measurement (CM) and interference measurement (IM) are supported. A 4 port NZP CSI-RS RE pattern is used for configuring the CSI-IM.

CSI-IM based IMR of the NR has a similar design to the CSI-IM of the LTE and is configured independently of ZP CSI-RS resources for PDSCH rate matching. In addition, in ZP CSI-RS based IMR, each port emulates an interference layer having (a preferable channel and) precoded NZP CSI-RS. This is for intra-cell interference measurement with respect to a multi-user case and primarily targets MU interference.

The base station transmits the precoded NZP CSI-RS to the UE on each port of the configured NZP CSI-RS based IMR.

The UE assumes a channel/interference layer for each port in the resource set and measures interference.

For the channel, when there is no PMI and RI feedback, multiple resources are configured in a set and the base station or the network indicates a subset of NZP CSI-RS resources through the DCI with respect to channel/interference measurement.

Resource setting and resource setting configuration will be described in more detail.

1.1.1 Resource Setting

Each CSI resource setting 'CSI-ResourceConFIG' includes a configuration for S≥1 CSI resource set (given by higher layer parameter csi-RS-ResourceSetList). The CSI resource setting corresponds to the CSI-RS-resourcesetlist. Here, S represents the number of configured CSI-RS resource sets. Here, the configuration for S≥1 CSI resource set includes each CSI resource set including CSI-RS resources (constituted by NZP CSI-RS or CSI IM) and an SS/PBCH block (SSB) resource used for L1-RSRP computation.

Each CSI resource setting is positioned in a DL BWP (bandwidth part) identified by a higher layer parameter bwp-id. In addition, all CSI resource settings linked to CSI reporting setting have the same DL BWP.

A time domain behavior of the CSI-RS resource within the CSI resource setting included in CSI-ResourceConFIG IE is indicated by higher layer parameter resourceType and may be configured to be aperiodic, periodic, or semi-persistent. The number S of configured CSI-RS resource sets is limited to '1' with respect to periodic and semi-persistent CSI resource settings. Periodicity and slot offset which are configured are given in numerology of associated DL BWP as given by bwp-id with respect to the periodic and semi-persistent CSI resource settings.

When the UE is configured as multiple CSI-ResourceConFIGs including the same NZP CSI-RS resource ID, the same time domain behavior is configured with respect to CSI-ResourceConFIG.

When the UE is configured as multiple CSI-ResourceConFIGs including the same CSI-IM resource ID, the same time domain behavior is configured with respect to CSI-ResourceConFIG.

Next, one or more CSI resource settings for channel measurement (CM) and interference measurement (IM) are configured through higher layer signaling.

CSI-IM resource for interference measurement.

NZP CSI-RS resource for interference measurement.

NZP CSI-RS resource for channel measurement.

That is, channel measurement resource (CMR) may be NZP CSI-RS for CSI acquisition and interference measurement resource (IMR) may be NZP CSI-RS for CSI-IM and IM.

Here, CSI-IM (or ZP CSI-RS for IM) is primarily used for inter-cell interference measurement.

In addition, NZP CSI-RS for IM is primarily used for intra-cell interference measurement from multi-users.

The UE may assume CSI-RS resource(s) for channel measurement and CSI-IM/NZP CSI-RS resource(s) for interference measurement configured for one CSI reporting are 'QCL-TypeD' for each resource.

1.1.2 Resource Setting Configuration

As described, the resource setting may mean a resource set list.

For aperiodic CSI, in each trigger state configured by using higher layer parameter CSI-AperiodicTriggerState, each CSI-ReportConFIG is associated with one or multiple CSI-ReportConFIGs linked to the periodic, semi-persistent, or aperiodic resource setting.

One reporting setting may be connected with a maximum of three resource settings.

When one resource setting is configured, the resource setting (given by higher layer parameter resourcesForChannelMeasurement) is for channel measurement for L1-RSRP computation.

When two resource settings are configured, a first resource setting (given by higher layer parameter resourcesForChannelMeasurement) is for channel measurement and a second resource setting (given by csi-IM-ResourcesForinterference or nzp-CSI-RS—ResourcesForinterference) is for interference measurement performed on CSI-IM or NZP CSI-RS.

When three resource settings are configured, a first resource setting (given by resourcesForChannelMeasurement) is for channel measurement, a second resource setting (given by csi-IM-ResourcesForinterference) is for CSI-IM based interference measurement, and a third resource setting (given by nzp-CSI-RS-ResourcesForinterference) is for NZP CSI-RS based interference measurement.

Each CSI-ReportConFIG is linked to periodic or semi-persistent resource setting with respect to semi-persistent or periodic CSI.

When one resource setting (given by resourcesForChannelMeasurement) is configured, the resource setting is for channel measurement for L1-RSRP computation.

When two resource settings are configured, a first resource setting (given by resourcesForChannelMeasurement) is for channel measurement and a second resource setting (given by higher layer parameter csi-IM-ResourcesForinterference) is used for interference measurement performed on CSI-IM.

CSI Computation

When interference measurement is performed on CSI-IM, each CSI-RS resource for channel measurement is associated with the CSI-IM resource for each resource by an order of CSI-RS resources and CSI-IM resources within a corresponding resource set. The number of CSI-RS resources for channel measurement is equal to the number of CSI-IM resources.

In addition, when the interference measurement is performed in the NZP CSI-RS, the UE does not expect to be configured as one or more NZP CSI-RS resources in the associated resource set within the resource setting for channel measurement.

The UE in which Higher layer parameter nzp-CSI-RS-ResourcesForinterference is configured does not expect that 18 or more NZP CSI-RS ports will be configured in the NZP CSI-RS resource set.

For CSI measurement, the UE assumes the followings.

Each NZP CSI-RS port configured for interference measurement corresponds to an interference transport layer.

All interference transport layers of the NZP CSI-RS port for interference measurement consider an energy per resource element (EPRE) ratio.

Different interference signals on RE(s) of the NZP CSI-RS resource for channel measurement, the NZP CSI-RS resource for interference measurement, or CSI-IM resource for interference measurement.

CSI Reporting

For CSI reporting, time and frequency resources which may be used by the UE are controlled by the base station.

The channel state information (CSI) may include at least one of a channel quality indicator (CQI), a precoding matrix indicator (PMI), a CSI-RS resource indicator (CRI), an SS/PBCH block resource indicator (SSBRI), a layer indicator (LI), a rank indicator (RI), and L1-RSRP.

For the CQI, PMI, CRI, SSBRI, LI, RI, and L1-RSRP, the UE is configured by a higher layer as N≥1 CSI-ReportConFIG reporting setting, M 1 CSI-ResourceConFIG resource setting, and a list (provided by aperiodicTriggerStateList and semiPersistentOnPUSCH) of one or two trigger states. In the aperiodicTriggerStateList, each trigger state includes the channel and an associated CSI-ReportConFIGs list optionally indicating resource set IDs for interference. In the semiPersistentOnPUSCH-TriggerStateList, each trigger state includes one associated CSI-ReportConFIG.

In addition, the time domain behavior of CSI reporting supports periodic, semi-persistent, and aperiodic.

i) The periodic CSI reporting is performed on short PUCCH and long PUCCH. The periodicity and slot offset of the periodic CSI reporting may be configured through RRC and refer to the CSI-ReportConFIG IE.

ii) SP (semi-periodic) CSI reporting is performed on short PUCCH, long PUCCH, or PUSCH.

In the case of SP CSI on the short/long PUCCH, the periodicity and the slot offset are configured with the RRC and the CSI reporting is activated/deactivated by separate MAC CE.

In the case of the SP CSI on the PUSCH, the periodicity of the SP CSI reporting is configured through the RRC, but the slot offset is not configured through the RRC and the SP CSI reporting is activated/deactivated by DCI (format 0_1). For SP CSI reporting on PUSCH, a separate RNTI (SP-CSI C-RNTI) is used.

An initial CSI reporting timing follows a PUSCH time domain allocation value indicated in the DCI and a subsequent CSI reporting timing follows a periodicity configured through the RRC.

DCI format 0_1 may include a CSI request field and may activate/deactivate a specific configured SP-CSI trigger state. The SP CSI reporting has the same or similar activation/deactivation as a mechanism having data transmission on SPS PUSCH.

iii) The aperiodic CSI reporting is performed on the PUSCH and is triggered by the DCI. In this case, information related to the trigger of aperiodic CSI reporting may be delivered/indicated/configured through the MAC-CE.

In the case of AP CSI having AP CSI-RS, an AP CSI-RS timing is configured by the RRC, and a timing for the AP CSI reporting is dynamically controlled by the DCI.

In the NR, it is not applied a scheme (for example, transmitting RI, WB PMI/CQI, and SB PMI/CQI in order) of dividing and reporting the CSI in multiple reporting instances applied to PUCCH based CSI reporting in the LTE. Instead, the NR restricts specific CSI reporting not to be configured in the short/long PUCCH and a CSI omission rule is defined. In addition, in relation with the AP CSI reporting timing, a PUSCH symbol/slot location is dynamically indicated by the DCI. In addition, candidate slot offsets are configured by the RRC. For the CSI reporting, slot offset (Y) is configured for each reporting setting. For UL-SCH, slot offset K2 is configured separately.

Two CSI latency classes (low latency class and high latency class) are defined in terms of CSI computation complexity. In the case of Low latency CSI, it is a WB CSI including a maximum of 4 ports Type-I codebook or a maximum of 4-ports non-PMI feedback CSI. The high latency CSI refers to CSI other than the low latency CSI. For a normal UE, (Z, Z') is defined in a unit of OFDM symbols. Here, Z represents a minimum CSI processing time from the reception of the aperiodic CSI triggering DCI to the execution of the CSI reporting. In addition, Z' represents a minimum CSI processing time from the reception of the CSI-RS for channel/interference to the execution of the CSI reporting.

Additionally, the UE reports the number of CSIs which may be simultaneously calculated.

The 5G communication technology described above may be applied in combination with methods proposed in the present disclosure to be described below or may be supplemented to specify or clarify technical features of the methods proposed in the present disclosure.

J. Major Embodiments of Present Disclosure

The 5G communication technology described above may be applied in combination with methods proposed in the present disclosure to be described below or may be supplemented to specify or clarify technical features of the methods proposed in the present disclosure. On the other hand, the on-device based machine learning proposed by the present disclosure may be applied in combination with a communication service by 3G, 4G, and/or 6G communication technology in addition to the 5G communication technology described above.

Figure 14:
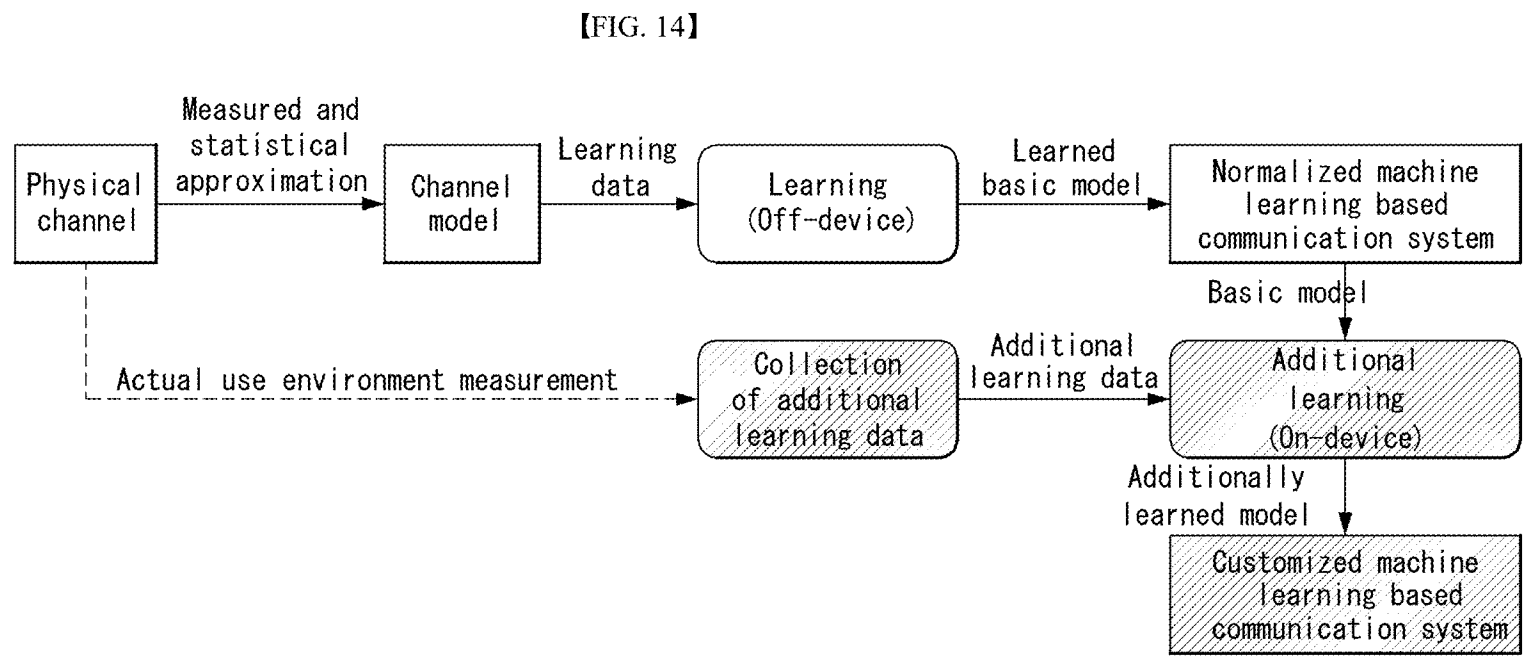

FIG. 14 exemplarily illustrates a communication system according to an embodiment of the present disclosure.

In the related art, most communication systems are designed and optimized by approximating a physical channel to a statistical model and deriving a mathematical transmission/reception model based thereon.

This approach has shown relatively successful results so far, but it is difficult that due to the mismatch between the actual physical channel and the statistical model, and various assumptions and simplifications introduced to reduce complexity, the implemented communication system shows optimal performance in various real channel environments. Although it is possible to improve the channel model and the statistical and mathematical model of the communication system to better reflect the characteristics of the actual physical channel and to show optimal performance in the actual channel environment, but it is not easy to apply this approach to the actual system in high complexity and a trade-off relationship.

An increasingly complex communication system makes a mathematical model of a communication system capable of providing optimal performance in a real environment more difficult.

A new approach is needed to realize a flexible communication system that can be optimized for QoS required by various services in the channel environment each user faces.

Recently, various studies are being conducted to apply machine learning (ML), which is showing remarkable achievements in various fields, centering on image and voice recognition, in particular, deep learning (DL) technology among them to communication.

Research to apply machine learning, in particular, deep learning among them to physical layer signal processing, such as channel inference, signal detection, etc., is becoming more and more active, and it is shown that a part or the entirety of wireless communication transmission/reception may be actually replaced with a machine learning model such as a deep neural network. This approach may be a new alternative that may overcome the limitations of the existing communication system based on a mathematical model.

Meanwhile, a lot of machine learning algorithms including the deep learning which are currently in the spotlight require a large amount of learning data and high computational complexity during learning, and for this reason, in most cases, the learning is performed in a server or a Cloud, and only inference using a model for which learning is completed is performed in an real use environment.

Referring to FIG. 14, in the present disclosure, a scheme of replacing a mathematical transmission/reception model with a learning model by the machine learning is proposed. For example, when the computing device generates the learning model using the learning data obtained from a channel model, the generated learning model is transmitted to a machine learning-based communication system to provide a more adaptive wireless communication system compared to mathematical modeling.

On the other hand, most researches that want to apply the machine learning, particularly, the deep learning, to the physical layer take an approach scheme of performing the learning in the server or a PC by using a simulator, etc., and applying a model for which learning is completed to an actual communication system.

However, there is still a limit in that it is difficult to provide performance optimized for each user's environment and scenario without learning in the actual communication system. For example, as shown in the figure on the right, for the parameter to be optimized, an optimum value in the development environment considering various use environments and the optimum value in the actual use environment may be different. The difference is due to the difference between the input data in the environment in which the receiver of the terminal is used and the training dataset of the learning model provided from the Cloud.

Hereinafter, various embodiments that may minimize the gap due to the difference between the training data of the learning model and the input data in the actual use environment will be described. Specifically, a method of generating and verifying an adaptive learning model adaptive to the use environment, and a method of using any one of various adaptive learning models in response to entry into a specific environment will be described.

FIG. 15 is a flowchart of a method according to an embodiment of the present disclosure.

A method according to an embodiment of the present disclosure includes predetermined operations. In this case, the predetermined operations are performed by at least one processor of the terminal, and specifically, the predetermined operations are connected to a transceiver, at least one processor, and the at least one processor, and performed by a terminal including at least one memory storing instructions.

When the instructions are executed by the at least one processor, the instructions allow the at least one processor to support operations for communication through an MIMO communication channel by using multiple receiving antennas, and hereinafter, the operations will be described through description of J.1 to J.4.

Meanwhile, at least one processor of the present disclosure may include at least one of a communication processor (CP) and an application processor (AP). In various embodiments, the operations by the AP and/or CP may be functionally separately operated by the AP and the CP, or performed by one functionally combined processor. In FIG. 15 and the description below, it is described that the operations are performed by the 'processor'.

In addition, the machine learning network implemented in various embodiments of the present disclosure includes at least one of a Deep Neural Network (DNN), a Convolutional Neural Network (CNN), or a Recurrent Neural Network (RNN) including parametric multiplications, additions, and non-linearities.

Meanwhile, in various embodiments of the present disclosure, 'data for learning', 'training data', and/or 'training data' may be used interchangeably.

Referring to FIG. 15, at least one processor may generate or update a learning list based on one or more location samples collected during communication through a network (S110).

The learning list includes one or more first items. Here, the first item means a predetermined communication environment. As such, one or more communication environments included in the learning list are used as learning targets of the machine learning network. That is, by using training data obtained from one or more communication environments corresponding to one or more first items included in the learning list, at least one processor may provide a machine learning network optimized for each communication environment. Meanwhile, the first items may be distinguished by respective IDs.

In addition, the learning list may include place information and base station information divided by the first item. Here, the place information may include spatial information regarding an application region to which a second machine learning network is completed, or a collection region for obtaining the training data. For example, when the terminal is positioned in the application region, the terminal may control a receiver by using the machine learning network associated with the application region. For example, when the terminal is positioned in the collection region, the terminal may obtain the training data for learning the machine learning network from the base station connected in the collection region.

In an embodiment, connection information may be measured for each of one or more base stations in order to generate the learning list, and at least one processor may determine the target base station based on the measured connection information. At least one processor may periodically obtain the location samples of the terminal while being connected to the target base station, and determine one or more communication environments by applying a clustering algorithm to the location samples. As such, one or more determined communication environments may be configured as the first item of the learning list.

In another embodiment, at least one processor may perform operations of generating or updating at least one of a connection list, a candidate list, and a selection list in order to generate the learning list.

Specifically, at least one processor may generate or update a connection list including one or more second items having at least one of connection information (e.g., a time (T_pri) connected for each primary cell, a total connection time (T_tot), or a total received data amount (D_tot)) obtained for each of one or more base stations.

At least one processor may generate or update the candidate list based on the connection information of the connection list. The candidate list may include one or more third items. Here, the third item may further include a score parameter. The score parameter is calculated by applying a weight set in the connection information of the connection list. For example, the score may be calculated according to Equation 1 below.

$$\text{Score} = w_{tot} \cdot T_{tot} + w_{pri} \cdot T_{pri} + w_{data} \cdot D$$

In Equation 1, w_tot means a weight for T_tot, w_pri means a weight for T_pri, and w_data means a weight for D. Meanwhile, in the present disclosure, the above-described D_tot may be used interchangeably with D, and are not distinguished from each other.

At least one processor may generate or update the selection list by selecting one or more items by applying a weight set to any one of one or more third items included in the candidate list.

At least one processor sorts (e.g., in descending order) one or more third items included in the candidate list based on the score parameter, and selects upper K items (K is a positive integer) to generate or update the selection list.

At least one processor may be connected to at least one of one or more base stations of the selection list based on the selection list or may collect location information while being connected to at least one base station. For example, at least one processor may provide an instruction to the GPS module to generate the location information, or provide the instruction to the transceiver to request delivery of the location information to the network. Further, at least a part of the collected location information is sampled as a location sample for selecting a communication environment corresponding to the first item.

In this case, at least one processor does not store in the memory at least a part of the location information or the location sample obtained based on the location of the terminal. For example, when it is sensed that the terminal is positioned in the aforementioned application region, at least one processor controls not to store the location information or the location sample in the memory. In addition, at least one processor increases a parameter (N_in-region) associated with a location information acquisition period by one whenever the terminal enters the application region.

As a result, when the N_in-region is equal to or larger than a set threshold, at least one processor may increase a period for acquiring the location information. For example, the period of acquiring the location information may be selected as a smallest value among values larger than a current value among periods which may be set. In this case, when there is no value larger than the current value, the current value is maintained. Here, N_in-region being equal to or larger than the threshold means that the terminal is continuously learning, completes learning, or is positioned in a communication environment where learning is attempted but failed. Accordingly, computing efficiency can be improved by adjusting the period of acquisition of the location information.

Further, at least one processor may generate or update one or more first items to be added to the learning list based on the location sample of the terminal associated with one or more fourth items included in the selection list.

For example, at least one processor may provide one or more location sampler clusters by applying a clustering algorithm to multiple location samples. Here, the clustering algorithm may use a density-based clustering algorithm, and includes Density-Based Spatial Clustering of Applications with Noise (DBSCAN), Mean-Shift Clustering, and the like.

In addition, the learning list may include state information for each first item. The state information may include at least one of an acquisition state, a training state, a verification state, an application state, and a barred state, and at least one processor may manage the first items based on the state information.

For example, in the case of the acquisition state, at least one processor acquires training data in an environment corresponding to the first item.

In addition, the learning state means a state of learning the machine learning network associated with the first item obtained the training data by using the training data obtained in the acquisition state. In the case of the learning state, at least one processor performs an update of the machine learning network associated with the first item by using the training data obtained in the learning state.

In addition, the verification state means a state of verifying the updated machine learning network in the learning state. In the case of the verification state, at least one processor verifies the performance of the updated machine learning network in the learning state.

In addition, the application state means a state in which learning and verification are completed. In this case, the at least one processor applies the machine learning network in which the learning and the verification are completed to the actual use environment.

Further, the barred state means a state which is selected as the first item of the learning list, but fails to the learning or the verification. The first item of the barred state may be excluded from the learning list for a predetermined period of time or semi-permanently by a timer.

A detailed description related to the generation of the above-described learning list will be described later with reference to FIGS. 17 to 22 below.

At least one processor may obtain training data for updating a first machine learning network to be applied to the receiver of the terminal to a second machine learning network when an event associated with any one of one or more first items included in the learning list is detected (S115).

As described above, the place information may include spatial information regarding an application region to which the second machine learning network of which learning is completed is to be applied, or a collection region for obtaining the training data.

Here, the event related to any one of the one or more first items means that it is detected that the terminal enters or is positioned in the collection region.

As described above, when the terminal is positioned in the collection region, the terminal may obtain the training data for learning the machine learning network from the base station connected to the collection region.

Here, the training data represents a reception-related parameter. For example, the reception-related parameter may include at least one of a signal to noise ratio (SNR), a received signal strength indication (RSSI), a reference signal received power (RSRP), or a reference signal reception quality.

At least one processor may update the first machine learning network using the training data (S120).

Each layer of the machine learning network includes a node for determining a parameter (e.g., a weight). Hidden layers and nodes affect the performance of the machine learning network, but there is no formal determination method of numbers thereof. In an example, at least one processor may update a weight parameter between the node and the node to minimize an error between an output value and a measurement value of the machine learning network using a back propagation method. As a learning algorithm for the weights, a gradient descent method, a Levenberg-Marquardt method, a Bayesian regularization method, and the like are used.

Update means a change in weight and/or bias between nodes based on the training data. On the other hand, the 'second machine learning network' in which the learning is completed may be used interchangeably with the 'adaptive learning model'.

At least one processor may confirm success or failure of learning of the first machine learning network (S125).

For example, if the Training Error is not small enough or the difference between the Training Error and the Generalization Error (so-called, Test Error) is not small enough, a learning result of the machine learning network is classified into the failure.

When the learning of the first machine learning network is successful (S125: YES), at least one processor may verify performance in the actual use environment (S130).

As an example, at least one processor may compare a first performance indicator measured by the first machine learning network before updating the machine learning network with a second performance indicator measured by the second machine learning network after updating the machine learning network, and select any one of the first and second machine learning networks based on the comparison.

As another example, when the first machine learning network is updated, at least one processor may compare a first performance indicator measured by the first machine learning network before updating the machine learning network with a second performance indicator measured by the second machine learning network after updating the machine learning network, and select any one of the first and second machine learning networks based on the comparison.

Further, when the reliability of the comparison is less than a set reference value, at least one processor may measure and compare the first and second performance indicators again.

When the learning of the first machine learning network is unsuccessful (S125: NO), at least one processor may increase the number of learning failures for the first machine learning network.

When the number of learning failures exceeds a set first maximum number of times (N_train-max-try) (S150: NO), at least one processor may switch state information of the first item to the barred state (S160).

In this case, at least one processor may also initialize the updated machine learning network before the update. For example, the at least one processor may initialize the updated machine learning network before the update and simultaneously switch or set the state information of the first item to the barred state.

When the number of learning failures is less than the first maximum number of times (S150: YES), at least one processor collects the training data again and performs the learning of the machine learning network.

When the performance in the actual use environment is verified (S135: YES), at least one processor may apply the second machine learning network in the application region of the first item (S140).

When the performance in the actual use environment is verified, the state information of the first item associated with the second machine learning network is transitioned to the application state. In the application state, when the terminal enters the application region of the first item in the application state, at least one processor may control the receiver through the second machine learning network while being positioned in the application region.

At least one processor may be connected to the base station associated with one or more first items of the learning list, or may periodically confirm the location of the terminal while connected.

In this case, the location conformation period of the terminal may be adjusted in inverse portion to a movement speed of the terminal.

When it is confirmed that the terminal enters the application region of any one of the multiple first items of the learning list, at least one processor provides a communication service by applying the second machine learning network learned in the communication environment entered by the terminal. Thereafter, when the terminal leaves the application region, at least one processor stops application of the second machine learning network. When the application of the second machine learning network is stopped, at least one processor may provide the communication service by applying the first machine learning network.

When the performance is not verified in the actual use environment (S135: NO), at least one processor may increase the number of verification failures with respect to the second machine learning network.

When the number of learning failures exceeds a set second maximum number of times (N_verify-max-try) (S155: NO), at least one processor may switch the state information of the first item to the barred state (S160).

When the number of learning failures is less than the second maximum number of times (S150: YES), at least one processor collects the training data again and performs the learning of the machine learning network.

Meanwhile, at least one processor measures a third performance indicator while providing the communication service using the second machine learning network, and compares the third performance indicator with the second performance indicator measured in the verification state to determine whether performance is degraded (S145). When it is determined that the performance of the second machine learning network is degraded (S145: YES), at least one processor may stop the application of the first item corresponding to the communication environment in which the performance is degraded, and transition back to the acquisition state (S115).

In an embodiment, the determination of whether the performance is degraded may be performed based on a set timer. In the present disclosure, the timer related to performance degradation may be defined as a check timer. In this case, at least one processor may determine whether the performance is degraded whenever the check timer expires. When it is determined that the performance of the second machine learning network is not degraded (S145: NO), at least one processor may initialize the check timer and start again.

Meanwhile, when the number of learning failures exceeds N_train-max-try or when the number of verification failures exceeds N_verify-max-try, at least one processor sets the state information of the first item to a lock (S160), and as such, a unlock timer is started in response to the barred state being started.

When the unlock timer expires (S165: YES), at least one processor may delete the corresponding first item from the learning list and perform the operation of S110 again.

Hereinafter, in the present disclosure, the operations described in FIG. 15 will be described. Hereinafter, in a detailed description, contents overlapping with FIG. 15 may be omitted, and additional contents may be combined with the operations of FIG. 15.

J.1. Selection of Environments for Collecting Training Data

FIG. 16 is a diagram for exemplarily describing a communication environment according to an embodiment of the present disclosure.

Referring to FIG. 16, the communication environment may be specified by base station information (e.g., cell ID and frequency band) and place information (e.g., a center location and a radius).

The communication environment may be configured in association with each base station or base station information. For example, ENV1A and ENV1B are configured in association with a first station BS1, ENV2 is configured in association with a second base station BS2, and ENV3A, ENV3B, and ENV3C are configured in association with a third base station BS3. Each of the base stations may include one or more communication environments within each coverage (e.g., CO1, CO2, and CO3).

Meanwhile, even though the Cell ID and the frequency band are the same, there may be different communication environments according to the place information (see ENV1A and ENV1 B). Further, in spite of the same place, there may be two or more different communication environments according to the frequency band (see ENV3A and ENV3B).

The place may be expressed in 2D or 3D. In the case of the 2D, the place may be represented by latitude and longitude, and in the case of the 3D, the place may be represented by latitude, longitude, and altitude. Further, the place may be specified and subdivided by using additional information such as a floor of a building, a WIFI access point (AP) ID, etc.

FIGS. 17 to 24 are diagrams for exemplarily describing a learning list generating method according to an embodiment of the present disclosure. Hereinafter, in the present disclosure, it will be described that at least one processor is exemplarily divided into AP and CP in FIG. 15, but one or more operations by the AP and the CP may also be performed by one processor which is functionally combined.

The CP may obtain the base station information and the connection information at a regular period. In this case, the base station information may include the cell ID and the frequency band, and the connection information may have a total connection time (T_tot), a time connected to a primary cell (T_pri), and/or a total received data amount (D_tot).

The CP may measure the connection time, the time connected to the primary cell, and/or the total received data amount for each item distinguished by the cell ID and frequency band during the set period.

The CP may be provided with a weight corresponding to each connection information from the AP, and may calculate a score by applying the weight to the connection information measured for each item. For example, the CP may calculate the score by multiplying the connection information by the weight and then summing the calculated scores all together, as in Equation 1 above.

Thereafter, the CP may sort the list based on the calculated score, select only upper K items (K is a positive integer), and transmit the base station information and the connection information to the AP. Here, the K value is provided by the AP.

Accordingly, the AP may generate and manage the connection list based on at least one of the base station information and the connection information received from the CP. As such, the connection information provided to the AP is added to the connection list, and becomes the basis for the generation and management of the learning list thereafter.

Referring to FIG. 17, the connection list may include the base station information and the connection information. In this case, the base station information may include the cell ID and the frequency band, and the connection information may have a total connection time (T_tot), a time connected to a primary cell (T_pri), and/or a total received data amount (D_tot).

Referring back to FIG. 17, the AP may select a candidate base station that needs to be learned at a predetermined period as follows. A list including one or more candidate base stations may be referred to as a candidate list. Here, the predetermined period may be a multiple of the connection information reporting period provided from the CP.

In an embodiment, the AP may generate and manage the connection list based on at least one of the base station information and the connection information received from the CP. The AP may initialize the connection list at a starting point of the predetermined period. The initialized list becomes an empty list, or is changed to a conventional linked list recorded at a specific time point. The AP may perform at least one of the following operations whenever the AP receives connection information from the CP.

In the embodiment, the AP may compare whether the received base station information (e.g., Cell ID, frequency band) exists in the pre-stored connection list, and as a result of the comparison, information which does not exist in the pre-stored connection list at least a portion of the received base station information may be added to the pre-stored connection list. In other words, if the received base station information does not exist in the connection list, the AP may add an item corresponding to the base station information to the connection list.

Further, in the embodiment, the AP may accumulate the total connection time (T_tot), the time connected to the primary cell (T_pri), and/or the total received data amount (D_tot) with respect to each base station information. As such, the accumulated connection information is used in the process of updating the candidate list.

The AP may perform at least one operation for updating the candidate list at the end of the predetermined period of the connection list.

In the embodiment, when the base station information of the connection list does not exist in the candidate list, the AP may add an item corresponding thereto and initialize the connection information. The initialized item becomes the empty list, or is changed to a conventional item recorded at a specific time point.

In the embodiment, the AP may update the connection information for each item of the candidate list based on the connection information of the connection list. When updating, alpha-tracking or moving average may be applied, but is not limited thereto.

Referring to FIG. 18, the AP may select a learning target and an exclusion target based on the total connection time (T_tot) for each item, the time connected to the primary cell (T_pri), and/or the total received data amount (D_tot) and the weight provided for each item. For example, the learning target indicates items in which the score calculated based on the weight exceeds a set reference value. For example, FIG. 18 exemplifies a case in which items having score_y and score_z have scores equal to or less than the reference value, and score_a, score_b, . . . , score_x have scores that exceed the reference value. In this case, items having score_y and score_z may be classified as the exclusion targets, and the remaining items may be classified as the learning targets.

Here, the weight provided for each item may be the same as or different from the weight used in the CP prior to generation and management of the connection list.

One or more items selected as the learning objects may be updated to the selection list, but one or more items selected as the exclusion objects are deleted from the candidate list.

Referring to FIG. 19, the AP may perform at least one operation to update or manage the selection list whenever the candidate list is updated.

In the embodiment, when one or more learning targets of the candidate list do not exist in the selection list, the AP may add one or more learning targets to the candidate list. A parameter (e.g., dropCount) associated with the deletion is mapped to each of one or more added learning targets. A value of the parameter associated with the deletion may be initialized to 0 or increased by one according to a configured algorithm. Meanwhile, the 'parameter associated with the deletion' may be used interchangeably with a 'deletion parameter'.

For example, when the learning target selected in the candidate list does not exist in the selection list, the deletion parameter is initialized to 0. As another example, when the learning target selected in the candidate list exists in the selection list, the deletion parameter is initialized to 0. As yet another example, an item of the selection list, which is not selected as the learning target increases the deletion parameter by 1.

More specifically, when the learning target selected from the candidate list does not exist in the selection list, the AP may add the selected learning target to the selection list and initialize a deletion parameter corresponding to the added item to 0. In addition, the AP may initialize the deletion parameters of one or more items in the selection list corresponding to one or more items selected as learning targets again to 0 in addition to the added item.

On the other hand, the AP may increase deletion parameters of items that do not correspond to one or more newly selected or re-selected learning objects by one. In other words, the AP may increase deletion parameter of all items whose deletion parameter is not updated to 0 by one.

Meanwhile, in the embodiment, when the deletion parameter exceeds a threshold value, the learning target corresponding to the item may be deleted from the selection list.

Further, in the embodiment, the deletion of at least one learning target from the selection list may also influence management of the learning list to be described below. Specifically, when one or more learning targets are deleted from the selection list, a cancel timer for respective items (i.e., learning environments) of the learning list associated with the base station which are the deleted learning targets starts. When an expiration period of the cancel timer is 0, the cancel timer is not started, but the corresponding learning environment is immediately deleted. On the contrary, when the expiration period of the cancel timer is not 0 and the base station which belongs to the learning environment included in the learning list before the cancel timer expires is added to the selection list again, the cancel timer is stopped. Further, when the expiration period of the cancel timer is not 0, but the cancel timer expires thereafter, the corresponding learning environment is then deleted from the learning list.

As such, the generated and managed selection list becomes a basis of the communication environment for collecting the training data.

As such, in various embodiments of the present disclosure, the connection information is just collected and the environment which is the resulting learning target is not specified, and the environment which is the learning target may be specified through the list selected through at least one process. At least one process before generating the selection list should not particularly performed in various embodiments of the present disclosure, and at least one of a pre-processing process before the generation of the connection list, a management process of the connection list, a management process of the candidate list, and a management process of the selection list may be omitted or combinationally performed based on an attribute of hardware. For example, when the pre-processing process is omitted, the CP is not selected according to the weight and all connection information is delivered to the AP. As another example, when the management process of the candidate list is omitted, the base station which is the learning target is not selected according to the weight, and the connection list and the selection list are compared with each other to manage the selection list.

In addition, referring to FIG. 20, in various embodiments of the present disclosure, at least one of the AP and/or the CP may select the learning environment based on the selection list. In FIG. 20, as the base station included in the selection list, a first base station BSa, a second base station BSb, and a third base station BSc are assumed. The first, second, and third base stations BSa, BSb, and BSc may have first and second, third coverages COa, COb, and COc, respectively.

Specifically, the AP transmits the selection list to the CP. The CP may transmit a connection state report to the AP whenever communication with at least one base station included in the selection list is connected or disconnected based on the selection list. Meanwhile, the base station associated with at least one item included in the selection list may be referred to as a 'selection base station'.

The AP may acquire the location information for the selection base station and store the acquired location information in the memory. Here, the location information of the terminal may be provided by the CP or a separate device (e.g., GPS). As an example, the AP may acquire and store the location information by one or more following operations.

In the embodiment, the AP the AP may be connected to the base station or may periodically obtain the location while connected. For example, in a first event E1 in which the terminal enters the third coverage COc, a third event E3 in which the terminal enters the first coverage COa, and a fifth event E5 in which the terminal enters the second coverage Cob, the AP may obtain the location. As another example, when second, fourth, and sixth events E2, E4, and E6 in which a set period expires are detected while the terminal is connected to any one of the first to third coverages COa, COb, and COc, the location may be then obtained.

In the embodiment, the AP may check whether the obtained location corresponds to the application region of the learning list. When a distance of the location from a center location of at least one learning environment included in the learning list is within an application radius r_apply based on the obtained location, the obtained location corresponds to the application range. Further, when the distance from the center location is within a learning radius r_training, the obtained location corresponds to the learning region (see FIG. 23).

Meanwhile, when the number of same items of the base station information is at least two in the learning list, an item in which the application radius is first checked.

In the embodiment, when the obtained location corresponds to the application region of at least one learning environment included in the learning list, the AP does not store the location information. In this case, the AP increments a parameter indicating that the AP enters the application region by 1 instead of storing the location information. The parameter indicating entering the application region may be referred to as 'In-region parameter (N_in-region)'. When the In-region parameter is equal to or more than a set reference value (N_extend-period), the AP may increase the location obtaining period of the terminal. Here, N_extend-period may be referred to as a period extension parameter.

In this case, for the increased period, values larger than the current period may be selected among one or more possible periods, and a smallest value may be selected from the selected large values. When the current period is the largest value among one or more possible periods, the AP maintains the current period. Meanwhile, when the obtained location does not correspond to the application region of the learning list, the AP stores the location information and sets the location obtaining period associated with the location to the smallest value among one or more possible periods.

Referring to FIG. 21, multiple location information which is obtained is used as an element for selecting the learning environment. The learning environment is provided through the multiple obtained location information or a clustering based on the location samples sampled from the location information. For example, the terminal may collect the multiple location information while moving via the first to third coverages COa, COb, and COc. In this case, the location information may be concentrated and collected in a predetermined place. As such, the reason why the location information is concentrated and collected is that the terminal frequently stays in a specific place according to a movement routine of the user. The location information may be collected whenever a predetermined period expires in the place where the user frequently stays, and a result of collecting the location information concentrated in the specific place may be derived.

Figure 22:
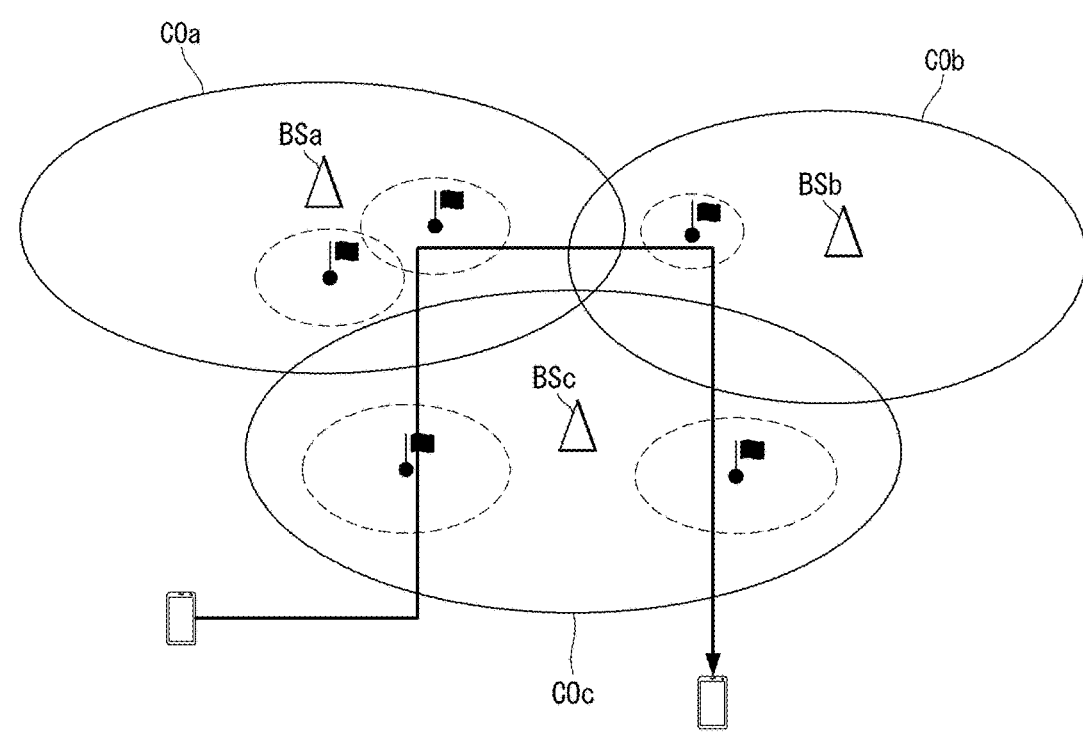
Figure 23:
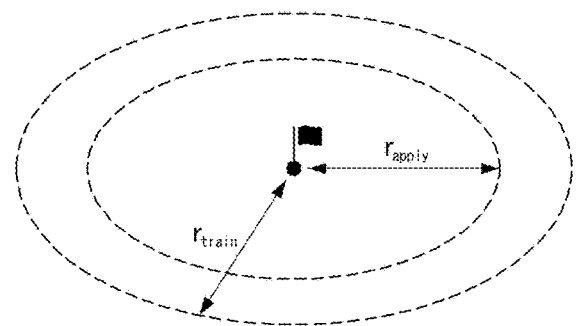

Referring to FIG. 22, in the embodiment, when the number of multiple location information or location samples is equal to or more than a minimum number (N_clustering-point) required for selecting a learning place, the AP may perform clustering and determine center locations, learning radii, and application ranges of one or more clusters generated as the result of the clustering. For example, in FIG. 22, at least one cluster is represented by a dotted circle or oval, and the center location is represented by a flag.

Further, in the embodiment, the AP may also determine the center location, the learning radius, and the application radius only for a cluster in which the number (n_cluster-point) of location information or location samples included in one or more generated clusters is equal to or more than a set reference value (N_min-point).

In various embodiments, the AP may classify the multiple location information or location samples into one or more location groups using a clustering algorithm. The clustering algorithm may adopt a dense-based clustering algorithm, but is not limited thereto. Here, the clustering algorithm includes, for example, Density-Based Spatial Clustering of Applications with Noise (DBSCAN) and Mean-Shift Clustering, but is not limited thereto.

In various embodiments, the AP may calculate the center location of each of one or more clusters using a predetermined technique. For example, the center location may be calculated by average means of longitudes and latitudes of one or more location information or location samples, or calculated by applying a k-Nearest Neighbor algorithm.

Referring to FIG. 24, in various embodiments, the AP may confirm distance values from the center location of the cluster to the location information or location samples of the cluster, and determine the learning radius r_train based on the confirmed distance values. For example, the linear radius may be calculated based on Equation 2 below.

$$\text{Learning radius}(r\_train) = \min(\max(\alpha \cdot \text{standard deviation}, r\_train\text{-}min)r\_train\text{-}max \qquad [\text{Equation 2}]$$

In Equation 2, r_train-min represents a minimum value of the learning radius, r_train-max represents a maximum value of the learning radius, and $\alpha$ represents a real number greater than 0. For example, a may adopt values of 3 and 4.

In various embodiments, the AP determines an application radius r_apply for applying a machine hot class network for which learning is completed from the learning radius. The application radius may be determined based on an error of location measurement. Preferably, the application radius is smaller as the error of the location measurement is greater. For example, the application radius may be calculated based on Equation 3 below.

$$\text{Application radius}(r\_apply) = \beta \cdot \text{leanring radius}(r\_train), (0 < \beta \le 1) \qquad [\text{Equation 3}]$$

In Equation 3, $\beta$ represents a real number greater than 0 and less than or equal to 1.

In various embodiments, the AP deletes all of one or more location information or location samples stored in the memory of the base station belonging to one or more clusters. In this case, the remaining location information or location samples that are not deleted may be used together with newly added location information or location samples to select a new learning environment.

In the embodiment, the AP may add the determined center location and learning radius to the learning list together with the base station information. In this case, the added item is initialized in an acquisition state.

In various embodiments, at least one of the AP or the CP manages the status of each item of the learning list, and performs a process related thereto based on the state information of the item.

The state information may include at least one of the following information.

Acquiring: Data for learning is acquired.

Training: Additional training is performed by using the data for learning acquired based on a basic model. The basic model means a machine learning network before on-device learning is performed.

Verifying: The performance of a model of which learning is completed is verified in the actual use environment. The actual use environment refers to an environment to which the machine learning network generated in the learning environment associated with the learning environment of the machine learning network in which on-device learning is performed is to be applied. Further, a model of which learning is completed in the actual use environment may be referred to as an adaptive machine learning network.

Applying: A mode of which learning and verifying are completed is applied to the actual use environment.

Barred: Selected as the learning environment, but excluded from the candidate list for a predetermined time or semi-permanently by a set timer in a state of failing to the learning or verifying.

Hereinafter, in the present disclosure, various embodiments based on the learning state or the barred state will be described below.

J.2. Collection of Training Data

FIGS. 25 and 26 are diagrams for exemplarily describing a training data collecting method according to an embodiment of the present disclosure.

Referring to FIG. 25, at least one of an AP130a and a CP130b confirms state information of at least one item of the learning list and performs at least one operation to be described below for each item of the learning list in the acquisition state to collect the data for learning.

First, the AP130a may confirm the state information of the learning list and transmit the learning environment which is in the acquisition state from the CP130b. In this case, the AP130a may also jointly transmit one or more base station lists included in the transmitted learning environment.

Whenever the CP130b is connected to or disconnected from the base station of the received learning environment, the CP130b may report the connection or disconnection to the AP130a.

In the embodiment, the AP130a may be connected to one or more base stations which belong to the learning environment or obtain the location information of the terminal periodically while connected. The location information of the terminal is provided by the CP130b or a separate device (e.g., GPS). Here, the location information is to check whether the terminal is positioned within the learning radius of the learning environment capable of collecting data for_training the machine learning network unlike a previous location sample for determining the learning environment.

In the embodiment, the AP130a may confirm that the location of the terminal enters the learning radius from the center location of the learning environment based on the collected location information.

In the embodiment, when an event in which the terminal enters the learning radius of the learning environment is detected, the AP130a requests the CP130b to collect the data for learning. When such a request is received, the CP130b may request the connected base station to transmit the data for learning and collect reception related data for learning of the receiver received thereafter. For example, the learning data may include a reception related parameter. The reception related parameter includes information related to a received signal. That is, the reception related parameter may include at least one of a signal to noise ratio (SNR), a received signal strength indication (RSSI), a reference signal received power (RSRP), or a reference signal reception quality.

In the embodiment, when the CP130b receives the learning data from the base station, the CP130b may transmit information related to the received signal to the AP130a. In this case, the CP130b collects the information related to the signal received from the base station to constitute a learning data sample and transmit the learning data sample to the AP130a. Further, the CP130b may also transmit tow or more accumulated learning data samples to the AP130a at once.

In the embodiment, the AP130a may store the learning data sample provided from the CP130b in the nonvolatile memory 120 ora storage.

In the embodiment, the AP130a may request the CP130b to stop collecting the data for learning when it is detected that the terminal departs from the environment which is the learning target. In this case, the departure from the learning environment means a departure outside the learning radius from the center location of the learning environment.

In the embodiment, when a sufficient number of learning data is collected, the AP130a requests the CP130b to stop the collection of additional learning data related to the corresponding learning environment thereafter. As such, when sufficient data is collected to stop the collection of the learning data, the AP130a may change the state of the learning environment, which is the target of the collection stop, from the acquisition state to the learning state.

FIG. 26 is a diagram for exemplarily describing a collection process of training data.

Referring to FIG. 26, the terminal may pass through the inside of the coverage of the first base station BSa. In this case, the terminal may pass through an learning environment ENVX positioned in the coverage of the first base station BSa. In particular, FIG. 26 will be described on the assumption that the terminal passes through both the learning region and the application region.

When a first event of entering the coverage of the first base station BSa occurs, the terminal may be connected to the first base station BSa and the terminal may obtain the location information.

When a second event EEE2 of entering the learning radius of the learning environment ENVX while monitoring a location in the coverage of the first base station BSa is detected, the terminal may obtain the learning data from the base station. Thereafter, when a fifth event EEE5 in which the terminal departs outside the learning radius is detected, the terminal stops to collect the learning data.

When a sixth event in which the terminal departs outside the coverage of the first base station BSa occurs, the terminal collects the location information.

Meanwhile, when third and fourth events EEE3 and EEE4 in which the terminal enters the application region or departs from the application region are detected, the AP130a checks the learning list to acquire the learning data in the case of one or more items in the acquisition state and apply the learned machine learning network in the case of the application state.

J.3. Learning, Application, and Verification of Adaptive Machine Learning Network J.3.1. Learning Process FIG. 27 is a diagram for exemplarily describing a machine learning network update method according to an embodiment of the present disclosure.

Referring to FIG. 27, in various embodiments of the present disclosure, at least one of the AP and the CP performs on-device learning through at least one operation below for a basic model with respect to one or more items of the learning list in the learning state. As described above, operations by the AP and/or CP may be used interchangeably with operations by at least one processor 130.

The basic model means the machine learning network in which the on-device learning by the client device is not performed as described above.

The learning states of one or more items of the learning list may include a learning progress state, a learning possible state, and a learning impossible state in detail.

The learning progress state means a learning situation recorded for each of one or more time points of the machine learning network of which learning is in progress.

The learning possible state means a state in which the machine learning network may be learned by the client device. For example, the terminal may be in a charging situation of receiving power by a charging device or a predetermined time (e.g., between 00 a.m. and 05 a.m.) may be set to the learning possible state. In this case, the set time may be adjusted by the user.

The learning impossible state means a state in which the machine learning network may not be learned by the client device.

First, the AP may initialize the learning progress state of the item in the learning state. Here, initialization means setting a start point for starting recording of the learning progress state. Thereafter, the learning progress state is not initialized for one or more items of which learning is in progress, and new learning is in progress subsequently from a previous learning progress state.

The AP may perform learning when the terminal becomes the learning possible state. When there is learning which is in progress in advance, the learning may be performed continuously from the learning progress state of learning performed before the learning possible state of a current time point.

The AP stores the learning progress states of the machine learning network under learning under learning at each predetermined time point of performing the learning and the machine learning network in the nonvolatile memory 120 or the storage. Even if the learning is stopped due to an unexpected situation, the AP may continue learning based on the stored learning progress after the system is normalized. For example, in the case of an algorithm based on iterative updates, such as stochastic gradient descent (SGD), the AP may store a progress state whenever a predetermined number of iteration tasks are completed.

On the other hand, when the terminal becomes in the learning impossible state, the AP may stop the learning of the machine learning network and store a final learning progress state in the nonvolatile memory 120 or storage. Here, the event that becomes the learning impossible state means all events that do not become the above-described learning possible state. For example, when the terminal is separated or spaced apart from the charging device, or an event that does not fall within a predetermined learning possible time range occurs, the terminal is classified as the learning impossible state.

The AP repeats the processes of J.3.1 described above until the learning is completed. When the learning is successfully completed, the AP discards the learning data stored in the memory 120, and stores the machine learning network in which the learning is completed in the memory 120. In addition, when the learning is completed, the AP may change the state of the learning environment corresponding to or related to the machine learning network in which the learning is completed to the verification state.

When the learning is unsuccessful, the AP may increase a learning failure parameter by 1. The learning failure parameter is defined as the number of learning failures. The learning failure means a case in which the training error is not small enough or the difference between the training error and the test error (or generalization error) is not small enough in the learning process of the machine learning network by the AP, but is not limited thereto.

When an event in which the learning failure parameter becomes greater than or equal to a predetermined threshold (N_train-max-try) occurs, the AP deletes learning data associated with or corresponding to the learned machine learning network associated with or corresponding to the occurring event from the memory 120, and sets the state information of the learning environment corresponding to the occurring event to the barred state.

In contrast, when the failure parameter is less than the predetermined threshold (N_train-max-try), the AP performs the learning again after additionally acquiring the learning data.

On the other hand, even a machine learning network of which learning is completed as such may exhibit lower performance than a machine learning network that is not learned in the actual use environment. Therefore, the machine learning network before/after may be verified in the actual use environment. As a result, hereinafter, the verification process will be described.

J.3.2. Verification Process

Figure 29:
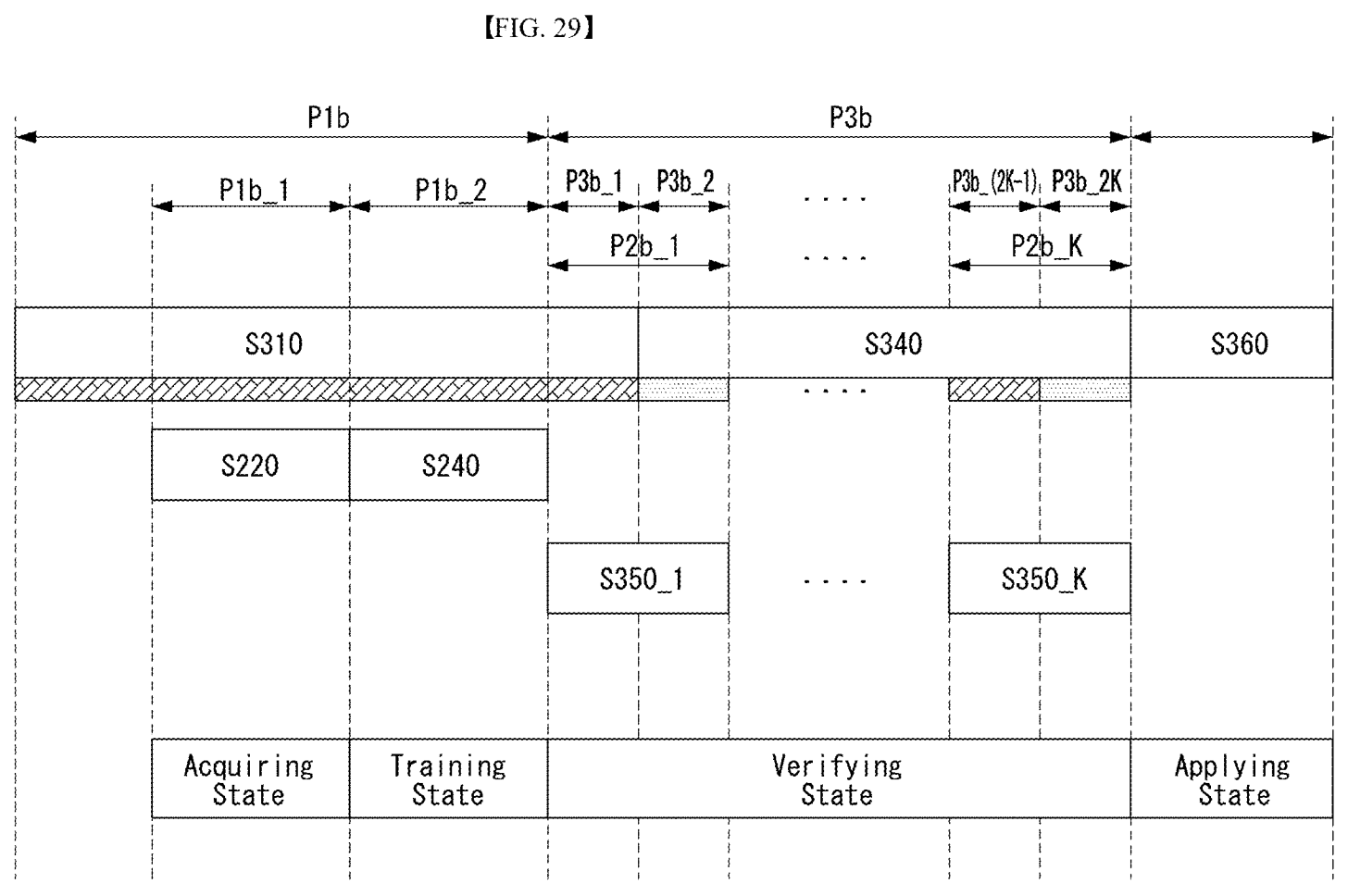

FIGS. 28 and 29 are diagrams for exemplarily describing a verification method of a machine learning network according to an embodiment of the present disclosure.

At least one of the AP and the CP may check one or more items in the learning list, and compare the performance of the machine learning network before and after learning in the actual use environment with respect to the item in the verification state.

As a comparison result, when it is determined that the performance of a new machine learning network is further improved, the AP may control the receiver by applying the newly learned machine learning network. On the contrary, when it is determined that the performance of the machine learning network before learning is better, the AP may control the receiver by applying the existing machine learning network.

Here, the performance may be compared using a performance measurement criterion of a radio link, such as Block Error Rate (BLER), Packet Error Rate (PER), Symbol Error Rate (SER), or Bit Error Rate (BER).

A performance comparison technique used in various embodiments of the present disclosure may be performed by at least one of a first verification technique or a second verification technique, but is not limited thereto.

According to an embodiment, in the first verification technique, the AP measures reception performance by applying the machine learning network before learning until the learning of the machine learning network is completed, and measures the reception performance by applying the new machine learning network when the learning is completed.

Referring to FIG. 28, the AP may communicate by applying the machine learning network before learning during an interval of P1a (S210). As in S210 above, the AP may obtain learning data for learning the machine learning network during an interval P1a_1 while communicating by applying the machine learning network before learning (S220). Further, when the learning data is sufficiently collected, the AP may train the machine learning network during an interval of P1a_2 by using the collected data (S240). Meanwhile, the AP may collect data for performance measurement during an interval of P1a_3 which is at least a part of P1a. Here, the collected data represents the performance of the machine learning data before learning.

If sufficient performance information for performance comparison is not measured even after the learning of the machine learning network is completed, the starting point of receiving performance measurement when a new machine learning network is applied may be delayed until the performance measurement of the existing machine learning network is completed.

After the interval of Pia, the AP may apply the machine learning network learned during the interval of P3a to the receiver (S250). The AP may collect data for measuring the performance of the machine learning network learned during at least a part of the interval of P3a (S260).

In the first verification technique, when the performance measurement of the machine learning network after learning is completed, the AP may compare the performance measurement of the machine learning network after learning with the performance of the machine learning network before learning. In addition, based on the comparison result, any one of the machine learning networks before and after learning may be selected and applied to the receiver (S270).

For example, the CP may measure the performance of the machine learning network before learning and transmit the performance of the machine learning network before learning to the AP periodically or whenever a certain amount or more of data is received during the period during which the collection of learning data is performed.

After the measured performance information related to the machine learning network before learning is sufficiently obtained, the on-device learning is completed and when the AP enters the learning environment which is the target of the learning while the application of the new machine learning network is ready, the AP requests application of the new machine learning network to the CP.

In response to the request to apply the new machine learning network, the CP controls data reception by applying the new machine learning network, periodically or whenever data of a predetermined amount or more is received, measures the performance by the new machine learning network and delivers the measured performance to the AP.

The AP may compare the performance data by the machine learning network before learning if the performance data by the new machine learning network is sufficiently collected.

In this case, when the AP determines that the performance of the new machine learning network is further improved, the AP stops measuring the performance and changes the state information of the corresponding item to the application state. In addition, the AP may change the state information to the application state and simultaneously store all the performance data of the machine learning network before and after learning in the memory. In this way, the stored performance data may be used to check the performance degradation of the machine learning network that may occur later in time.

Conversely, when the AP determines that the performance of the existing machine learning network is better, the verification failure parameter is increased by 1. The verification failure parameter means the number of verification failures. When the verification failure parameter is greater than or equal to a predetermined threshold (N_veryfiy-max-try), the AP removes the learning data and the learned machine learning network from the memory. In addition, the AP may change the item of the learning list corresponding to the machine learning network learned to the barred state at the same time as the removal. When the verification failure parameter is less than the predetermined threshold (N_verify-max-try), the on-device learning and verification process may be performed again after acquiring the learning data again.

According to another embodiment, in the second verification technique, the AP alternately applies the machine learning network before learning and the machine learning network after learning during a predetermined time interval from the time point when the learning of the machine learning network is completed, and measures and compares the performance.

Referring to FIG. 29, the AP may communicate by applying the machine learning network before learning during an interval of P1b (S310). As in S310 above, the AP may obtain learning data for learning the machine learning network during an interval P1b_1 while communicating by applying the machine learning network before learning (S320). Further, when the learning data is sufficiently collected, the AP may train the machine learning network during an interval of P1b_2 by using the collected data (S330).

Thereafter, the AP may repeatedly perform measurement and comparison of the performance of the machine learning network before and after learning during a predetermined time interval (S340). For example, the first to Kth performance comparison (K is a positive integer) may be performed by applying and comparing the machine learning network before and after learning (S350_1, . . . , S350_K). In this case, the P3b_1 value and the P3b_2 value, which are the lengths of the application period of the machine learning network for performance comparison, may be the same. In addition, the lengths (P2b_1, P2b_K) of the performance comparison interval repeatedly performed several times may be set to be the same.

When the performance comparison is completed, any one of the machine learning networks before and after learning may be selected and applied to the receiver (S360).

For example, the AP may measure and accumulate performance data of the machine learning network before learning and the machine learning network after learning. The AP applies the machine learning network before and after learning with the CP to the receiver and sequentially requests to measure the performance. When the performance measurement is requested, the AP may deliver control information including at least one of a measurement period or an amount of data required to be received while performing the measurement. The CP may measure the performance while receiving the requested data during the requested period by applying the machine learning network requested by the AP and deliver the measured performance to the AP.

Whenever the performance measurement of the machine learning network before and after learning is completed, the AP may determine whether the performance of the new machine learning network is improved over the machine learning network before learning through statistical hypothesis verification.

In this case, when the reliability of the determination result satisfies a predetermined reliability and the performance of the new machine learning network is improved, the AP stops the performance comparison process and applies the new machine learning network to the receiver. Further, when the reliability of the determination result satisfies the predetermined reliability and the performance of the new machine learning network is improved, the AP stops the performance comparison process and applies the existing machine learning network to the receiver.

However, when the reliability of the determination result does not satisfy the predetermined reliability, the AP checks whether the verification time is exceeded. In this case, when the allowed performance verification time is not exceeded, the AP again acquires and accumulates performance data to perform verification. In contrast, when the allowed performance verification time is exceeded, the AP stops the performance comparison procedure and uses the machine learning network before learning.

Meanwhile, in some embodiments, the AP may also initialize the performance data measured in association with the machine learning network before learning and the machine learning network after learning before acquisition and accumulation of the performance data.

J.3.3. Application Process

FIGS. 30 to 32 are diagrams for exemplarily describing an application method of the machine learning network according to an embodiment of the present disclosure.

Referring to FIG. 30, at least one of the AP130*a* and the CP130*b* may check one or more items in the learning list and, when the items are in the application state, at least one may perform communication using the learned machine learning network. This application process may be divided into a case in which the CP130*b* may not directly acquire the location information without relying on the AP130*a*, and a case in which the CP130*b* may directly acquire the location information.

First, a case in which the CP130*b* may not directly acquire the location information without relying on the AP130*a* will be described.

The AP130*a* may transmit a base station list (BS List) of the learning environment in the application state to the CP130*b*. Here, the base station list in the learning environment means a list including information on one or more base stations positioned within the application radius of the learning environment. In addition, one or more base stations included in the base station list of the learning environment may be limited to base stations associated with selection of the learning environment. Accordingly, a base station that is irrelevant to the selection of a learning environment having little relevance to the learned machine learning network (ML model) may be excluded from the application target.

Whenever the CP130*b* is connected to or disconnected from the base station which is the application target of the learned machine learning environment, the CP130*b* may report the connection or disconnection to the AP130*a*.

The CP130*b* may be connected to the base station which is the application target or may acquire the location information of the terminal periodically while being connected to the base station. Here, the acquisition of the location information may be performed in combination with the above-described method for acquiring the location information in various embodiments of the present disclosure. However, in an embodiment, in the case of the application process, the acquisition period of the location information may be adjusted in inverse proportion to the movement speed of the terminal.

When an event in which the terminal enters the application radius of the application target environment is detected based on the acquired location information, the AP130*a* may deliver the machine learning network learned in the environment in which the event is detected to the CP130*b*. In addition, the AP 130*a* may request the application of the delivered machine learning network. In this case, the application request of the machine learning network may be performed simultaneously with the delivery operation.

When the machine learning network requested from the AP130*a* exists, and the base station information associated with the machine learning network matches the base station information currently connected to the terminal, the CP130*b* may perform communication using the requested machine learning network. When the base station information does not match, the CP130*b* may perform communication using the machine learning network before learning.

The AP130*a* may request the CP130*b* to stop application of the machine learning network associated with the learning environment corresponding to the applicable radius when the terminal deviates outside the applied radius based on the acquired location information. In this case, when the CP130*b* receives the request to stop the application, the CP130*b* may perform communication by applying the machine learning network before learning.

Meanwhile, in various embodiments, when two or more application target environments are adjacent to each other, and the terminal continuously moves from the first application target environment to the second application target environment, the AP130*a* may enter the second application target environment while performing communication in the first machine learning network and control communication by switching to the second machine learning network associated with the second application target environment.

Next, a case in which the CP130*b* may directly acquire the location information will be described.

Referring to FIG. 31, the CP130*b* may create and manage a maximum of N_apply-model learned application model lists L2. Here, N_apply-model is a positive integer of 1 or more.

The AP130*a* delivers a list of learning environments in the application state to the CP130*b*. In this case, the AP130*a* may deliver at least one of the base station information and the location information jointly with the list of the learning lists. In this case, the AP130*a* delivers changed information whenever there is a change or a list of the learning environments in an entire application state again.

Referring to FIG. 32, the CP130*b* periodically acquires the location information of the terminal to select application target environments which may enter within a set time according to a current location of the terminal, distances of the terminal from the application target environments, and a movement speed and a movement direction of the terminal. Referring to FIG. 32(*a*), at least one processor may calculate a score for at least one candidate environment by applying a weight to input data. Then, at least one processor selects at least one of the calculated scores to select the application target environment.

Further, referring to FIG. 32(*b*), at least one processor may calculate a probability value for at least one candidate environment by further adding a sigmoid layer to the machine learning network used in FIG. 32(*a*). In this case, based on the calculated probability value, at least a part of at least one candidate environment may be calculated as the application target environment.

Referring back to FIG. 31, the CP130*b* may request the learned machine learning network to the AP130*a* if there are learning environments that do not have the learned machine learning network. Accordingly, all learning environments included in a list L2 may have machine learning networks associated therewith.

In various embodiments, the CP130*b* may adjust the acquisition period of the location information based on at least one of the distances to the application target environments, and the moving speed and direction of the terminal. As a minimum distance to the application target environments is smaller, the movement speed of the terminal is faster, and a target environment direction and the movement direction are the same, a shorter period is set.

The AP130*a* may deliver the learned machine learning network of the requested learning environment to the CP130*b*.

The CP130*b* may add the learned machine learning network received from the AP130*a* to the applied model list L2. In this case, if there is no empty space in the applied model list L2, the CP130*b* discards the machine learning network that is unlikely to be used within the set time and adds the newly received machine learning network.

The CP130*b* applies the machine learning network before learning and a maximum of N_apply-model learned application models based on at least one of the location information of the terminal or the connection state with the base station.

For example, while the terminal is connected to the base station of the application target environment and is within the application radius, the CP130*b* may perform communication using the machine learning network included in the application model list L2. When there is no machine learning network associated with the learning environment of the application radius in the application model list, the associated machine learning network may be requested to the AP130*a*.

In addition, when the terminal is disconnected from the base station of the application target environment or deviated from the application radius, the CP130*b* may perform communication by applying the machine learning network before learning.

Meanwhile, in various embodiments, when two or more application target environments are adjacent to each other, and the terminal continuously moves from the first application target environment to the second application target environment, the AP130*a* may enter the second application target environment while performing communication in the first machine learning network and control communication by switching to the second machine learning network associated with the second application target environment.

Meanwhile, at least one of the AP130*a* and the CP130*b* may operate a performance check timer at the starting point of the application state. In this case, the performance check timer is operated corresponding to each of the items of the learning list in the application state.

When the performance check timer expires, the AP130*a* may request performance measurement data to the CP130*b*. As an example, when the CP 130*b* may not directly acquire the location information without the AP130*a*, the AP 130*a* may request application of the learned machine learning network and measurement of the performance thereof. As another example, when the CP130*b* may directly acquire the location information, the AP130*a* may deliver the list of the learning environments in the application state or request measurement of the performance jointly with the change thereof.

The CP130*b* measures the performance whenever the machine learning network learned in the environment in which the performance measurement is requested is applied and delivers the performance to the AP130*a*.

When performance measurement data of a set amount or more is secured, the AP130*a* compares the currently measured performance with performance values stored in advance in the verification process of the learned machine learning network to determine whether the performance is degraded. The performance measurement data may be accumulated by, for example, operating a timer when the timer expires or whenever the application radius is entered.

In this case, the AP130*a* determines that the performance is degraded when the current performance falls below a predetermined level compared to the verification performance of the machine learning network learned or below the performance of the machine learning network before learning. Further, when the performance degradation occurs, the AP130*a* stops applying the learned model and transitions to the acquisition state. When the performance degradation does not occur, the AP130*a* restarts the performance check timer.

J.4. Relearning and Barring of Learning Model

FIGS. 33 and 34 are diagrams for exemplarily describing a management method of an item in a locked state according to an embodiment of the present disclosure.

Referring to FIG. 33, at least one of the AP130*a* and the CP130*b* may check one or more items in the learning list and, when the items are in the barred state, at least one may operate a barring release timer at the starting point of the barred state. When the barring release timer expires, the AP130*a* may delete the expired item from the learning list. In this case, the item which is released from barring and deleted from the learning list may also be selected as the learning environment again.

Referring to FIG. 34, since at least one processor does not acquire the location sample within the application radius before the item is deleted, at least one processor may not select or generate the learning environment associated with the item, but may not apply the deleted item when the item is deleted and may collect the location sample inside the application radius of the deleted item.

When location samples of a set number or more are stored, at least one processor may select a new learning environment independent from the deleted item again. Here, in the new selected learning environment, the deleted learning environment and center location and/or radius information (e.g., the application radius and the learning radius) may be set differently.

The learning environment which is selected again is set to the learning state as described above. A subsequent duplicated description will be omitted.

K. Device to Implement the Embodiment(s)

A user interface associated with on-device learning may be provided to devices to which the method according to various embodiments of the present disclosure is applied.

The user interface may include at least one of a full function On/Off interface, a condition for acquiring data for learning, a learning available time, or a state check/control interface of the learning list.

In this case, the state check/control interface of the learning list classifies the items according to the state of each item of the learning list and displays the state so that the user may recognize the state in the order of application, verification, learning, acquisition, and barring.

In addition, the state check/control interface of the learning list provides information for each item (e.g., environment name set by the user, base station information, place information, application state, the case of the application state, a degree of performance improvement compared to the reference model, the case of the barred state, barring expiration date, expiration date, etc.). Environment names represent, for example, our home, office, and the like. The base station information may include a cell ID and a frequency band. The place information may include the center location and the learning/application radius. In this case, the center location may be represented as an address and latitude/ longitude (/altitude).

Meanwhile, the user may also delete the item of the learning list through the interface.

K.1. Example of Communication System Applied to Present Disclosure

The various descriptions, functions, procedures, proposals, methods, and/or operational flowcharts of the present disclosure described in this document may be applied to, without being limited to, a variety of fields requiring wireless communication/connection (e.g., 5G) between devices.

Hereinafter, a description will be given in more detail with reference to the drawings. In the following drawings/description, the same reference symbols may denote the same or corresponding hardware blocks, software blocks, or functional blocks unless described otherwise.

FIG. 35 illustrates a communication system applied to the present disclosure.

Referring to FIG. 35, a communication system applied to the present disclosure includes wireless devices, Base Stations (BSs), and a network. Herein, the wireless devices represent devices performing communication using Radio Access Technology (RAT) (e.g., 5G New RAT (NR)) or Long-Term Evolution (LTE)) and may be referred to as communication/radio/5G devices. The wireless devices may include, without being limited to, a robot 100a, vehicles 100b-1 and 100b-2, an eXtended Reality (XR) device 100c, a hand-held device 100d, a home appliance 100e, an Internet of Things (IoT) device 100f, and an Artificial Intelligence (AI) device/server 400. For example, the vehicles may include a vehicle having a wireless communication function, an autonomous driving vehicle, and a vehicle capable of performing communication between vehicles. Herein, the vehicles may include an Unmanned Aerial Vehicle (UAV) (e.g., a drone). The XR device may include an Augmented Reality (AR)/Virtual Reality (VR)/Mixed Reality (MR) device and may be implemented in the form of a Head-Mounted Device (HMD), a Head-Up Display (HUD) mounted in a vehicle, a television, a smartphone, a computer, a wearable device, a home appliance device, a digital signage, a vehicle, a robot, etc. The hand-held device may include a smartphone, a smartpad, a wearable device (e.g., a smartwatch or a smartglasses), and a computer (e.g., a notebook). The home appliance may include a TV, a refrigerator, and a washing machine. The IoT device may include a sensor and a smartmeter. For example, the BSs and the network may be implemented as wireless devices and a specific wireless device 200a may operate as a BS/network node with respect to other wireless devices.

The wireless devices 100a to 100f may be connected to the network 300 via the BSs 200. An AI technology may be applied to the wireless devices 100a to 100f and the wireless devices 100a to 100f may be connected to the AI server 400 via the network 300. The network 300 may be configured using a 3G network, a 4G (e.g., LTE) network, or a 5G (e.g., NR) network. Although the wireless devices 100a to 100f may communicate with each other through the BSs 200/network 300, the wireless devices 100a to 100f may perform direct communication (e.g., sidelink communication) with each other without passing through the BSs/network. For example, the vehicles 100b-1 and 100b-2 may perform direct communication (e.g. Vehicle-to-Vehicle (V2V)/Nehicle-to-everything (V2X) communication). The IoT device (e.g., a sensor) may perform direct communication with other IoT devices (e.g., sensors) or other wireless devices 100a to 100f.

Wireless communication/connections 150a, 150b, or 150c may be established between the wireless devices 100a to 100f/BS 200, or BS 200/BS 200. Herein, the wireless communication/connections may be established through various RATs (e.g., 5G NR) such as uplink/downlink communication 150a, sidelink communication 150b (or, D2D communication), or inter BS communication (e.g. relay, Integrated Access Backhaul (IAB)). The wireless devices and the BSs/the wireless devices may transmit/receive radio signals to/from each other through the wireless communication/connections 150a and 150b. For example, the wireless communication/connections 150a and 150b may transmit/receive signals through various physical channels. To this end, at least a part of various configuration information configuring processes, various signal processing processes (e.g., channel encoding/decoding, modulation/demodulation, and resource mapping/demapping), and resource allocating processes, for transmitting/receiving radio signals, may be performed based on the various proposals of the present disclosure.

Example of Wireless Device Applied to the Present Disclosure.

FIG. 36 illustrates wireless devices applicable to the present disclosure.

Referring to FIG. 36, a first wireless device 100 and a second wireless device 200 may transmit radio signals through a variety of RATs (e.g., LTE and NR). Herein, {the first wireless device 100 and the second wireless device 200} may correspond to {the wireless device 100x and the BS 200} and/or {the wireless device 100x and the wireless device 100x} of FIG. 35.

The first wireless device 100 may include one or more processors 102 and one or more memories 104 and additionally further include one or more transceivers 106 and/or one or more antennas 108. The processor(s) 102 may control the memory(s) 104 and/or the transceiver(s) 106 and may be configured to implement the descriptions, functions, procedures, proposals, methods, and/or operational flowcharts disclosed in this document. For example, the processor(s) 102 may process information within the memory(s) 104 to generate first information/signals and then transmit radio signals including the first information/signals through the transceiver(s) 106. The processor(s) 102 may receive radio signals including second information/signals through the transceiver 106 and then store information obtained by processing the second information/signals in the memory(s) 104. The memory(s) 104 may be connected to the processor(s) 102 and may store a variety of information related to operations of the processor(s) 102. For example, the memory(s) 104 may store software code including commands for performing a part or the entirety of processes controlled by the processor(s) 102 or for performing the descriptions, functions, procedures, proposals, methods, and/or operational flowcharts disclosed in this document. Herein, the processor(s) 102 and the memory(s) 104 may be a part of a communication modem/circuit/chip designed to implement RAT (e.g., LTE or NR). The transceiver(s) 106 may be connected to the processor(s) 102 and transmit and/or receive radio signals through one or more antennas 108. Each of the transceiver(s) 106 may include a transmitter and/or a receiver. The transceiver(s) 106 may be interchangeably used with Radio Frequency (RF) unit(s). In the present disclosure, the wireless device may represent a communication modem/circuit/chip.

The second wireless device 200 may include one or more processors 202 and one or more memories 204 and additionally further include one or more transceivers 206 and/or one or more antennas 208. The processor(s) 202 may control the memory(s) 204 and/or the transceiver(s) 206 and may be configured to implement the descriptions, functions, procedures, proposals, methods, and/or operational flowcharts disclosed in this document. For example, the processor(s) 202 may process information within the memory(s) 204 to generate third information/signals and then transmit radio signals including the third information/signals through the transceiver(s) 206. The processor(s) 202 may receive radio signals including fourth information/signals through the transceiver(s) 106 and then store information obtained by processing the fourth information/signals in the memory(s) 204. The memory(s) 204 may be connected to the processor(s) 202 and may store a variety of information related to operations of the processor(s) 202. For example, the memory(s) 204 may store software code including commands for performing a part or the entirety of processes controlled by the processor(s) 202 or for performing the descriptions, functions, procedures, proposals, methods, and/or operational flowcharts disclosed in this document. Herein, the processor(s) 202 and the memory(s) 204 may be a part of a communication modem/circuit/chip designed to implement RAT (e.g., LTE or NR). The transceiver(s) 206 may be connected to the processor(s) 202 and transmit and/or receive radio signals through one or more antennas 208. Each of the transceiver(s) 206 may include a transmitter and/or a receiver. The transceiver(s) 206 may be interchangeably used with RF unit(s). In the present disclosure, the wireless device may represent a communication modem/circuit/chip.

Hereinafter, hardware elements of the wireless devices 100 and 200 will be described more specifically. One or more protocol layers may be implemented by, without being limited to, one or more processors 102 and 202. For example, the one or more processors 102 and 202 may implement one or more layers (e.g., functional layers such as PHY, MAC, RLC, PDCP, RRC, and SDAP). The one or more processors 102 and 202 may generate one or more Protocol Data Units (PDUs) and/or one or more Service Data Unit (SDUs) according to the descriptions, functions, procedures, proposals, methods, and/or operational flowcharts disclosed in this document. The one or more processors 102 and 202 may generate messages, control information, data, or information according to the descriptions, functions, procedures, proposals, methods, and/or operational flowcharts disclosed in this document. The one or more processors 102 and 202 may generate signals (e.g., baseband signals) including PDUs, SDUs, messages, control information, data, or information according to the descriptions, functions, procedures, proposals, methods, and/or operational flowcharts disclosed in this document and provide the generated signals to the one or more transceivers 106 and 206. The one or more processors 102 and 202 may receive the signals (e.g., baseband signals) from the one or more transceivers 106 and 206 and acquire the PDUs, SDUs, messages, control information, data, or information according to the descriptions, functions, procedures, proposals, methods, and/or operational flowcharts disclosed in this document.

The one or more processors 102 and 202 may be referred to as controllers, microcontrollers, microprocessors, or microcomputers. The one or more processors 102 and 202 may be implemented by hardware, firmware, software, or a combination thereof. As an example, one or more Application Specific Integrated Circuits (ASICs), one or more Digital Signal Processors (DSPs), one or more Digital Signal Processing Devices (DSPDs), one or more Programmable Logic Devices (PLDs), or one or more Field Programmable Gate Arrays (FPGAs) may be included in the one or more processors 102 and 202. The descriptions, functions, procedures, proposals, methods, and/or operational flowcharts disclosed in this document may be implemented using firmware or software and the firmware or software may be configured to include the modules, procedures, or functions. Firmware or software configured to perform the descriptions, functions, procedures, proposals, methods, and/or operational flowcharts disclosed in this document may be included in the one or more processors 102 and 202 or stored in the one or more memories 104 and 204 so as to be driven by the one or more processors 102 and 202. The descriptions, functions, procedures, proposals, methods, and/or operational flowcharts disclosed in this document may be implemented using firmware or software in the form of code, commands, and/or a set of commands.

The one or more memories 104 and 204 may be connected to the one or more processors 102 and 202 and store various types of data, signals, messages, information, programs, code, instructions, and/or commands. The one or more memories 104 and 204 may be configured by Read-Only Memories (ROMs), Random Access Memories (RAMs), Electrically Erasable Programmable Read-Only Memories (EPROMs), flash memories, hard drives, registers, cash memories, computer-readable storage media, and/or combinations thereof. The one or more memories 104 and 204 may be located at the interior and/or exterior of the one or more processors 102 and 202. The one or more memories 104 and 204 may be connected to the one or more processors 102 and 202 through various technologies such as wired or wireless connection.

The one or more transceivers 106 and 206 may transmit user data, control information, and/or radio signals/channels, mentioned in the methods and/or operational flowcharts of this document, to one or more other devices. The one or more transceivers 106 and 206 may receive user data, control information, and/or radio signals/channels, mentioned in the descriptions, functions, procedures, proposals, methods, and/or operational flowcharts disclosed in this document, from one or more other devices. For example, the one or more transceivers 106 and 206 may be connected to the one or more processors 102 and 202 and transmit and receive radio signals. For example, the one or more processors 102 and 202 may perform control so that the one or more transceivers 106 and 206 may transmit user data, control information, or radio signals to one or more other devices. The one or more processors 102 and 202 may perform control so that the one or more transceivers 106 and 206 may receive user data, control information, or radio signals from one or more other devices. The one or more transceivers 106 and 206 may be connected to the one or more antennas 108 and 208 and the one or more transceivers 106 and 206 may be configured to transmit and receive user data, control information, and/or radio signals/channels, mentioned in the descriptions, functions, procedures, proposals, methods, and/or operational flowcharts disclosed in this document, through the one or more antennas 108 and 208. In this document, the one or more antennas may be a plurality of physical antennas or a plurality of logical antennas (e.g., antenna ports). The one or more transceivers 106 and 206 may convert received radio signals/channels etc. from RF band signals into baseband signals in order to process received user data, control information, radio signals/channels, etc. using the one or more processors 102 and 202. The one or more transceivers 106 and 206 may convert the user data, control information, radio signals/channels, etc. processed using the one or more processors 102 and 202 from the base band signals into the RF band signals. To this end, the one or more transceivers 106 and 206 may include (analog) oscillators and/or filters.

The present disclosure described above can be embodied as computer readable codes on a medium in which a program is recorded. The computer readable medium includes all kinds of recording devices storing data which may be deciphered by a computer system. Examples of the computer readable medium may include a hard disk drive (HDD), a solid state disk (SSD), a silicon disk drive (SDD), a ROM, a RAM, a CD-ROM, a magnetic tape, a floppy disk, an optical data storage device, and the like, and also include a medium which is implemented in the form of a carrier wave (e.g., transmission through the Internet). Accordingly, the aforementioned detailed description should not be construed as restrictive in all terms and should be exemplarily considered. The scope of the present disclosure should be determined by rational construing of the appended claims and all modifications within an equivalent scope of the present disclosure are included in the scope of the present disclosure.

The invention claimed is:

1. A method performed by a terminal, the method comprising:

generating a learning list based on one or more location samples collected while the terminal communicates through a network;

in response to detecting an event associated with one or more first items included in the learning list, acquiring training data for updating a first machine learning network to be applied to a receiver of the terminal to a second machine learning network; and updating the first machine learning network based on the training data;

wherein the learning list includes place information and base station information distinguished for each of the one or more first items, wherein the place information includes spatial information regarding an application region to which the second machine learning network is completed, or a collection region for obtaining the training data, wherein a location sample is acquired based on the terminal entering a collection region, wherein one or more communication environments are determined based on applying a clustering algorithm to the one or more location samples, and wherein the one or more communication environments are set as items in the learning list.

2. The method of claim 1, wherein the generating the learning list includes:

generating a connection list including one or more second items including connection information and base station information acquired for one or more base stations;

updating a candidate list based on the connection information in the connection list;

selecting one or more selected items within the connection list based on applying a weight set for one or more third items included in the candidate list and updating a selection list to include the one or more selected items; and generating one or more first generated items to be added to the learning list based on a location sample of the terminal related to at least one fourth item included in the selection list.

3. The method of claim 1, wherein the event indicates a detection of the terminal entering into the collection region or being positioned in the collection region.

4. The method of claim 1, further comprising:

in response to detecting that the terminal is in the application region, stopping collection of the location sample.

5. The method of claim 1, wherein the clustering algorithm is applied to the one or more location samples based on a number of the one or more location samples being greater than or equal to a predetermined number.

6. The method of claim 1, further comprising:

confirming a machine learning network to be applied in an application region when the terminal enters the application region to determine a confirmed machine learning network; and controlling a receiver of the terminal based on the confirmed machine learning network.

7. The method of claim 1, further comprising:

selecting at least one selected first item among the one or more first items corresponding to two or more application regions when the terminal is positioned in two or more application regions;

confirming the machine learning network to be applied in the at least one selected first item to determine a confirmed machine learning network; and controlling the receiver of the terminal based on the confirmed machine learning network.

8. The method of claim 7, wherein the selecting the at least one selected first item includes:

comparing radii of two or more application regions; and selecting two or more first items among the one or more first items based on the comparing.

9. The method of claim 1, wherein the first machine learning network and the second machine learning network include at least one of a Deep Neural Network (DNN), a Convolutional Neural Network (CNN), or a Recurrent Neural Network (RNN) including parametric multiplications, additions, and non-linearities.

10. The method of claim 1, wherein the training data represents a reception related parameter for the terminal.

11. The method of claim 10, wherein the reception related parameter includes at least one of a signal to noise ratio (SNR), a received signal strength indication (RSSI), a reference signal received power (RSRP), or a reference signal reception quality.

12. The method of claim 1, further comprising:

comparing a first performance indicator measured by the first machine learning network before the updating the first machine learning network based on the training data and a second performance indicator measured by the second machine learning network after the updating the first machine learning network based on the training data while updating the first machine learning network; and selecting one of the first and second machine learning networks based on the comparing the first performance indicator and the second performance indicator.

13. The method of claim 1, further comprising:

comparing a first performance indicator measured by applying the first machine learning network before the updating the first machine learning network based on the training data and a second performance indicator measured by applying the second machine learning network after the updating the first machine learning network based on the training data when the first machine learning network is updated; and selecting one of the first and second machine learning networks based on the comparing the first performance indicator and the second performance indicator.

14. The method of claim 13, further comprising:

based on a reliability value of the comparing the first performance indicator and the second performance indicator being less than a set reference value, measuring and comparing the first and second performance indicators again.

15. The method of claim 1, wherein the learning list includes state information for each of the one or more first items, the state information includes at least one of an acquisition state, a training state, a verification state, an application state, or a barred state; and determining at least one of collection of the training data, and learning, verification, application, or barring of the first or second machine learning network based on the state information.

16. The method of claim 1, further comprising:

based on the updating the first machine learning network being unsuccessful, increasing a number of failures corresponding to the first machine learning network; and based on the number of the failures exceeding a set maximum number of times, performing (i) initializing the first machine learning network to a state of the first machine learning network before the updating the first machine learning network and (ii) switching the state of the one or more first items to a barred state.

17. A terminal comprising:

a transceiver; and at least one processor configured to:

generate a learning list based on one or more location samples collected while the terminal communicates through a network, in response to detecting an event associated with one or more first items included in the learning list, acquire training data for learning a machine learning network to be applied to the terminal, and update the machine learning network based on the training data, wherein the learning list includes place information and base station information distinguished for each of the one or more first items, wherein the place information includes spatial information regarding an application region to which a second machine learning network is completed, or a collection region for obtaining the training data, wherein a location sample is acquired based on the terminal entering a collection region, wherein one or more communication environments are determined based on a clustering algorithm applied to the one or more location samples, and wherein the one or more communication environments are set as items in the learning list.

18. A non-transitory computer readable recording medium having a program recorded therein, which allows a computer system to execute the method of claim 1.

\* \* \* \* \*